(12) United States Patent
Huang et al.

(10) Patent No.: US 12,360,724 B2
(45) Date of Patent: Jul. 15, 2025

(54) PROJECTION METHOD AND SYSTEM, AND ELECTRONIC DEVICE

(71) Applicant: HUAWEI TECHNOLOGIES CO., LTD., Guangdong (CN)

(72) Inventors: Decai Huang, Wuhan (CN); Bo Wang, Wuhan (CN); Can Zhou, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/427,627

(22) Filed: Jan. 30, 2024

(65) Prior Publication Data

US 2024/0176573 A1  May 30, 2024

Related U.S. Application Data

(63) Continuation of application No. PCT/CN2022/108631, filed on Jul. 28, 2022.

(30) Foreign Application Priority Data

Jul. 30, 2021  (CN) .......................... 202110874235.3

(51) Int. Cl.
  *G06F 3/14* (2006.01)
  *G06F 3/0354* (2013.01)
  *G06F 3/0484* (2022.01)

(52) U.S. Cl.
  CPC .......... *G06F 3/1454* (2013.01); *G06F 3/0354* (2013.01); *G06F 3/0484* (2013.01)

(58) Field of Classification Search
  CPC ..... G06F 3/0484; G06F 3/1454; G06F 3/1423
  See application file for complete search history.

(56) References Cited

U.S. PATENT DOCUMENTS

| | | | | |
|---|---|---|---|---|
| 2007/0288599 | A1* | 12/2007 | Saul | H04L 67/06 709/227 |
| 2010/0281363 | A1* | 11/2010 | Inaba | G06F 3/0488 715/702 |
| 2014/0365957 | A1* | 12/2014 | Louch | G09G 5/14 715/790 |
| 2015/0012831 | A1 | 1/2015 | Boggess | |
| 2017/0052685 | A1* | 2/2017 | Kovács | H04W 4/80 |

FOREIGN PATENT DOCUMENTS

| | | |
|---|---|---|
| CN | 111601120 A | 8/2020 |
| CN | 112083867 A | 12/2020 |

* cited by examiner

*Primary Examiner* — Yuzhen Shen

(57) ABSTRACT

A projection method and system, and an electronic device are provided. In this method, a user can drag a projection window in a remote device to a local device. For example, the user may drag the projection window in the remote device to the local device by using a mouse. The user may drag the projection window from the local device to the remote device. The user may adjust, on the local device, a size of the projection window displayed on the local device. In the technical solution provided in this application, a user operation is simple during projection.

17 Claims, 37 Drawing Sheets

PROJECTION METHOD AND SYSTEM, AND ELECTRONIC DEVICE

CROSS-REFERENCE TO RELATED APPLICATIONS

This application is a continuation of International Application No. PCT/CN2022/108631, filed on Jul. 28, 2022, which claims priority to Chinese Patent Application No. 202110874235.3, filed on Jul. 30, 2021. The disclosures of the aforementioned applications are hereby incorporated by reference in their entireties.

TECHNICAL FIELD

This application relates to the field of computer technologies, and in particular, to a projection method applied to an electronic device, a system, and the electronic device.

BACKGROUND

Currently, electronic devices are interconnected in more scenarios, for example, a scenario of multi-screen collaboration between the electronic devices. In a scenario of multi-screen collaboration, an electronic device 1 may project, onto an electronic device 2, content (for example, a video playback window or a chat window) displayed on a display. In this way, the electronic device 2 (for example, a tablet computer) can display the content displayed on the display of the electronic device 1 (for example, a mobile phone).

In the conventional technology, a user may project a window in the electronic device 1 onto a display of the electronic device 2, and then return the window that is projected onto the electronic device 2 to the electronic device 1. However, user experience is poor due to cumbersome operations.

Therefore, how to conveniently project the window in the electronic device 1 onto the electronic device 2 and return the window that is projected onto the electronic device 2 to the electronic device 1 is an urgent problem to be resolved.

SUMMARY

This application provides a projection method and system, and an electronic device. By using the projection method, a user may drag a projection window in a first electronic device to a second electronic device, and drag the projection window in the first electronic device back from the second electronic device to the first electronic device. In this way, the user can simply and conveniently project a window in one electronic device onto another device. This can improve user experience.

According to a first aspect, a projection method is provided. The method may be applied to a projection system. The projection system may include a first electronic device and a second electronic device. A communication connection is established between the first electronic device and the second electronic device. The method may include: The first electronic device detects a first drag operation. The first drag operation is used to move a first projection window of a display of the first electronic device from the first electronic device to a display of the second electronic device. The first electronic device obtains a first image of the first projection window in response to the first drag operation. The first image includes display content that is of the first projection window and that is dragged out of the display of the first electronic device. The first electronic device sends the first image to the second electronic device. The second electronic device displays the first image on the display of the second electronic device.

According to the projection method provided in the first aspect, a user can drag a window in the first electronic device to the second electronic device. The user can project the window in the first electronic device onto the second electronic device through a drag operation. In this way, a user operation is simple, and user experience can be improved.

With reference to the first aspect, in an implementation, the first image includes a part or all of the display content of the first projection window. In this way, the user can project a part of the first projection window in the first electronic device onto the second electronic device, or may project all of the first projection window onto the second electronic device.

With reference to the first aspect, in an implementation, that the first electronic device sends the first image to the second electronic device includes: The first electronic device sends the first image and first location information to the second electronic device. The first location information is used to determine a location of the first image on the display of the second electronic device. In this way, the second electronic device can determine a location at which the first image is displayed.

With reference to the first aspect, in an implementation, that the second electronic device displays the first image on the display of the second electronic device includes: The second electronic device displays the first image on the display of the second electronic device based on the first location information.

With reference to the first aspect, in an implementation, that the first electronic device sends the first image to the second electronic device includes: The first electronic device superimposes the first image on a transparent background image to obtain a superimposed image. The transparent background image is generated by the first electronic device based on a size of the display of the second electronic device, and a size of the transparent background image is the same as the size of the display of the second electronic device. The transparent background image is not displayed on the first electronic device. The first electronic device sends the superimposed image to the second electronic device.

With reference to the first aspect, in an implementation, the method may further include: The first electronic device detects a second drag operation. The second drag operation is used to move a second projection window displayed on the display of the first electronic device from the display of the first electronic device to the display of the second electronic device. In response to the second drag operation, the first electronic device obtains a second image of the second projection window, and the first electronic device superimposes the second image on the transparent background image to obtain a superimposed image. The second image includes display content that is of the second projection window and that is dragged out of the display of the first electronic device.

In this way, when the first electronic device projects a plurality of windows onto the second electronic device, images of the plurality of windows may be superimposed on the transparent background image and then sent to the second electronic device. In this way, the first electronic device needs to send only one image to the second electronic device, which can save transmission bandwidth and improve transmission efficiency.

With reference to the first aspect, in an implementation, before the first electronic device detects the first drag operation, the method may further include: The first electronic device determines a first relative location between the first electronic device and the second electronic device. The first drag operation is used to move the first projection window from the display of the first electronic device to the display of the second electronic device in a first direction. The first direction is a direction, as indicated by the first relative location, of the second electronic device relative to the first electronic device.

The first relative location includes that the second electronic device is located on the right of the first electronic device, the second electronic device is located on the left of the first electronic device, the second electronic device is located above the first electronic device, and the second electronic device is located below the first electronic device.

That the first drag operation is used to move the first projection window from the display of the first electronic device to the display of the second electronic device in a first direction includes:
- the first direction is, as indicated by the first relative location, the right of the second electronic device relative to the first electronic device, and the first drag operation is used to move the first projection window rightward from the display of the first electronic device to the display of the second electronic device;
- the first direction is, as indicated by the first relative location, the left of the second electronic device relative to the first electronic device, and the first drag operation is used to move the first projection window leftward from the display of the first electronic device to the display of the second electronic device;
- the first direction is, as indicated by the first relative location, above the second electronic device relative to the first electronic device, and the first drag operation is used to move the first projection window upward from the display of the first electronic device to the display of the second electronic device; or
- the first direction is, as indicated by the first relative location, below the second electronic device relative to the first electronic device, and the first drag operation is used to move the first projection window downward from the display of the first electronic device to the display of the second electronic device.

In this embodiment of this application, if a movement speed of the first drag operation has a component in the first direction, it may be referred to as moving the first drag operation in the first direction. The first electronic device may detect the movement speed of the first movement operation. For example, the first electronic device may determine the speed of the first movement operation based on a movement speed of a mouse.

In this way, a movement direction of the first drag operation is related to the first relative location. This is more in line with operation habits of most users and can improve user experience.

With reference to the first aspect, in an implementation, the first relative location is set by a user in the first electronic device or obtained by the first electronic device based on an actual location of the first electronic device and an actual location of the second electronic device. In this way, a relative location between the first electronic device and the second electronic device can be determined.

With reference to the first aspect, in an implementation, the method may further include: The first electronic device sends second location information of a first mouse pointer to the second electronic device in response to the first drag operation. The second location information is used to determine a location of the first mouse pointer on the display of the second electronic device. The second electronic device displays the first mouse pointer on the display of the second electronic device based on the second location information.

In this way, the user can drag a mouse pointer in the first electronic device to the second electronic device.

With reference to the first aspect, in an implementation, a second mouse pointer is displayed on the display of the second electronic device. The method may further include: The second electronic device hides the second mouse pointer when displaying the first mouse pointer on the display of the second electronic device based on the second location information. This can prevent two mouse pointers from being simultaneously displayed on the second electronic device at the same time, so as not interfere with a user operation.

With reference to the first aspect, in an implementation, after the second electronic device displays the first image, the method may further include: The second electronic device receives a first operation. The first operation is for the first image. The second electronic device sends a first instruction to the first electronic device. The first instruction instructs the first electronic device to respond to the first operation. A first application to which the first projection window in the first electronic device belongs responds to the first operation.

The first operation may include any one of tapping a maximization control in the first projection window, tapping a minimization control in the first projection window, tapping a control for closing the first projection window, or moving the first projection window. It may be understood that the first operation may be that the user taps any control in the first projection window, and the any control is not limited to the control in the foregoing descriptions.

The first instruction may carry an operation type of the first operation and location information of the first operation.

In this way, the user projects a projection window in the first electronic device onto the second electronic device, and may further control the projection window in the second electronic device, for example, move the projection window back to the first electronic device, close the projection window, maximize the projection window, or minimize the projection window.

With reference to the first aspect, in an implementation, after the second electronic device displays the first image, the method may further include: The second electronic device receives a second operation. The second operation is for a first window, and the first window is a window of a second application in the second electronic device. The second application in the second electronic device responds to the second operation.

In this way, when a projection window is displayed on the second electronic device, the user can directly operate the window of the application in the second electronic device without a need to close the projection window.

With reference to the first aspect, in an implementation, after the second electronic device displays the first image, the method may further include: The second electronic device receives a third operation. The third operation is performed on a transparent window, the transparent window is a window in which the superimposed image is located, and the transparent window is a focus window. The second electronic device determines, based on a location of the third operation, that the third operation is performed on an area in which the first image is located. The second electronic device sends a second instruction to the first electronic device. The second instruction instructs the first electronic device to respond to the third operation. A first application to which the first projection window in the first electronic device belongs responds to the third operation.

The third operation may include any one of tapping a maximization control in the first projection window, tapping a minimization control in the first projection window, tapping a control for closing the first projection window, or moving the first projection window. It may be understood that the third operation may be that the user taps any control in the first projection window, and the any control is not limited to the control in the foregoing descriptions.

The second instruction may carry an operation type of the third operation and location information of the third operation.

In this way, when the second electronic device displays images of one or more projection windows, the second electronic device can determine a projection window on which a user operation is performed.

With reference to the first aspect, in an implementation, after the second electronic device displays the first image, the method may further include: The second electronic device receives a fourth operation. The fourth operation is performed on a focus window. If the focus window is a local window in the second electronic device, an application of the local window in the second electronic device responds to the fourth operation. If the focus window is a projection window, and the projection window is a window in which the first image is located, the second electronic device sends a third instruction to the first electronic device. The third instruction instructs the first electronic device to respond to the fourth operation. A first application to which the first projection window in the first electronic device belongs responds to the fourth operation.

In this way, the second electronic device can determine whether a window on which a user operation is performed is a local window or a projection window.

According to a second aspect, a projection method is provided, and the method may be applied to a projection system. The projection system may include a first electronic device and a second electronic device. A communication connection is established between the first electronic device and the second electronic device. The method may include: The second electronic device detects a fifth operation. A superimposed image is displayed on a display of the second electronic device. The superimposed image is sent by the first electronic device to the second electronic device, and the superimposed image is obtained by superimposing a first image on a transparent background image. The first image is an image that is of a first projection window and that is obtained by the first electronic device. The first projection window is a window of a first application in the first electronic device. The second electronic device sends a fourth instruction to the first electronic device. The fourth instruction instructs the first application in the first electronic device to respond to the fifth operation.

The fifth operation may include any one of tapping a maximization control in the first projection window, tapping a minimization control in the first projection window, tapping a control for closing the first projection window, or moving the first projection window. It may be understood that the first operation may be that a user taps any control in the first projection window, and the any control is not limited to the control in the foregoing descriptions.

The fourth instruction may carry an operation type of the fifth operation and location information of the fifth operation.

In this way, the user projects a projection window in the first electronic device onto the second electronic device, and may further control the projection window in the second electronic device, for example, move the projection window back to the first electronic device, close the projection window, maximize the projection window, or minimize the projection window.

With reference to the second aspect, in an implementation, before the electronic device detects the fifth operation, the method may further include: The first electronic device detects a first drag operation. The first drag operation is used to move the first projection window in the first electronic device from a display of the first electronic device to the display of the second electronic device. The first electronic device obtains the first image of the first projection window in response to the first drag operation. The first image includes display content that is of the first projection window and that is dragged out of the display of the first electronic device. The first electronic device superimposes the first image on the transparent background image to obtain the superimposed image. The first electronic device sends the superimposed image to the second electronic device. The second electronic device displays the superimposed image on the display of the second electronic device.

The transparent background image is generated by the first electronic device based on a size of the display of the second electronic device, and a size of the transparent background image is the same as the size of the display of the second electronic device. The transparent background image is not displayed on the first electronic device.

According to a third aspect, a projection method is provided. The method is applied to a first electronic device. The method may include: The first electronic device detects a first drag operation. The first drag operation is used to move a first projection window from a display of the first electronic device to a display of a second electronic device. A communication connection is established between the second electronic device and the first electronic device. The first electronic device obtains a first image of the first projection window in response to the first drag operation. The first image includes display content that is of the first projection window and that is dragged out of the display of the first electronic device. The first electronic device sends the first image to the second electronic device. The first image is displayed on the display of the second electronic device.

According to the projection method provided in the third aspect, a user can drag a window in the first electronic device to the second electronic device. The user can project the window in the first electronic device onto the second electronic device through a drag operation. In this way, a user operation is simple, and user experience can be improved.

With reference to the third aspect, in an implementation, the first image includes a part or all of the display content of the first projection window. In this way, the user can project a part of the first projection window in the first electronic device onto the second electronic device, or may project all of the first projection window onto the second electronic device.

With reference to the third aspect, in an implementation, that the first electronic device sends the first image to the second electronic device may include: The first electronic device sends the first image and first location information to the second electronic device. The first location information is used to determine a location of the first image on the display of the second electronic device. In this way, the second electronic device can determine a location at which the first image is displayed.

With reference to the third aspect, in an implementation, with reference to the first aspect, in an implementation, that the first electronic device sends the first image to the second electronic device includes: The first electronic device superimposes the first image on a transparent background image to obtain a superimposed image. The transparent background image is generated by the first electronic device based on a size of the display of the second electronic device, and a size of the transparent background image is the same as the size of the display of the second electronic device. The transparent background image is not displayed on the first electronic device. The first electronic device sends the superimposed image to the second electronic device.

With reference to the third aspect, in an implementation, the method may further include: The first electronic device detects a second drag operation. The second drag operation is used to move a second projection window displayed on the display of the first electronic device from the display of the first electronic device to the display of the second electronic device. In response to the second drag operation, the first electronic device obtains a second image of the second projection window, and the first electronic device superimposes the second image on the transparent background image to obtain a superimposed image. The second image includes display content that is of the second projection window and that is dragged out of the display of the first electronic device.

In this way, when the first electronic device projects a plurality of windows onto the second electronic device, images of the plurality of windows may be superimposed on the transparent background image and then sent to the second electronic device. In this way, the first electronic device needs to send only one image to the second electronic device, which can save transmission bandwidth and improve transmission efficiency.

With reference to the third aspect, in an implementation, before the first electronic device detects the first drag operation, the method may further include: The first electronic device determines a first relative location between the first electronic device and the second electronic device. The first drag operation is used to move the first projection window from the display of the first electronic device to the display of the second electronic device in a first direction. The first direction is a direction, as indicated by the first relative location, of the second electronic device relative to the first electronic device.

The first relative location includes that the second electronic device is located on the right of the first electronic device, the second electronic device is located on the left of the first electronic device, the second electronic device is located above the first electronic device, and the second electronic device is located below the first electronic device.

That the first drag operation is used to move the first projection window from the display of the first electronic device to the display of the second electronic device in a first direction includes:

the first direction is, as indicated by the first relative location, the right of the second electronic device relative to the first electronic device, and the first drag operation is used to move the first projection window rightward from the display of the first electronic device to the display of the second electronic device;

the first direction is, as indicated by the first relative location, the left of the second electronic device relative to the first electronic device, and the first drag operation is used to move the first projection window leftward from the display of the first electronic device to the display of the second electronic device;

the first direction is, as indicated by the first relative location, above the second electronic device relative to the first electronic device, and the first drag operation is used to move the first projection window upward from the display of the first electronic device to the display of the second electronic device; or the first direction is, as indicated by the first relative location, below the second electronic device relative to the first electronic device, and the first drag operation is used to move the first projection window downward from the display of the first electronic device to the display of the second electronic device.

In this embodiment of this application, if a movement speed of the first drag operation has a component in the first direction, it may be referred to as moving the first drag operation in the first direction. The first electronic device may detect the movement speed of the first movement operation. For example, the first electronic device may determine the speed of the first movement operation based on a movement speed of a mouse.

In this way, a movement direction of the first drag operation is consistent with the first relative location. This is more in line with operation habits of most users and can improve user experience.

With reference to the third aspect, in an implementation, the first relative location is set by a user in the first electronic device or obtained by the first electronic device based on an actual location of the first electronic device and an actual location of the second electronic device. In this way, a relative location between the first electronic device and the second electronic device can be determined.

With reference to the third aspect, in an implementation, the method may further include: The first electronic device sends second location information of a first mouse pointer to the second electronic device in response to the first drag operation. The second location information is used to determine a location of the first mouse pointer on the display of the second electronic device.

Optionally, in an implementation, the first drag operation and the second drag operation may be a same operation, that is, the user may drag the first projection window and the first mouse pointer to the second electronic device.

In this way, the user can drag a mouse pointer in the first electronic device to the second electronic device.

With reference to the third aspect, in an implementation, the first electronic device receives a first instruction sent by the second electronic device. The first instruction instructs the first electronic device to respond to the first operation. The first operation is for the first image displayed on the second electronic device. A first application to which the first projection window in the first electronic device belongs responds to the first operation.

The first operation may include any one of tapping a maximization control in the first projection window, tapping a minimization control in the first projection window, tapping a control for closing the first projection window, or moving the first projection window. It may be understood that the first operation may be that the user taps any control in the first projection window, and the any control is not limited to the control in the foregoing descriptions.

The first instruction may carry an operation type of the first operation and location information of the first operation.

In this way, the user projects a projection window in the first electronic device onto the second electronic device, and may further control the projection window in the second electronic device, for example, move the projection window back to the first electronic device, close the projection window, maximize the projection window, or minimize the projection window.

With reference to the third aspect, in an implementation, after the second electronic device displays the first image, the method may further include: The second electronic device receives a third operation. The third operation is performed on a transparent window, the transparent window is a window in which the superimposed image is located, and the transparent window is a focus window. The second electronic device determines, based on a location of the third operation, that the third operation is performed on an area in which the first image is located. The second electronic device sends a second instruction to the first electronic device. The second instruction instructs the first electronic device to respond to the third operation. A first application to which the first projection window in the first electronic device belongs responds to the third operation.

The third operation may include any one of tapping a maximization control in the first projection window, tapping a minimization control in the first projection window, tapping a control for closing the first projection window, or moving the first projection window. It may be understood that the third operation may be that the user taps any control in the first projection window, and the any control is not limited to the control in the foregoing descriptions.

The second instruction may carry an operation type of the third operation and location information of the third operation.

In this way, when the second electronic device displays images of one or more projection windows, the second electronic device can determine a projection window on which a user operation is performed.

With reference to the third aspect, in an implementation, after the second electronic device displays the first image, the method may further include: The second electronic device receives a fourth operation. The fourth operation is performed on a focus window. If the focus window is a local window in the second electronic device, an application of the local window in the second electronic device responds to the fourth operation. If the focus window is a projection window, and the projection window is a window in which the first image is located, the second electronic device sends a third instruction to the first electronic device. The third instruction instructs the first electronic device to respond to the fourth operation. A first application to which the first projection window in the first electronic device belongs responds to the fourth operation.

In this way, the second electronic device can determine whether a window on which a user operation is performed is a local window or a projection window.

According to a fourth aspect, a projection method is provided. The projection method may be applied to a second electronic device. The method may include: The second electronic device receives a first image sent by a first electronic device. The first image is obtained by the first electronic device from a first projection window in the first electronic device when the first electronic device receives a first drag operation. The first image includes display content that is of the first projection window and that is dragged out of a display of the first electronic device. The first drag operation is used to move the first projection window from the first electronic device to the second electronic device. A communication connection is established between the second electronic device and the first electronic device. The second electronic device displays the first image on a display of the second electronic device.

According to the projection method provided in the fourth aspect, a user can drag a window in the first electronic device to the second electronic device. The user can project the window in the first electronic device onto the second electronic device through a drag operation. In this way, a user operation is simple, and user experience can be improved.

With reference to the fourth aspect, in an implementation, the first image includes a part or all of the display content of the first projection window. In this way, the user can project a part of the first projection window in the first electronic device onto the second electronic device, or may project all of the first projection window onto the second electronic device.

With reference to the fourth aspect, in an implementation, that the second electronic device receives a first image sent by a first electronic device includes: The second electronic device receives the first image and first location information that are sent by the first electronic device. The first location information is used to determine a location of the first image on the display of the second electronic device.

With reference to the fourth aspect, in an implementation, that the second electronic device displays the first image on the display of the second electronic device includes: The second electronic device displays the first image on the display of the second electronic device based on the first location information. In this way, the second electronic device can determine a location at which the first image is displayed.

With reference to the fourth aspect, in an implementation, the method may further include: The second electronic device receives a superimposed image sent by the first electronic device. The superimposed image is obtained by superimposing the first image and a second image on a transparent background image. The second image is obtained by the first electronic device from a second projection window in the first electronic device when the first electronic device receives a second drag operation. The second image includes display content that is of the second projection window and that is dragged out of the display of the first electronic device. The second drag operation is used to move the second projection window from the display of the first electronic device to the display of the second electronic device.

In this way, the second electronic device may display images of a plurality of projection windows in the first electronic device, and may simultaneously display the images of the plurality of projection windows onto one transparent window (the transparent window is a window in which the superimposed image is located).

With reference to the fourth aspect, in an implementation, the method may further include: The second electronic device receives a second location message sent by the first electronic device. The second location message is used to determine a location of a first mouse pointer in the first electronic device on the display of the second electronic device. The second electronic device displays the first mouse pointer on the display of the second electronic device based on the second location information. In this way, the user can drag a mouse pointer in the first electronic device to the second electronic device.

With reference to the fourth aspect, in an implementation, a second mouse pointer is displayed on the display of the second electronic device. The method may further include: The second electronic device hides the second mouse pointer when displaying the first mouse pointer based on the second location information. This can prevent two mouse pointers from being simultaneously displayed on the second electronic device at the same time, so as not interfere with a user operation.

With reference to the fourth aspect, in an implementation, after the second electronic device displays the first image, the method may further include: The second electronic device receives a first operation. The first operation is for the first image. The second electronic device sends a first instruction to the first electronic device. The first instruction instructs the first electronic device to respond to the first operation. The first operation may include any one of tapping a maximization control in the first projection window, tapping a minimization control in the first projection window, tapping a control for closing the first projection window, or moving the first projection window. It may be understood that the first operation may be that the user taps any control in the first projection window, and the any control is not limited to the control in the foregoing descriptions.

The first instruction may carry an operation type of the first operation and location information of the first operation.

In this way, the user projects a projection window in the first electronic device onto the second electronic device, and may further control the projection window in the second electronic device, for example, move the projection window back to the first electronic device, close the projection window, maximize the projection window, or minimize the projection window.

With reference to the fourth aspect, in an implementation, after the second electronic device displays the first image, the method may further include: The second electronic device receives a second operation. The second operation is for a first window, and the first window is a window of a second application in the second electronic device. The second application in the second electronic device responds to the second operation.

In this way, when a projection window is displayed on the second electronic device, the user can directly operate the window of the application in the second electronic device without a need to close the projection window.

With reference to the fourth aspect, in an implementation, after the second electronic device displays the first image, the method may further include: The second electronic device receives a third operation. The third operation is performed on a transparent window, the transparent window is a window in which the superimposed image is located, and the transparent window is a focus window. The second electronic device determines, based on a location of the third operation, that the third operation is performed on an area in which the first image is located. The second electronic device sends a second instruction to the first electronic device. The second instruction instructs the first electronic device to respond to the third operation. A first application to which the first projection window in the first electronic device belongs responds to the third operation.

The third operation may include any one of tapping a maximization control in the first projection window, tapping a minimization control in the first projection window, tapping a control for closing the first projection window, or moving the first projection window. It may be understood that the third operation may be that the user taps any control in the first projection window, and the any control is not limited to the control in the foregoing descriptions.

The second instruction may carry an operation type of the third operation and location information of the third operation.

In this way, when the second electronic device displays images of one or more projection windows, the second electronic device can determine a projection window on which a user operation is performed.

With reference to the fourth aspect, in an implementation, after the second electronic device displays the first image, the method may further include: The second electronic device receives a fourth operation. The fourth operation is performed on a focus window. If the focus window is a local window in the second electronic device, an application of the local window in the second electronic device responds to the fourth operation. If the focus window is a projection window, and the projection window is a window in which the first image is located, the second electronic device sends a third instruction to the first electronic device. The third instruction instructs the first electronic device to respond to the fourth operation. A first application to which the first projection window in the first electronic device belongs responds to the fourth operation.

In this way, the second electronic device can determine whether a window on which a user operation is performed is a local window or a projection window.

According to a fifth aspect, a projection system is provided. The projection system may include a first electronic device and a second electronic device. The first electronic device is configured to perform the projection method according to any possible implementation of the third aspect. The second electronic device is configured to perform the projection method according to any possible implementation of the fourth aspect.

According to a sixth aspect, an electronic device is provided. The electronic device may include one or more processors and one or more memories. The one or more memories are respectively coupled to the one or more processors. The one or more memories are configured to store computer program code, and the computer program code includes computer instructions. When the computer instructions are run on the processor, the electronic device is enabled to perform the projection method according to any possible implementation of the third aspect.

According to a seventh aspect, an electronic device is provided. The electronic device may include one or more processors and one or more memories. The one or more memories are respectively coupled to the one or more processors. The one or more memories are configured to store computer program code, and the computer program code includes computer instructions. When the computer instructions are run on the processor, the electronic device is enabled to perform the projection method according to any possible implementation of the fourth aspect.

According to an eighth aspect, a computer storage medium is provided, including computer instructions. When the computer instructions are run on an electronic device, the electronic device is enabled to perform the projection method according to any possible implementation of any one of the foregoing aspects.

According to a ninth aspect, a computer program product is provided. When the computer program product runs on an electronic device, the electronic device is enabled to perform the projection method according to any possible implementation of any one of the foregoing aspects.

BRIEF DESCRIPTION OF DRAWINGS

FIG. 13A-1 to FIG. 13A-3 and FIG. 13B-1 to FIG. 13B-3 are diagrams of a projection scenario according to an embodiment of this application;

DESCRIPTION OF EMBODIMENTS

Terms used in the following embodiments of this application are merely intended to describe embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that a term "and/or" used in this application indicates and includes any one or all of possible combinations of one or more listed items.

The following terms "first" and "second" are merely intended for a purpose of description, and shall not be understood as an implication or implication of relative importance or implicit indication of a quantity of indicated technical features. Therefore, a feature limited by "first" or "second" may explicitly or implicitly include one or more features. In descriptions of embodiments of this application, unless otherwise specified, "a plurality of" means two or more than two.

Projection in this application means that a window displayed on an electronic device (for example, an audio playback window, a video playback window, or an instant messaging software chat window) is transmitted to another electronic device for presentation, so as to implement an effect that the window in the electronic device is displayed on the another electronic device. The projection in this application may include wired projection and wireless projection. For the wired projection, a connection may be established between a plurality of electronic devices through a high definition multimedia interface (HDMI), and window data is transmitted through an HDMI transmission line. For the wireless projection, a connection may be established between a plurality of electronic devices through a wireless local area network (for example, Wi-Fi), and window data is transmitted through the wireless local area network.

Figure 1:
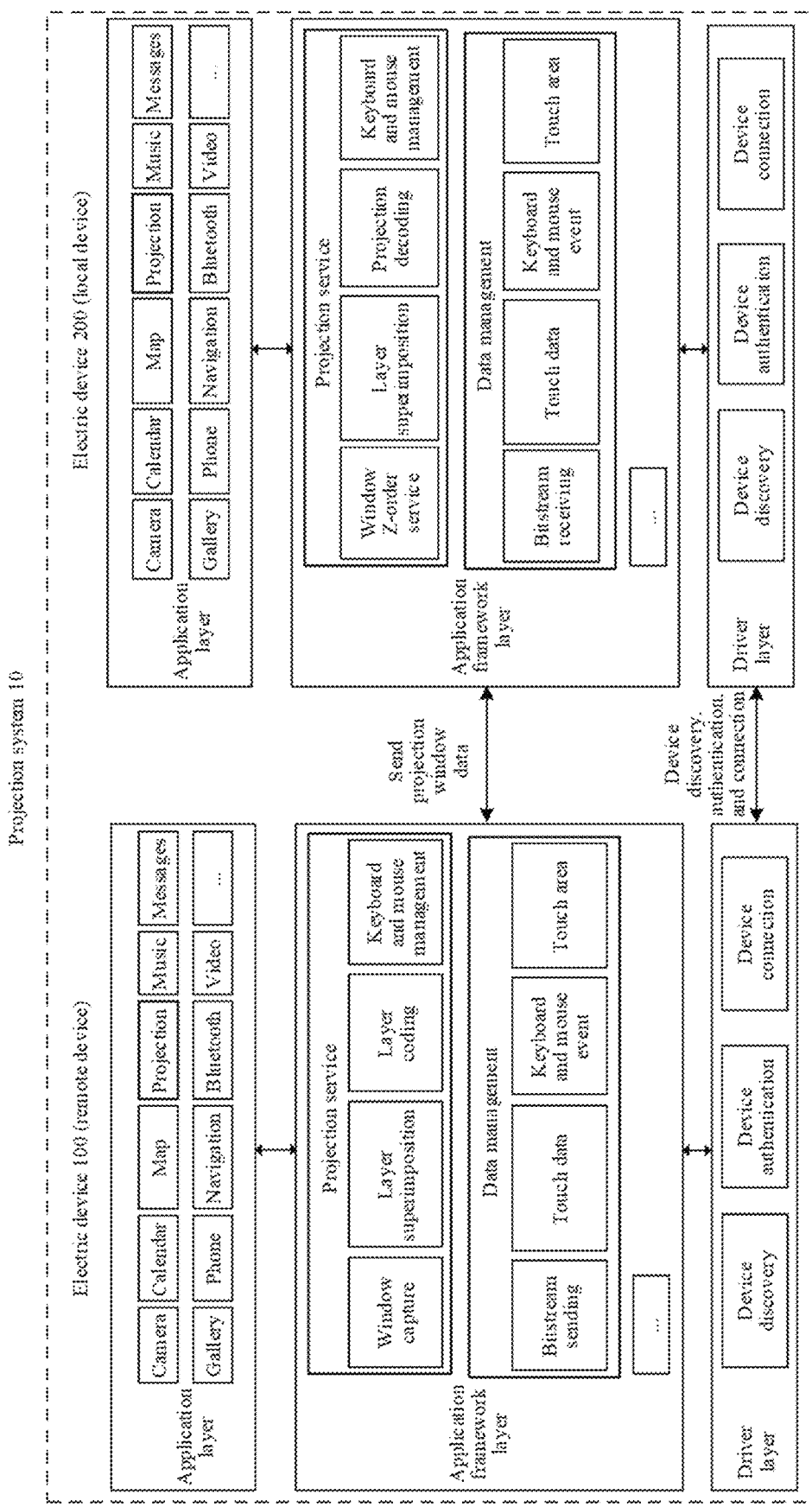
FIG. 1 is a diagram of a projection system according to an embodiment of this application.

A projection system in this application may include at least two electronic devices. FIG. 1 is a diagram of a system architecture of a projection system 10 according to an embodiment of this application. As shown in FIG. 1, the projection system 10 may include an electronic device 100 and an electronic device 200. The electronic device 100 may also be referred to as a remote device. The electronic device 200 may be referred to as a local device. The electronic device 100 may be a projection transmit end (Source), and the electronic device 200 may be a projection receive end (Sink). In other words, a window in the electronic device 100 may be projected onto the electronic device 200. A window projected by the electronic device 100 onto the electronic device 200 may be referred to as a projection window.

In this embodiment of this application, the electronic device 100 may be referred to as a first electronic device, and the electronic device 200 may be referred to as a second electronic device. The first electronic device has a display, and the second electronic device also has a display. A first projection window displayed on the first electronic device is a first projection window displayed on the display of the first electronic device. A first image of the first projection window on the second electronic device is a first image of the first projection window on the display of the second electronic device.

The electronic device 100 has at least a projection sending capability. Optionally, the electronic device 100 may include an application layer, an application framework layer, and a driver layer.

The application layer may include a series of application packages. As shown in FIG. 1, the program application package may include applications (which may also be referred to as applications) such as Camera, Calendar, Map, Projection, Music, Messages, Gallery, Phone, Navigation, Bluetooth, and Video.

Optionally, the electronic device 100 may implement the projection sending capability by using a projection application. The projection application may provide a projection connection user interface (UI) and a projection display UI. The projection connection UI may be configured to set a connection between projection devices. For example, on the projection connection UI, a projection connection is established between the electronic device 100 and the electronic device 200. The projection display UI may display a device on which projection can be performed, a relative location between a display device and a setting device, and the like.

Optionally, a system of the electronic device 100 may provide a projection control used by the electronic device 100 to implement the projection sending capability.

As shown in FIG. 1, the application framework layer provides an application programming interface (API) and a programming framework for an application at the application layer. The application framework layer includes some predefined functions.

As shown in FIG. 1, the application framework layer of the electronic device 100 may include a projection service and data management. The projection service may include a window capture service, a layer superimposition service, a layer coding service, and a keyboard and mouse management service. The window capture service can be configured to capture window image data that is in the electronic device 100 and that is to be projected onto the electronic device 200. The layer superimposition service can be configured to superimpose images in one or more projection windows. The layer coding service is configured to encode the superimposed image data in the projection window. The keyboard and mouse management service is configured to manage a keyboard operation or a mouse operation received by the electronic device 100. The data management may include bitstream sending management, touch data management, keyboard and mouse event management, and touch area management. The bitstream sending management can be configured to manage coded data that is of a projection window in the electronic device 100 and that is encoded by the layer coding service. The touch data management can be configured to manage touch data of a user received by the electronic device 100 or touch data sent by the electronic device 200 to the electronic device 100. The keyboard and mouse event management can be configured to manage a keyboard and mouse event received by the electronic device 100 and a keyboard and mouse event sent by the electronic device 200 to the electronic device 100. For example, the user drags a projection window rightward by using a mouse. The touch area management is configured to manage a touch area received by the electronic device 100.

As shown in FIG. 1, the electronic device 100 may include the driver layer, and the driver layer is a layer between hardware and software. The driver layer can be configured to: discover a device that can perform a projection connection (briefly referred to as device discovery), and drive authentication (briefly referred to as device authentication) and a connection (briefly referred to as device connection) between projection devices. The device discovery, the device authentication, the device connection, and the like may be completed by one driver at the driver layer, or may be completed by a plurality of drivers. This is not limited herein.

The electronic device 200 has at least a projection receiving capability. Optionally, the electronic device 200 may include an application layer, an application framework layer, and a driver layer.

The application layer may include a series of application packages. As shown in FIG. 1, the program application package may include applications (which may also be referred to as applications) such as Camera, Calendar, Map, Projection, Music, Messages, Gallery, Phone, Navigation, Bluetooth, and Video.

Optionally, the electronic device 200 may implement the projection receiving capability by using a projection application.

Optionally, a system of the electronic device 200 may provide a projection control used by the electronic device 200 to implement the projection receiving capability.

As shown in FIG. 1, the application framework layer provides an application programming interface (API) and a programming framework for an application at the application layer. The application framework layer includes some predefined functions.

As shown in FIG. 1, the application framework layer of the electronic device 200 may include a projection service and data management.

As shown in FIG. 1, the projection service may include a window Z-order service, a layer superimposition service, a layer decoding service, a keyboard and mouse management service, and the like. The window Z-order service can be configured to: set a Z-axis order of a window in the electronic device 200 and a projection window received by the electronic device 200, and display the window (the window in the electronic device 200 and the projection window received by the electronic device 200) based on the Z-axis order. The layer superimposition service can be configured to superimpose a plurality of windows. The layer decoding service can be configured to decode the received encoded projection window data.

As shown in FIG. 1, the data management may include bitstream receiving management, touch data management, keyboard and mouse event management, and touch area management. The bitstream receiving management can be configured to receive encoded data that is of the projection window and that is sent by the electronic device 100 to the electronic device 200. The touch data management can be configured to manage touch data of a user received by the electronic device 200. The keyboard and mouse event management can be configured to manage a keyboard and mouse event received by the electronic device 200 or a keyboard or mouse event sent by the electronic device 100 to the electronic device 200, for example, a touch area received by the electronic device 200.

As shown in FIG. 1, the electronic device 200 may include the driver layer, and the driver layer is a layer between hardware and software. The driver layer can be configured to: discover a device that can perform a projection connection (briefly referred to as device discovery), and drive authentication (briefly referred to as device authentication) and a connection (briefly referred to as device connection) between projection devices. The device discovery, the device authentication, the device connection, and the like may be completed by one driver at the driver layer, or may be completed by a plurality of drivers. This is not limited herein.

An example of the electronic device 100 includes but is not limited to an electronic device running iOS™, Android™, Microsoft™, HarmonyOS™, or another operating system. Optionally, the first electronic device 100 may be an electronic device like a mobile phone, a tablet computer, a personal digital assistant (PDA), or a desktop computer. The second electronic device 200 may be an electronic device like a television, a tablet computer, or a desktop computer. In some feasible implementations, the projection system in this application may further include a mouse. The mouse is configured to drag a projection window in the electronic device 100 to the electronic device 200.

It may be understood that the remote device in this embodiment of this application may be an electronic device that sends a projection window. In other words, in this embodiment of this application, an electronic device whose window is projected onto another device is referred to as a remote device, for example, the electronic device 100 shown in FIG. 1. The local device in this embodiment of this application may be an electronic device that receives a projection window sent by another electronic device and displays the projection window. In other words, in this embodiment of this application, an electronic device that can display content projected by another electronic device is referred to as the local device, for example, the electronic device 200 shown in FIG. 1.

Figure 2:
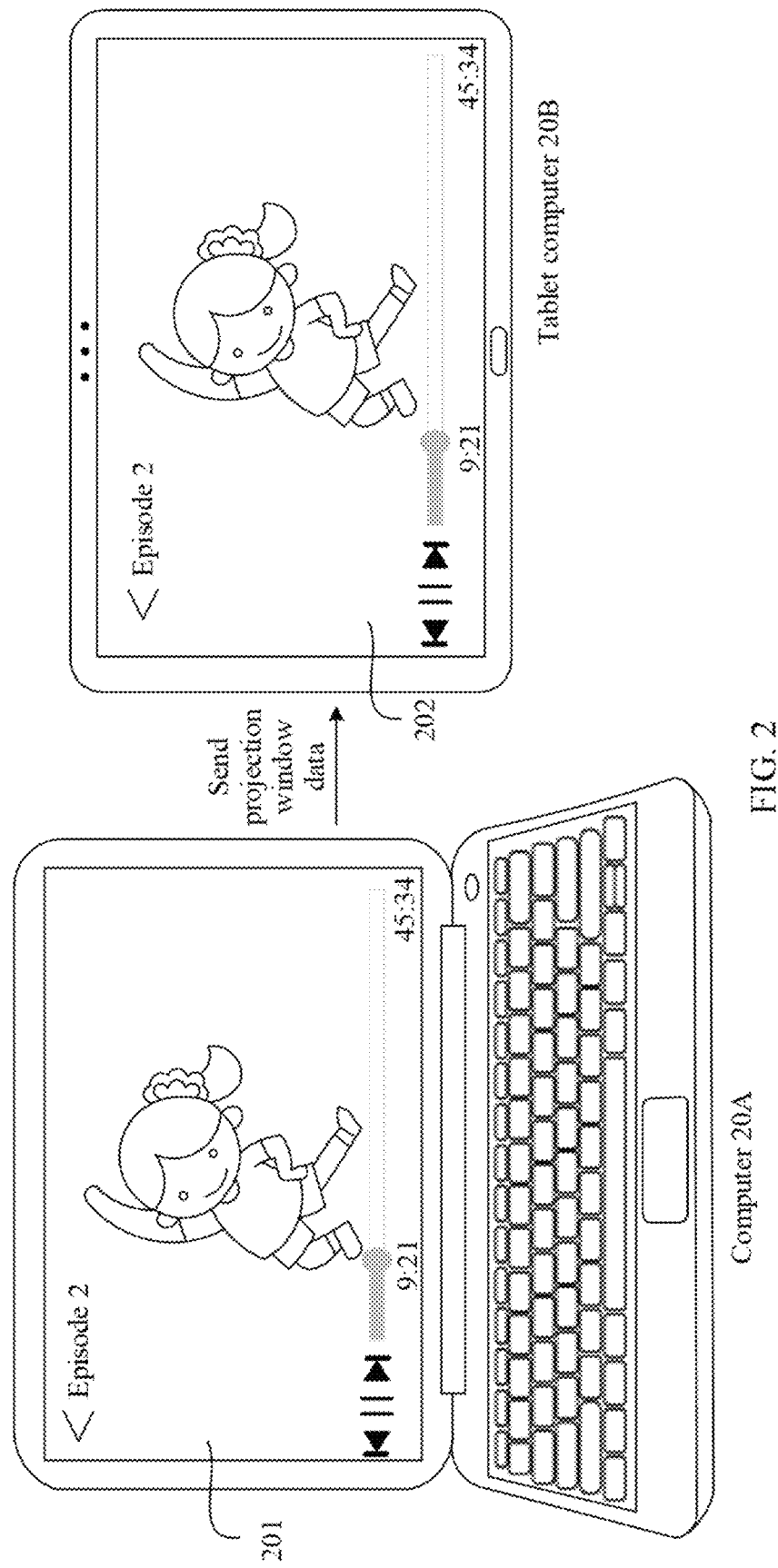
FIG. 2 is a diagram of a projection interface according to an embodiment of this application.

In some embodiments, the remote device may project content displayed on the remote device onto the local device. The local device can display the content projected by the remote device in full screen. As shown in FIG. 2, a computer 20A may project the played video to a tablet computer 20B, and the tablet computer 20B may display, in real time, the video projected by the computer 20A. However, the video projected by the computer 20A is displayed in full screen on the tablet computer 20B. In this way, when the user wants to operate an application on the tablet computer 20B, the user needs to first hide the projection content displayed on the tablet computer 20B, and then find the to-be-operated application, causing cumbersome operations and poor user experience.

Figure 3A:
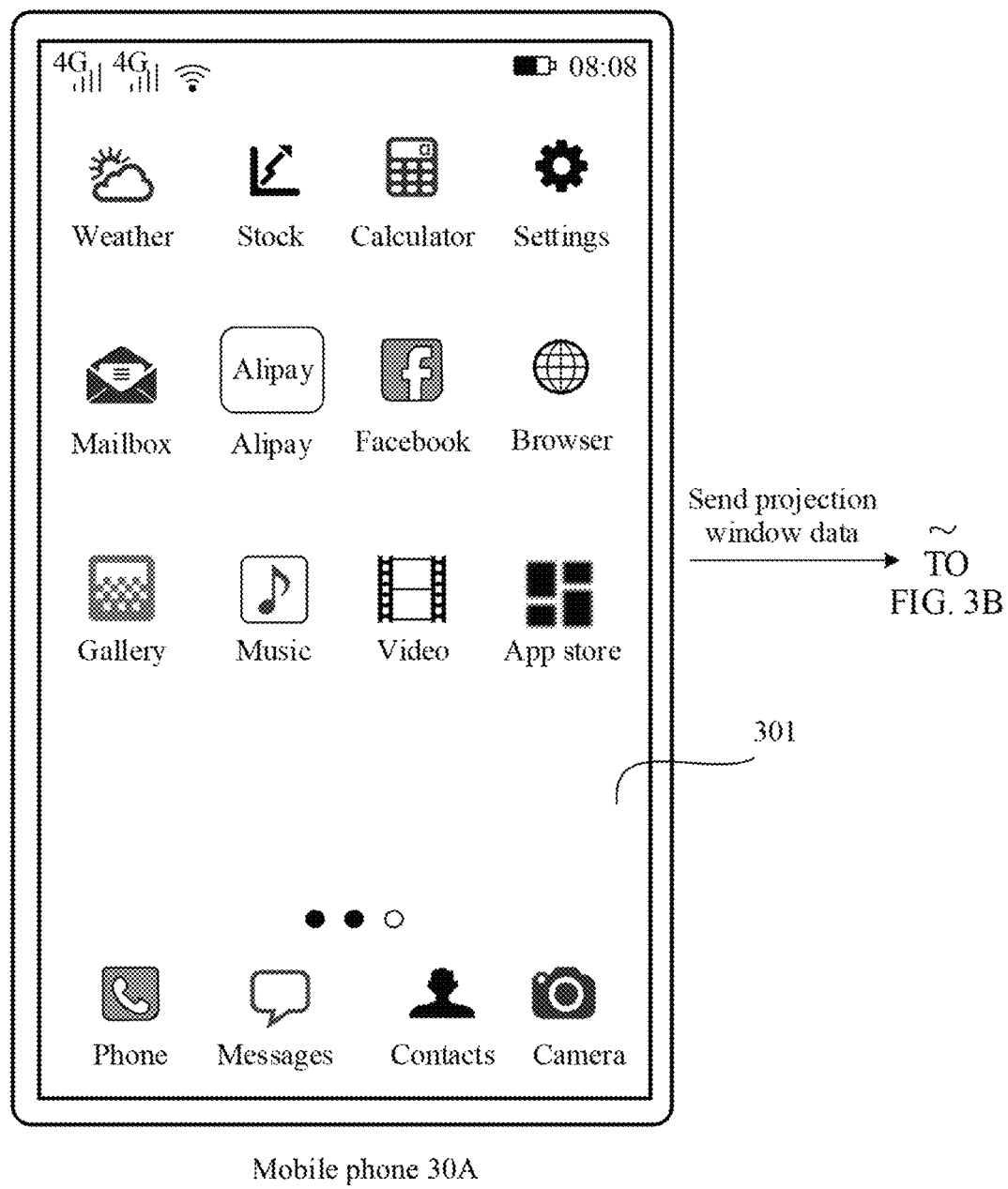
FIG. 3A and FIG. 3B are diagrams of a projection interface according to an embodiment of this application.
Figure 3B:
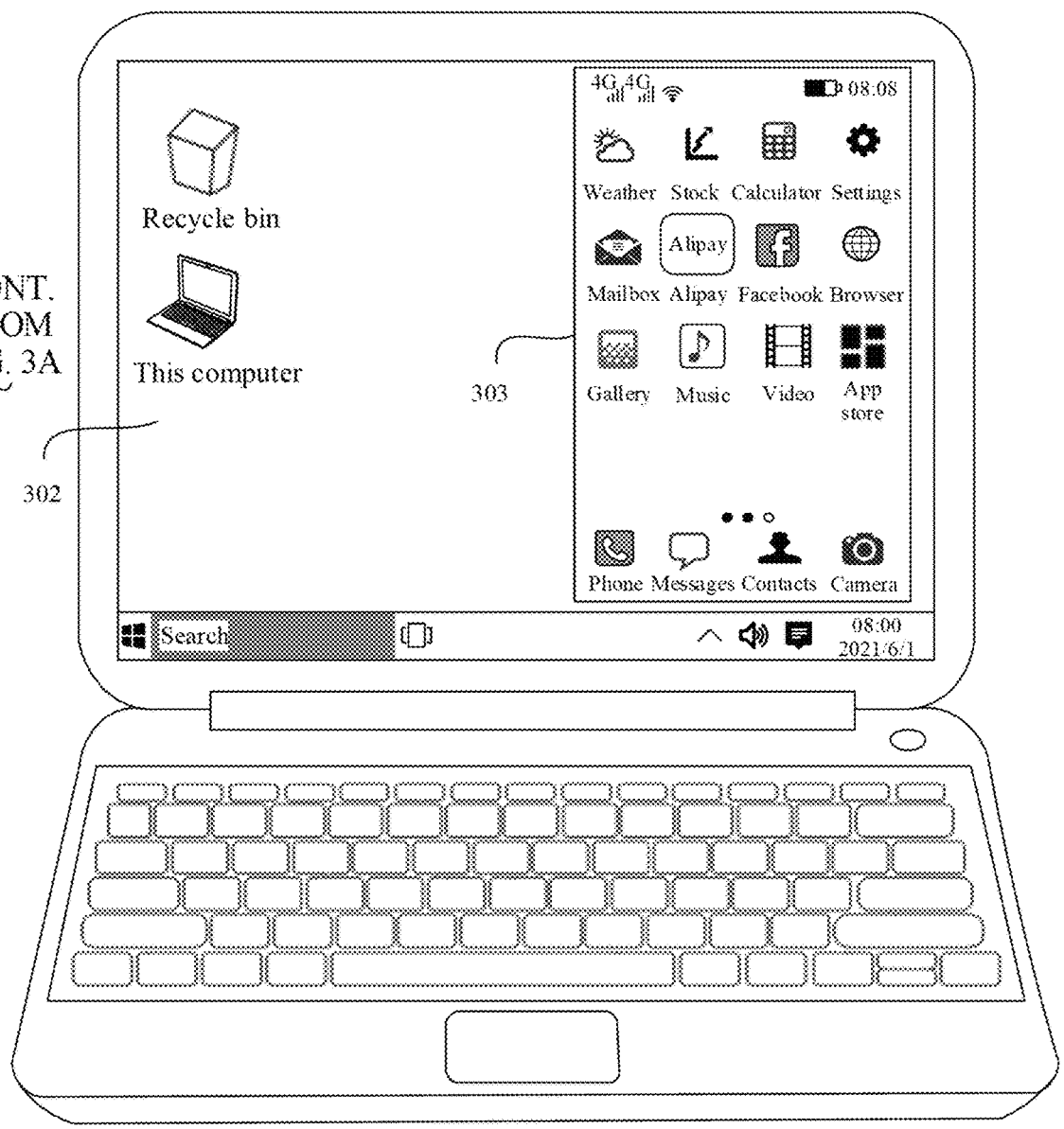

In some embodiments, the remote device may project a window of an application onto the local device, and the local device may display the projection window in full screen or in a window. As shown in FIG. 3A and FIG. 3B, a mobile phone 30A may project an application interface 301 (a projection window) onto a computer 30B, and the projection window (namely, the window 301) may be displayed on a user interface 302 of the computer 30B. When the projection window of the mobile phone 30A is projected onto the computer 30B, the user needs to find and open the projection window in the mobile phone, and establish a connection to the computer 30B. After projection is started, the projection window may be displayed on the computer 30B. When the user needs to return the projection window from the computer 30B to the mobile phone 30A, the user needs to search for the projection window in the mobile phone 30A and close the projection window. In this way, operations of dragging the projection window in the remote device to the local device and dragging the projection window in the local device to the remote device are complex, and user experience is poor.

To simplify projection operations and improve user experience, embodiments of this application provide a projection method and an electronic device. In the projection method provided in this embodiment of this application, a user can drag a projection window in a remote device to a local device. For example, the user may drag the projection window in the remote device to the local device by using a mouse. The user may drag the projection window from the local device to the remote device. The user may adjust, on the local device, a size of the projection window displayed on the local device.

The following describes in detail the projection method provided in this embodiment of this application with reference to the accompanying drawings. In this application, an example in which the remote device is a computer and the local device is a tablet computer is used for description. FIG. 4A to FIG. 11B are diagrams of interfaces on which a projection window in a computer 400 is projected onto a tablet computer 500.

Figure 4A:
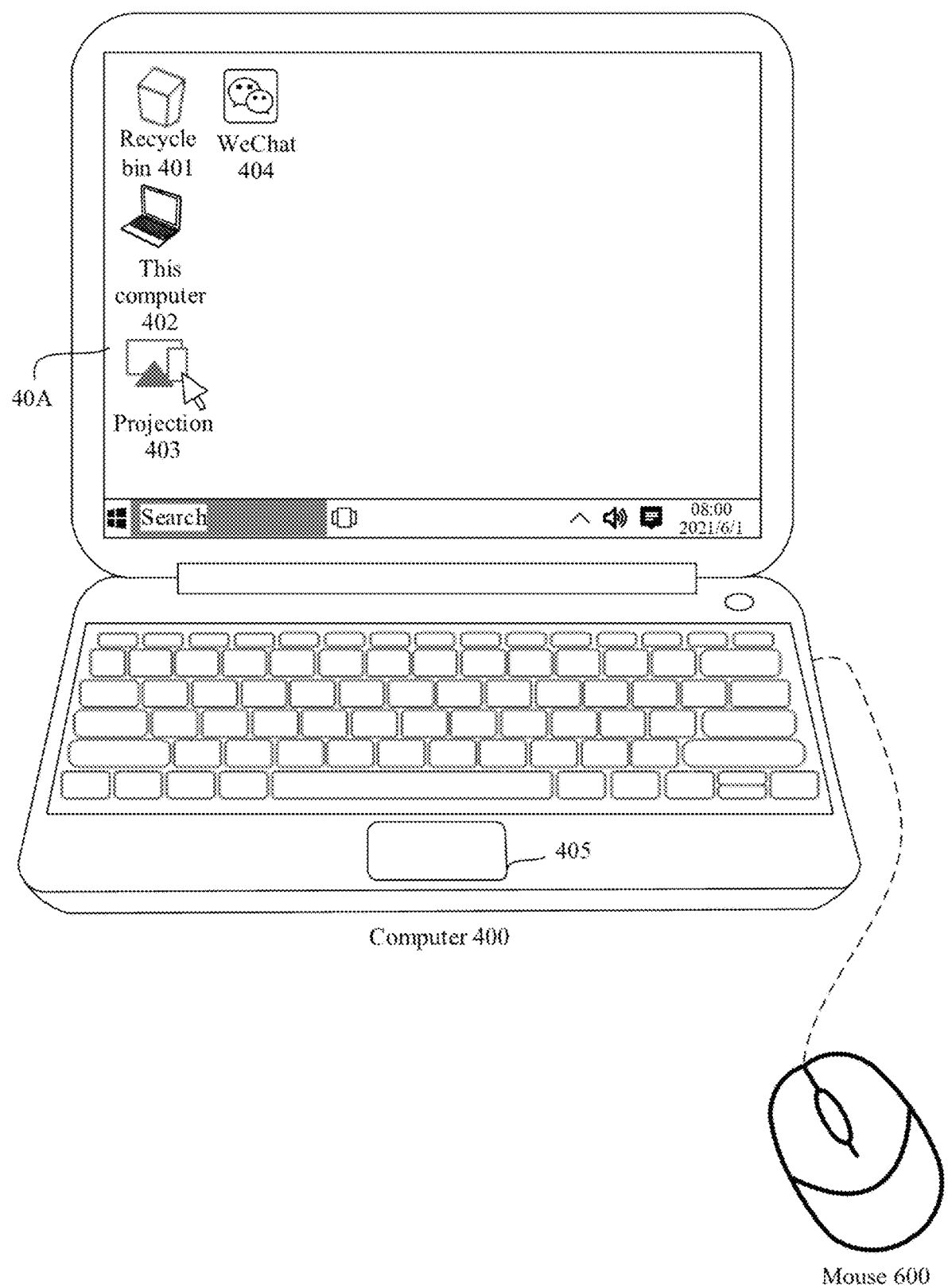
FIG. 4A to FIG. 12B are diagrams of interfaces of a remote device and a local device in a projection process according to an embodiment of this application.
Figure 4B:
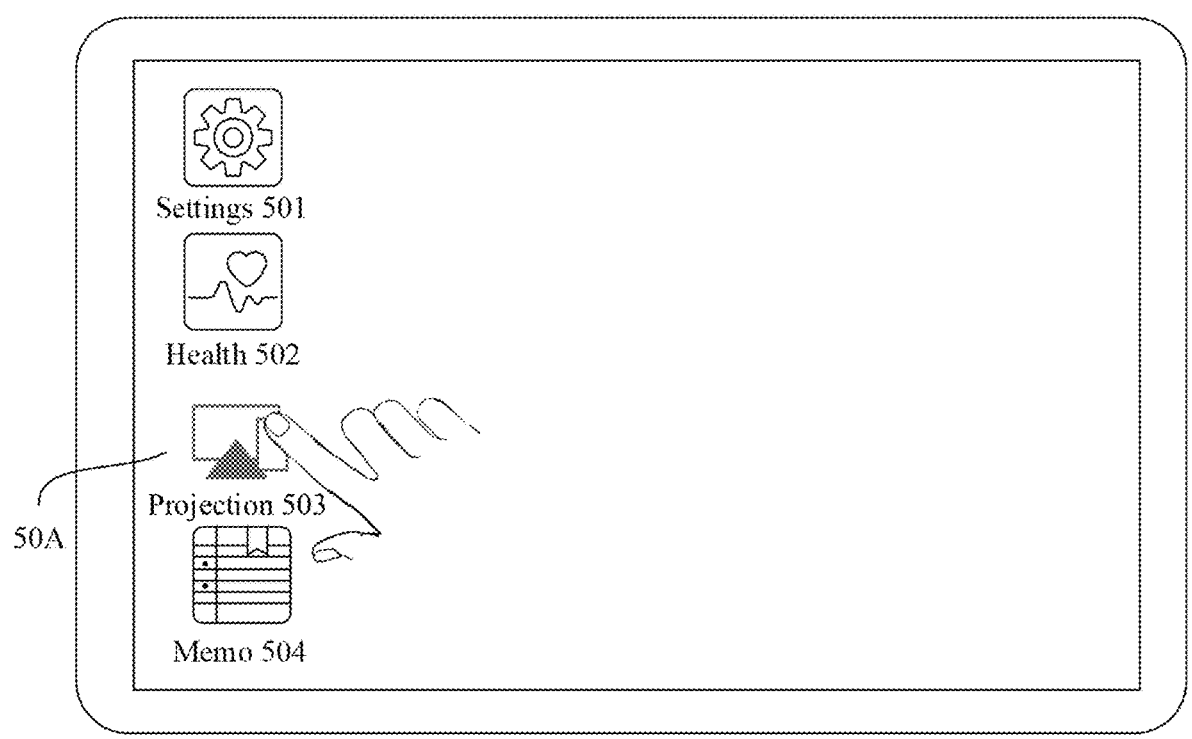

The computer 400 and the tablet computer 500 are shown in FIG. 4A and FIG. 4B. It may be understood that a communication connection may be established between the computer 400 and the tablet computer 500. The computer 400 may display a user interface 40A. Icons of some applications, for example, an icon of a Recycle bin 401, an icon of this computer 402, an icon of Projection 403, and an icon of WeChat 404, may be displayed on the user interface 40A. The computer 400 may implement a projection sending capability through Projection 403. There may be a touch area 405A in the computer 400. Optionally, the computer 400 may be connected to a mouse 600.

As shown in FIG. 4B, the tablet computer 500 may display a user interface 50A. Icons of some applications, for example, an icon of Settings 501, an icon of Health 502, an icon of Projection 503, and an icon of Memo 504, may be displayed on the user interface 50A. The tablet computer 500 may implement a projection receiving capability through Projection 503.

It may be understood that content displayed on the user interface 40A of the computer 400 may not be limited to content shown in FIG. 4A. Content displayed on the user interface 50A of the tablet computer 500 may not be limited to the content shown in FIG. 4B.

Optionally, the computer 400 may alternatively implement a projection sending capability by using a projection control. The tablet computer 500 may alternatively implement a projection receiving capability by using a projection control.

The user may enable a projection function (namely, a projection sending function and/or a projection receiving function) of the computer 400 and the tablet computer 500. For example, the user may open Projection 403 in the computer 400 and Projection 503 in the tablet computer 500.

The user may select a projection receiving device in the computer 400. After the user taps the icon of Projection 403 on the user interface 40A, the computer 400 may display a window for selecting a projection receiving device.

Figure 5:
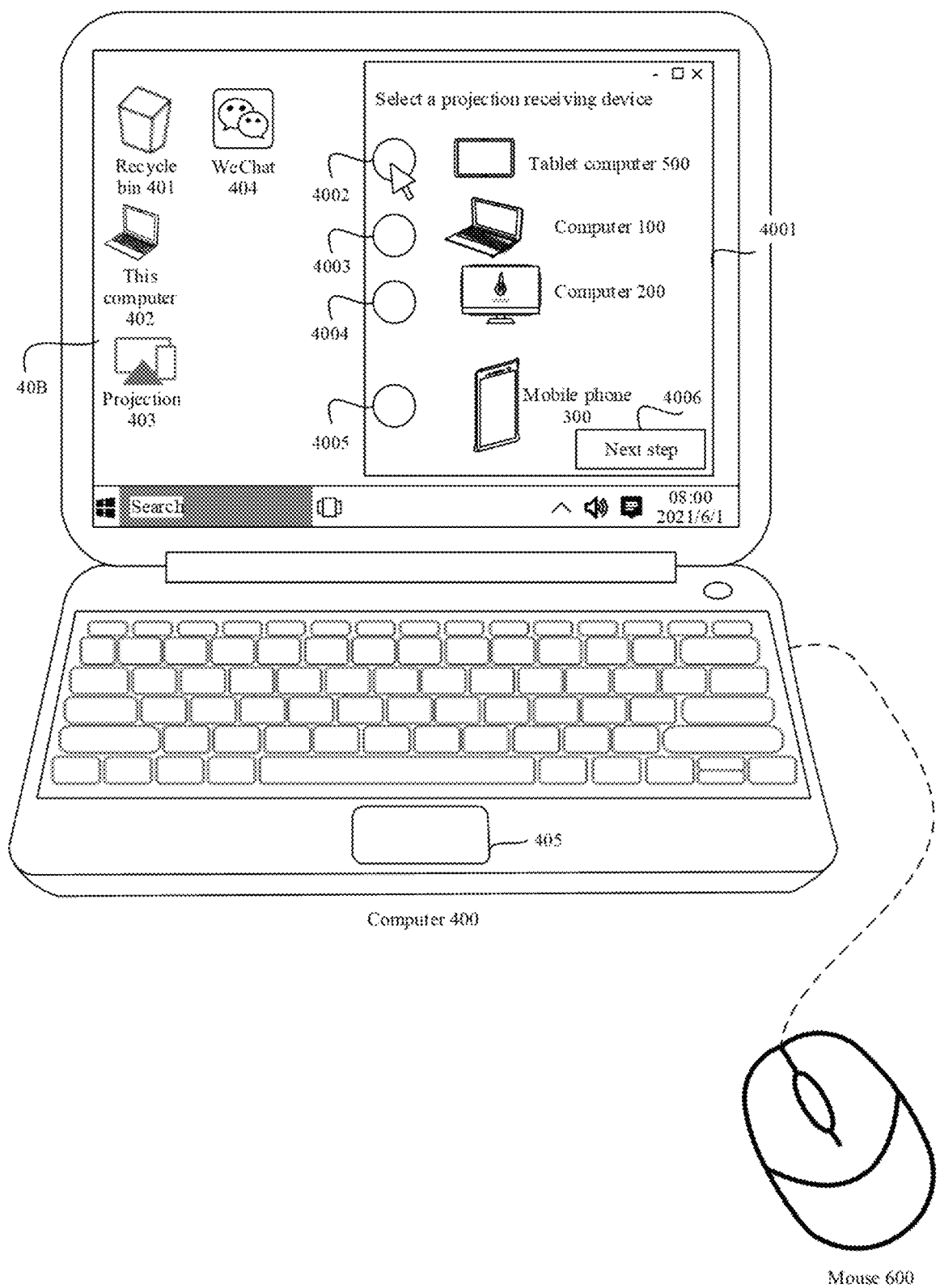

As shown in FIG. 5, the computer 400 may display a user interface 40B, and a window 4001 may be displayed on the user interface 40B. The window 4001 is used to select a projection receiving device. For example, there may be one or more projection receiving devices in the window 4001, for example, the tablet computer 500, a computer 100, a computer 200, and a mobile phone 300.

The user may select one or more devices from the window 4001 as the projection receiving device of the computer 400. The user may select the tablet computer 500 as the projection receiving device by tapping a control 4002. The user may select the computer 100 as the projection receiving device by tapping a control 4003. The user may select the computer 200 as the projection receiving device by tapping a control 4004. The user may select the mobile phone 300 as the projection receiving device by tapping a control 4005. The following uses an example in which the user selects the tablet computer 500 as the projection receiving device for description.

It may be understood that the window 4001 shown in FIG. 5 and used for selecting the projection receiving device is merely an example. A shape of a window for selecting a projection receiving device and content (for example, a control, a text, and an icon) included in the window are not limited in embodiments of this application.

Optionally, after the user selects a projection receiving device, the user may further set a relative location between the remote device and the local device in a projection application (namely, Projection 403) of the computer 400. The user may determine, by setting the relative location between the remote device and the local device, a direction in which the projection window is dragged. For example, if the user sets the tablet computer 500 to be on the right of the computer 400, the user may drag the projection window in the computer 400 rightward to the tablet computer 500. If the user sets the tablet computer 500 to be above the computer 400, the user may drag the projection window in the computer 400 upward to the tablet computer 500.

Figure 6:
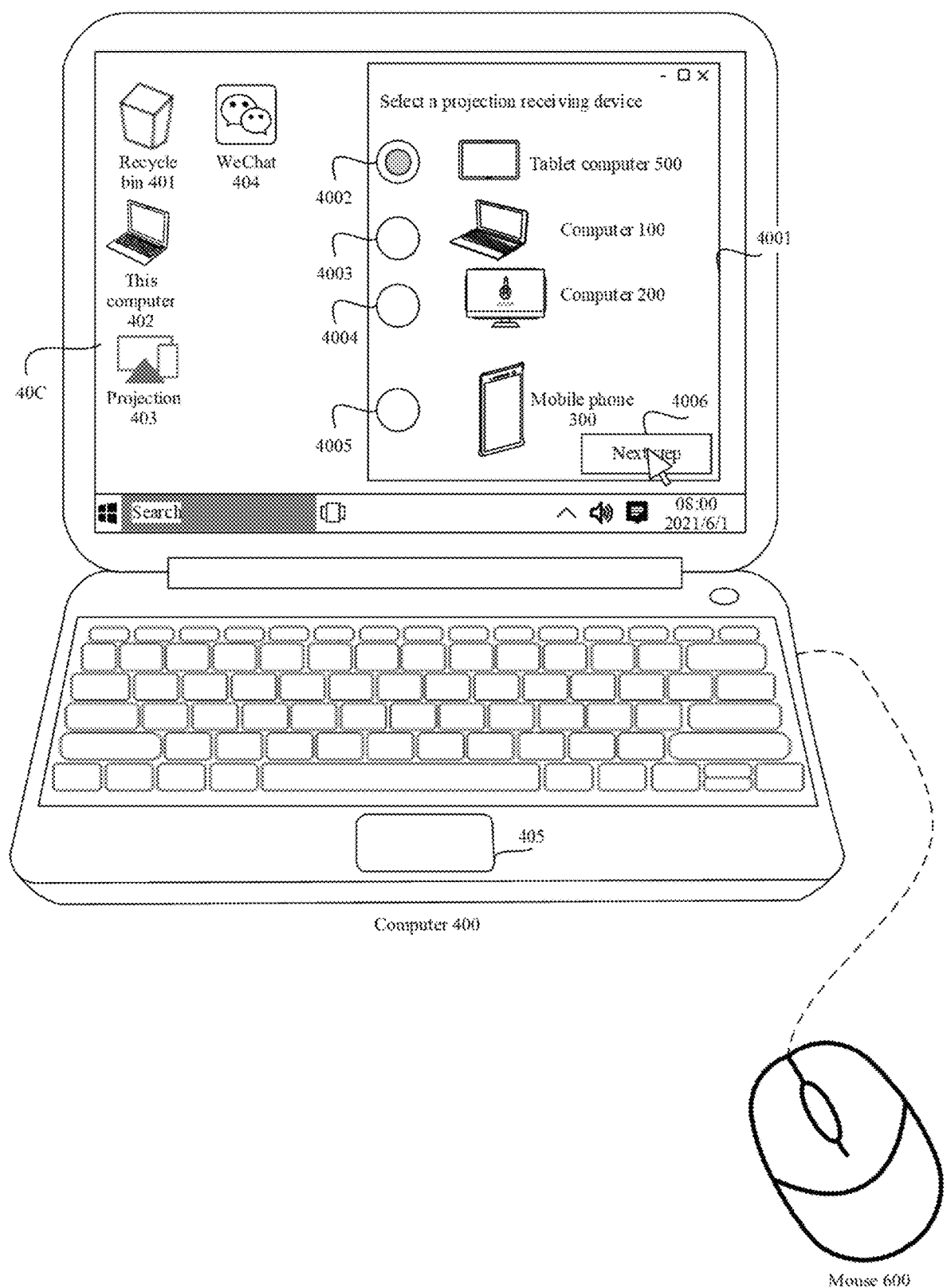

As shown in FIG. 6, a user interface 40C may be displayed on the computer 400. The window 4001 may be displayed on the user interface 40C. The user has selected the tablet computer 500 as the projection receiving device. The user may tap a control 4006, and in response to the user operation, the computer 400 may display a window for setting the relative location between the remote device and the local device.

It may be understood that the user may select the projection receiving device and tap the control 4006 by using the mouse 600. Alternatively, the user may select the projection receiving device and tap the control 4006 through the touch area 405.

Figure 7:
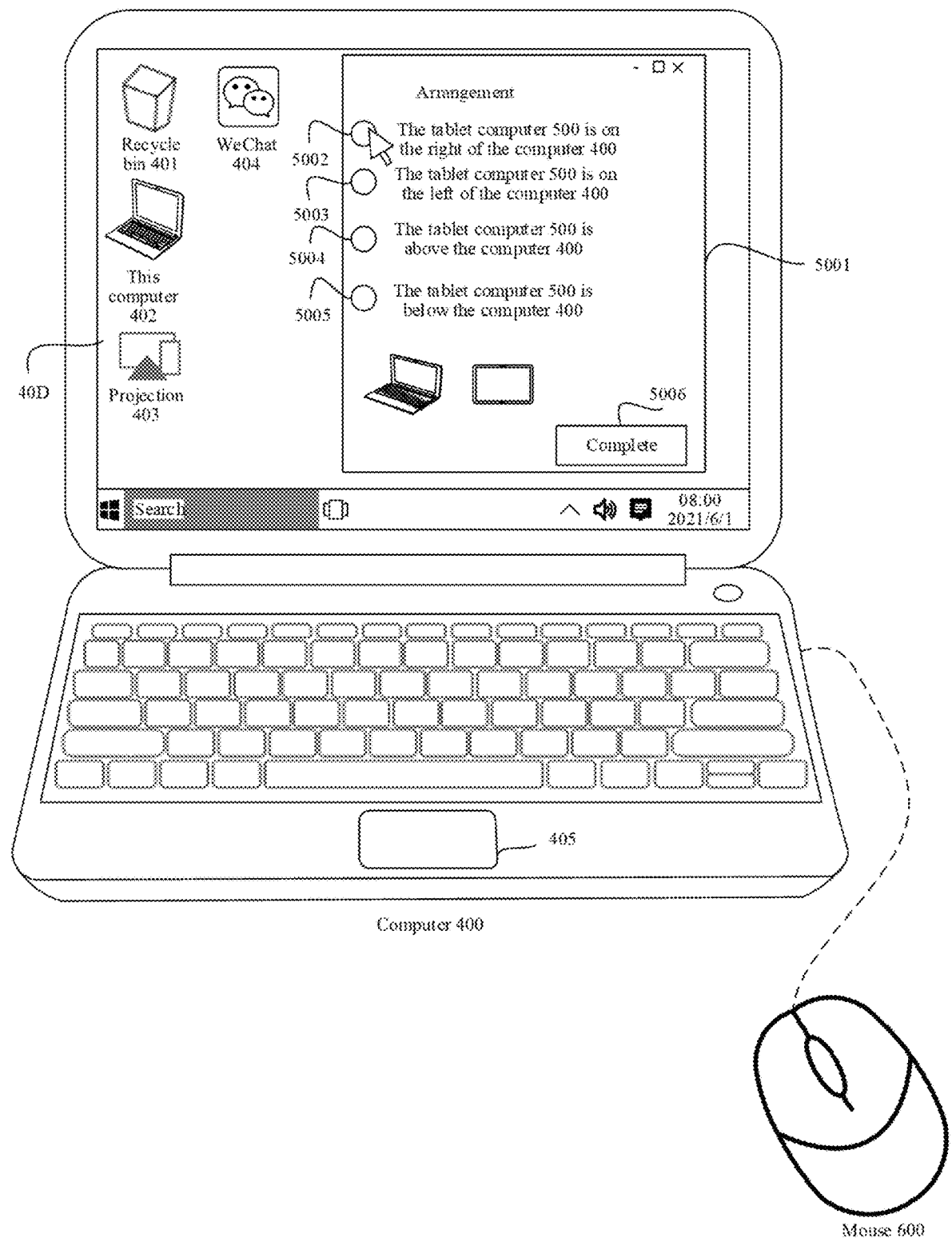

As shown in FIG. 7, the computer 400 may display a user interface 40D. The user interface 40D may have a window 5001 for setting the remote device and the local device. For example, the user may choose to place the tablet computer 500 on the right of the computer 400 by tapping a control 5002. Alternatively, the user may place the tablet computer 500 on the left of the computer 400 by tapping a control 5003. Alternatively, the user may place the tablet computer 500 above the computer 400 by tapping a control 5004. Alternatively, the user may place the tablet computer 500 below the computer 400 by tapping a control 5005. The following uses an example in which the user chooses to place the tablet computer 500 on the right of the computer 400 for description.

It may be understood that, the user sets the relative location between the remote device and the local device in the window 5001. Actual locations of the remote device and the local device may be different from the relative location that is set by the user. For example, the user chooses to place the tablet computer 500 on the right of the computer 400. The tablet computer 500 may be actually placed on the left of, above, or below the computer 400.

Figure 8:
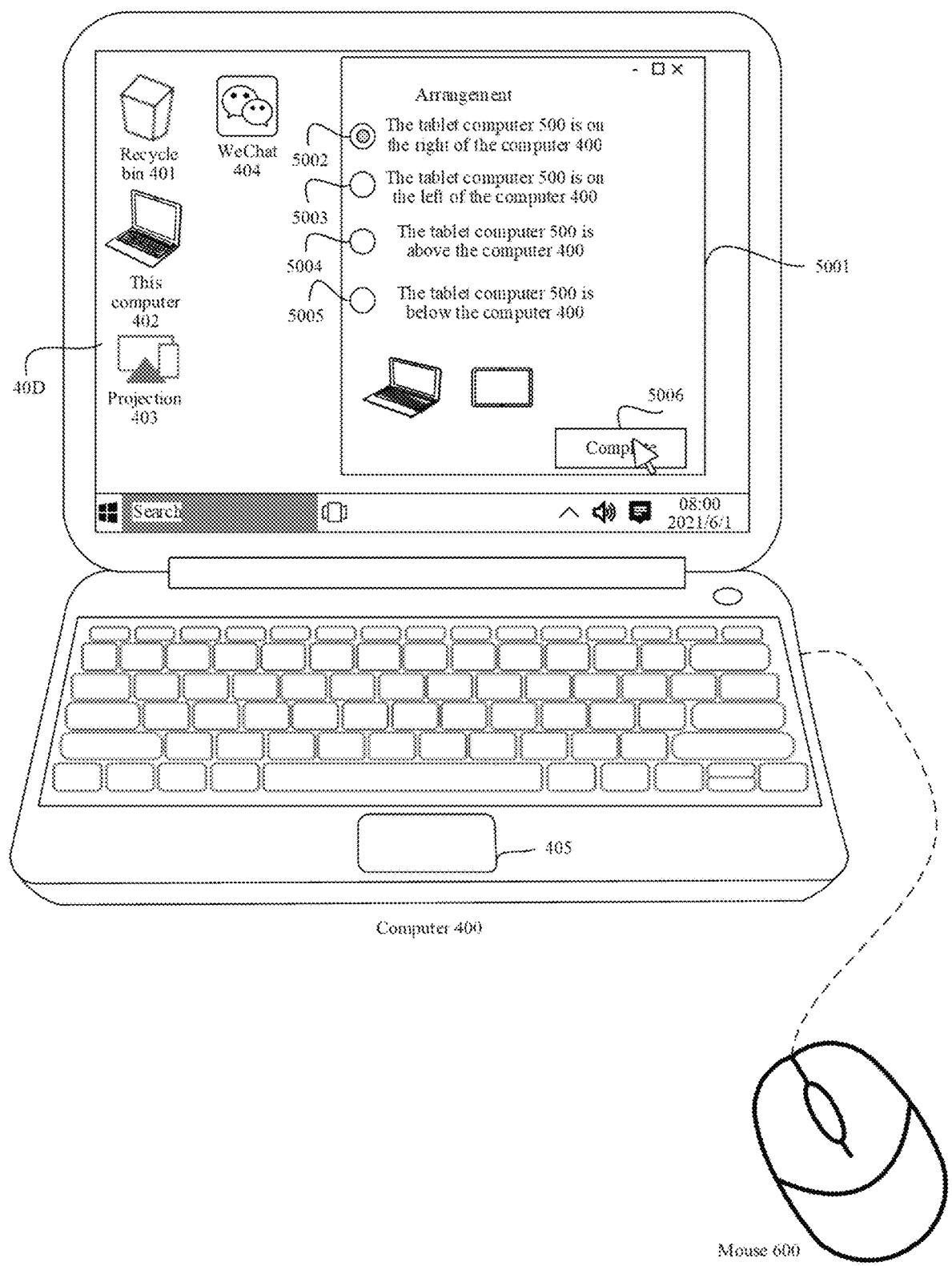

As shown in FIG. 8, the computer 400 may display the user interface 40D. After selecting a relative location between the tablet computer 500 and the computer 400 in the window 5001 on the user interface 40D, the user may tap a control 5006 for indicating complete setting. After detecting that the user taps the control 5006, the computer 400 may display a user interface 40E.

It may be understood that the window 5001 shown in FIG. 7 and FIG. 8 and used for setting the relative location between the remote device and the local device is merely an example. A shape of the window for setting the relative location between the remote device and the local device and content in the window are not limited in embodiments of this application.

Figure 9:
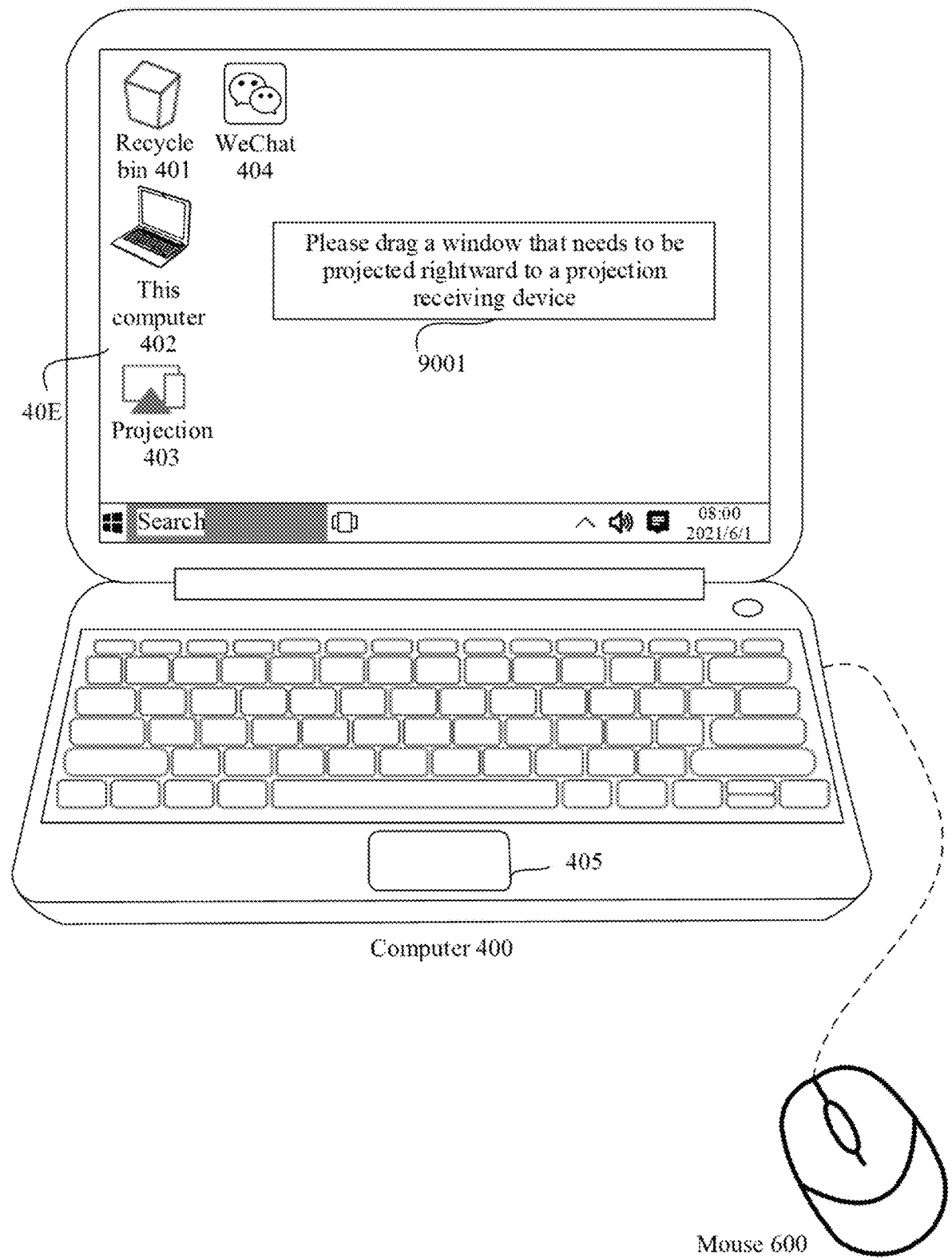

As shown in FIG. 9, the computer 400 may display the user interface 40E. A prompt box 9001 may be displayed on the user interface 40E. The prompt box 9001 is used to give the user a prompt of projecting the projection window in the computer 400 onto the tablet computer 500. For example, the prompt box 9001 may include a prompt text "Please drag a window that needs to be projected rightward to a projection receiving device".

It may be understood that a shape of the prompt box 9001 and content of the prompt box 9001 are not limited in embodiments of this application.

After the user selects the projection receiving device (which may also be referred to as the local device), the user may project the projection window in the remote device onto the local device. For example, the user may drag the projection window in the computer 400 rightward to the tablet computer 500.

Figure 10A:
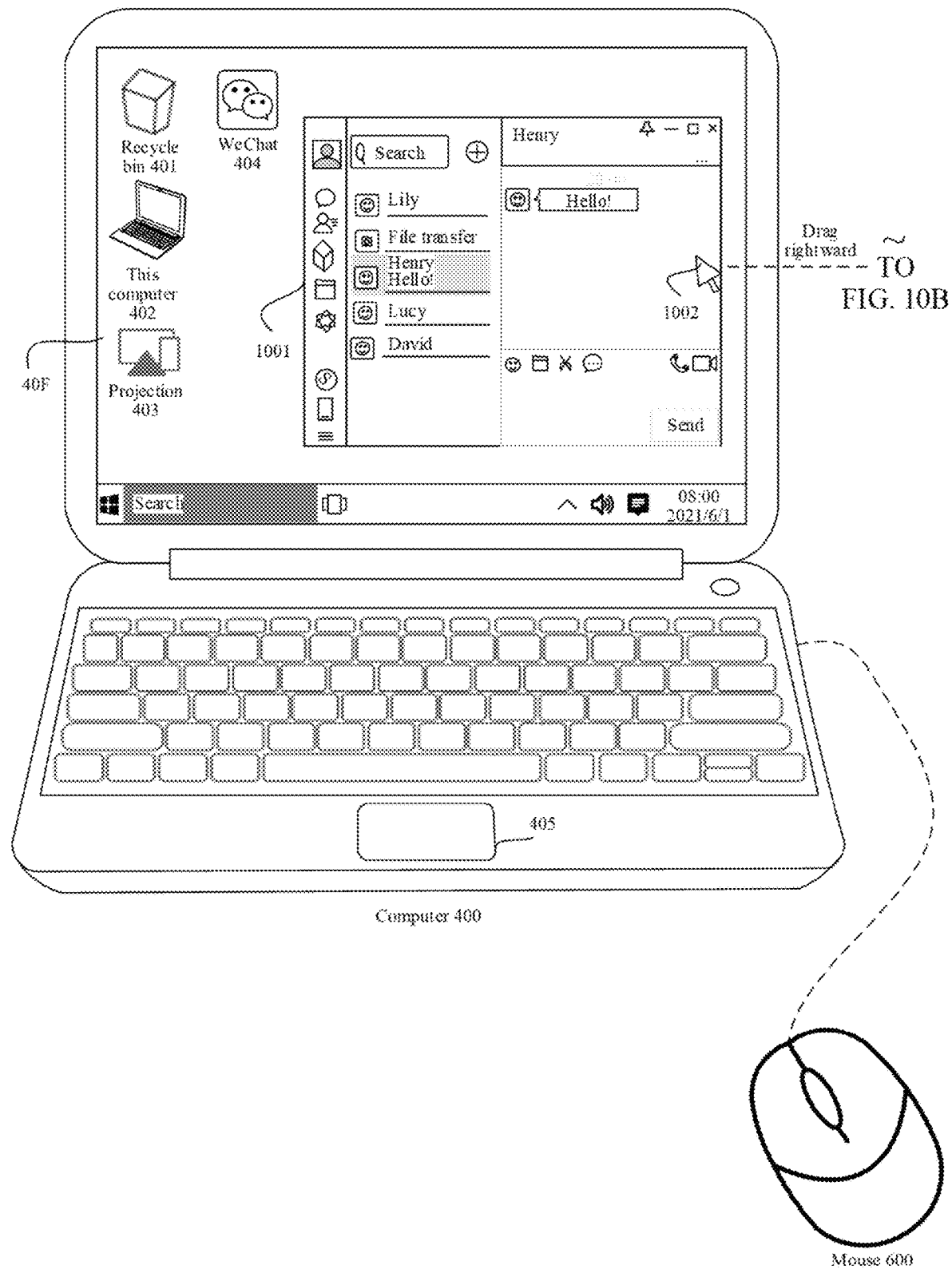
Figure 10B:
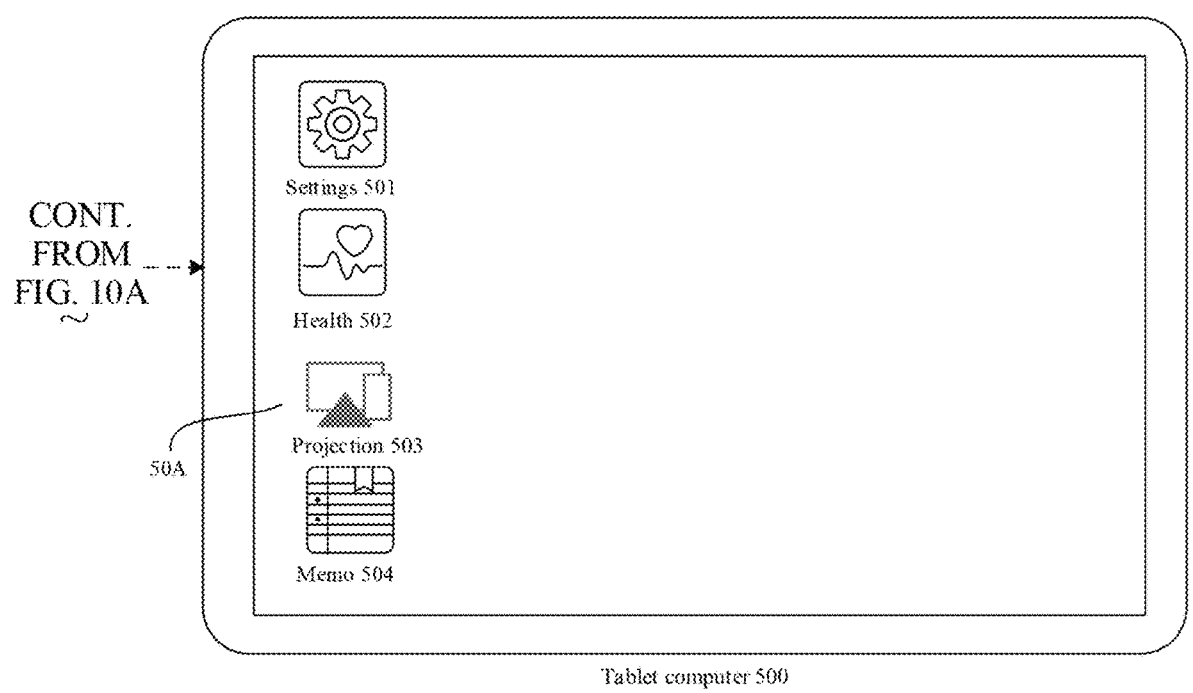

As shown in FIG. 10A and FIG. 10B, the computer 400 may display a user interface 40F. The user interface 40F may include a window 1001. The user may project a window onto the tablet computer 500 in a rightward dragging manner. For example, the user drags the window 1001 rightward by using a mouse pointer 1002.

It may be understood that, as shown in FIG. 10A and FIG. 10B, when setting the relative location between the computer 400 and the tablet computer 500, the user chooses to place the tablet computer 500 on the right of the computer 400. However, the tablet computer 500 may be placed, for example, on the right of, on the left of, above, or below the computer 400. This is not limited in embodiments of this application.

After the user drags a window 1101 rightward to a display of the computer 400, the user continues to drag the window 1101 rightward, and the window 1101 may be gradually displayed on the tablet computer 500.

Figure 11A:
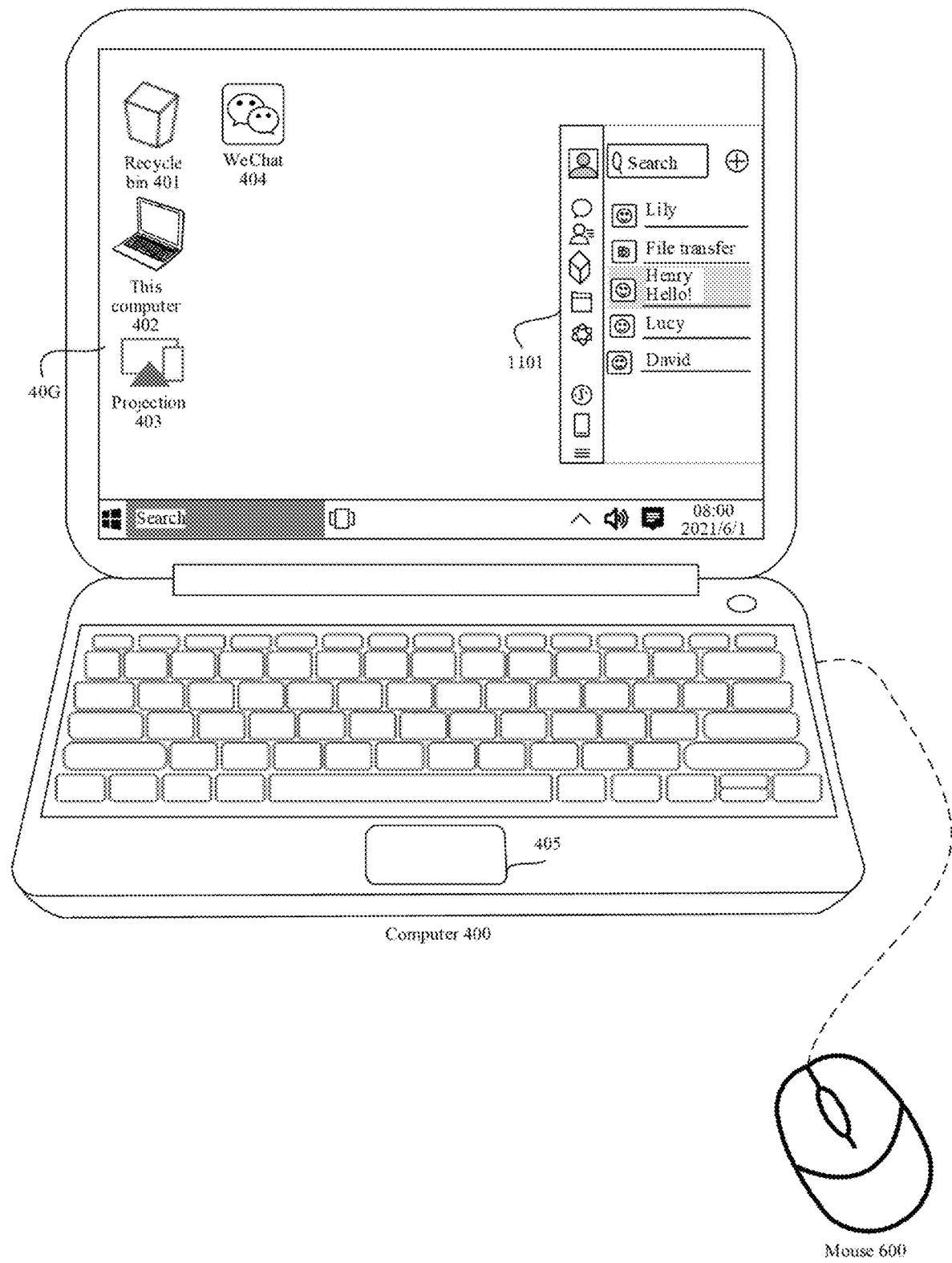
Figure 11B:
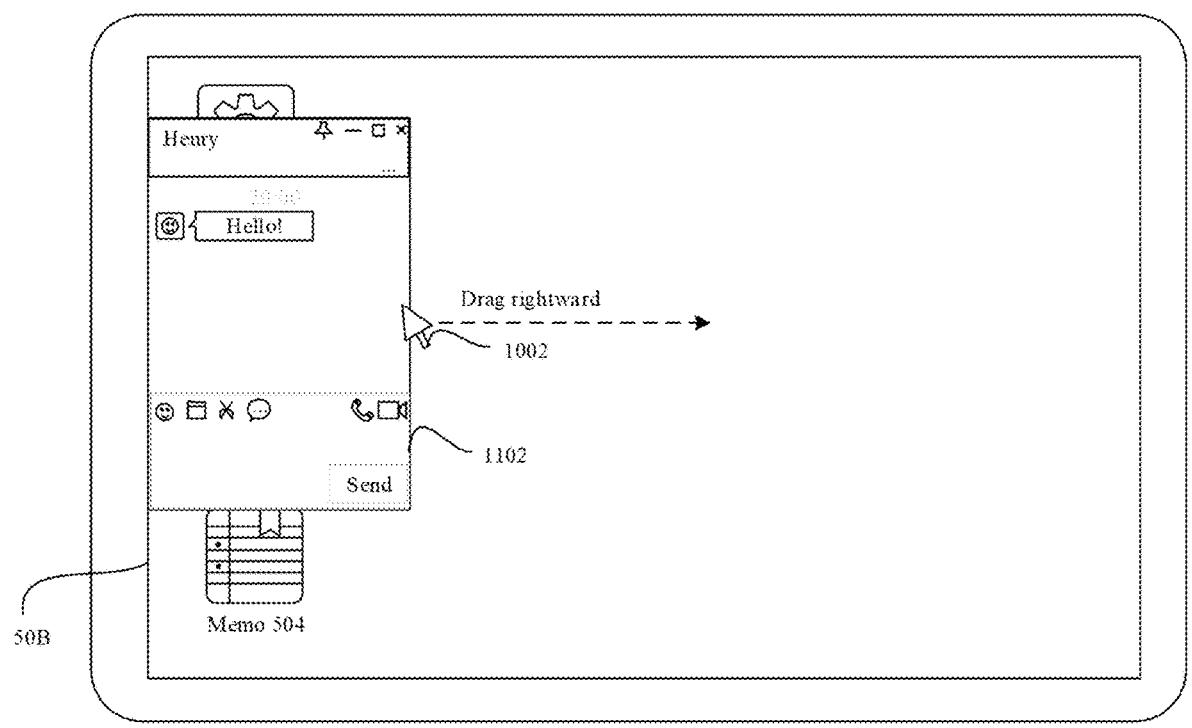

As shown in FIG. 11A and FIG. 11B, the computer 400 may display a user interface 40G. The user interface 40G may have the window 1101. The window 1101 is a part of the window 1001 in FIG. 10A. A user interface 50B may be displayed on the tablet computer 500. A window 1102 and the mouse pointer 1002 are displayed on the user interface 50B. The window 1102 is another part of the window 1001 in FIG. 10A. In other words, a part of the window 1001 in FIG. 10A is displayed on the computer 400, and the other part is displayed on the tablet computer 500. The mouse pointer 1002 is moved from the computer 400 to the tablet computer 500. The user may continue to drag the window 1102 rightward by using the mouse pointer 1002.

The user may continue to drag the projection window rightward until the projection window is completely displayed on the projection receiving device.

Figure 12A:
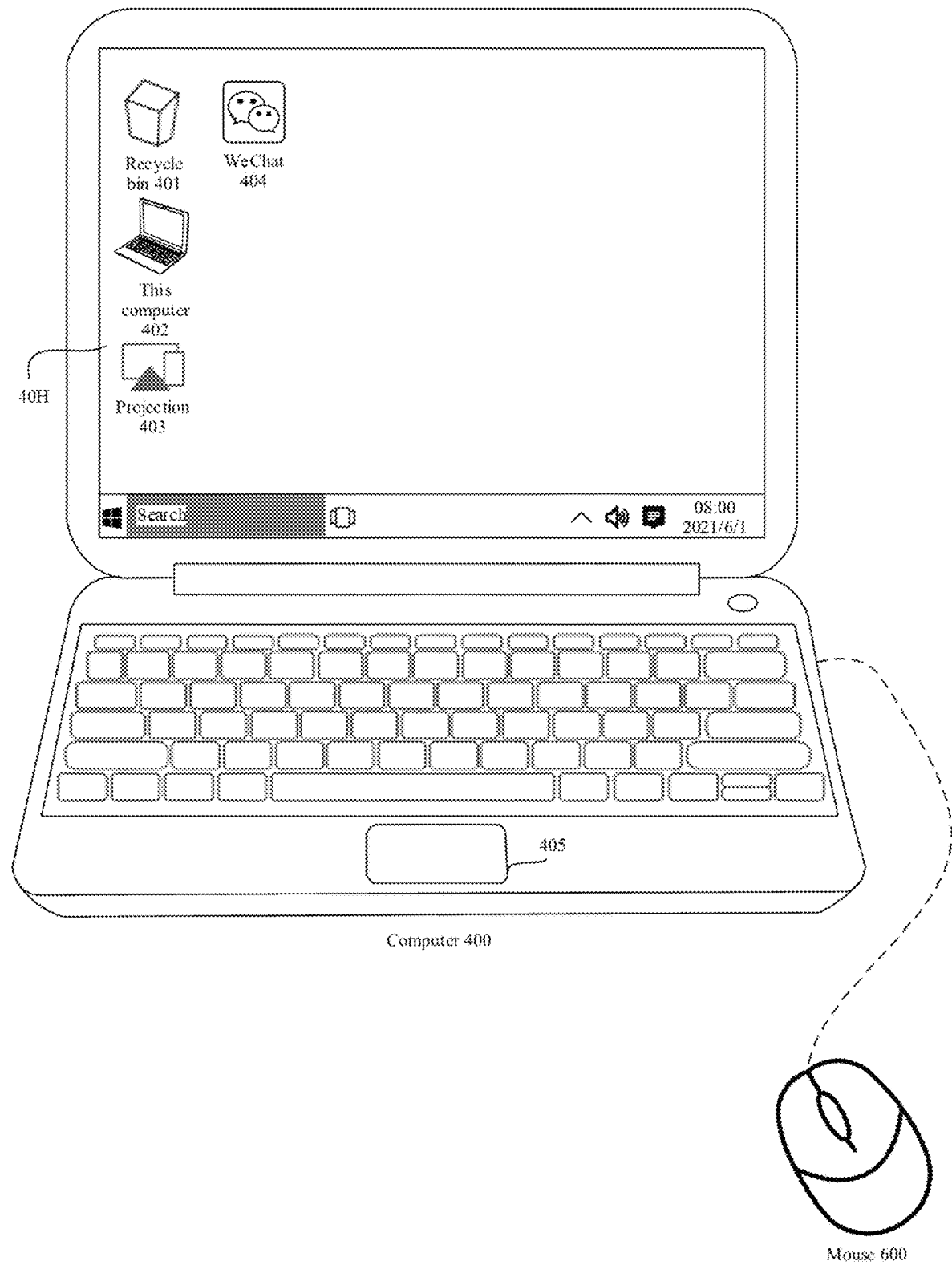
Figure 12B:
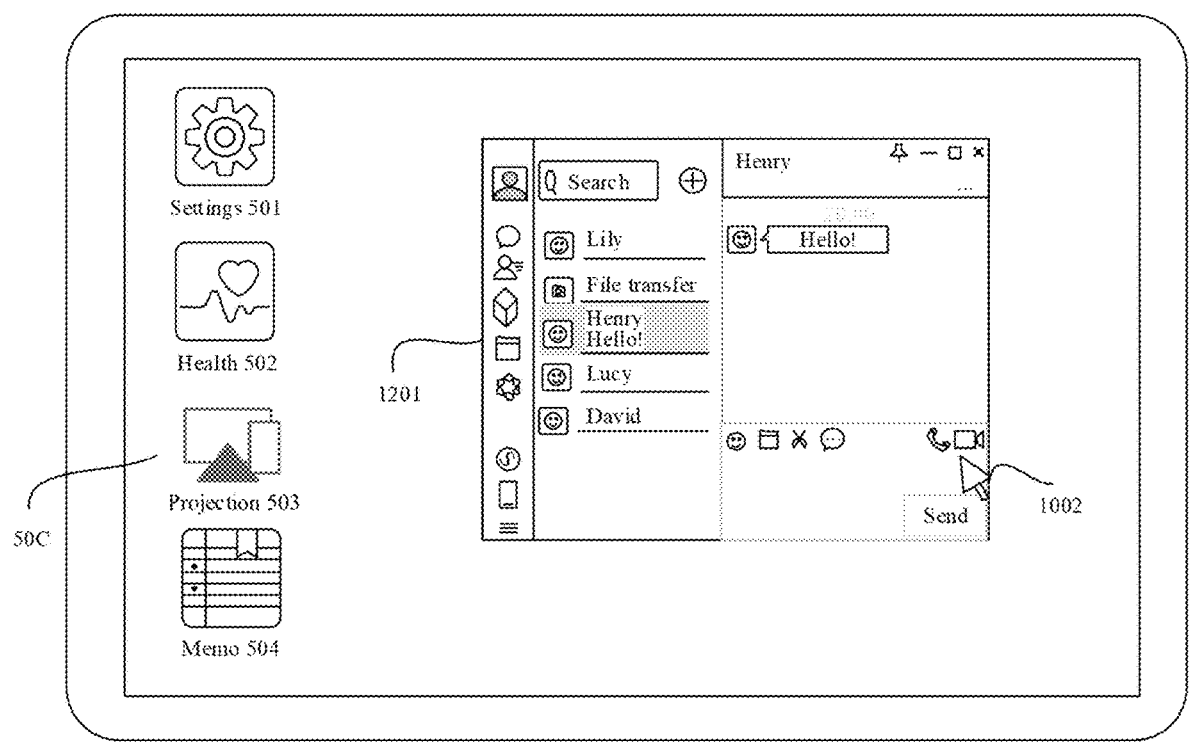

As shown in FIG. 12A and FIG. 12B, the computer 400 may display a user interface 40H, and the tablet computer 500 may display a user interface 50C. The projection window on the computer 400 has been completely displayed on the tablet computer 500. A window 1201 displayed on the tablet computer 500 is the projection window in the tablet computer 400.

Further, in an implementation, the user may drag the window 1201 back to the computer 400.

In some embodiments, the computer 400 may establish a projection connection to a plurality of devices, and send a projection window to the plurality of devices.

Figures 1, 13A:
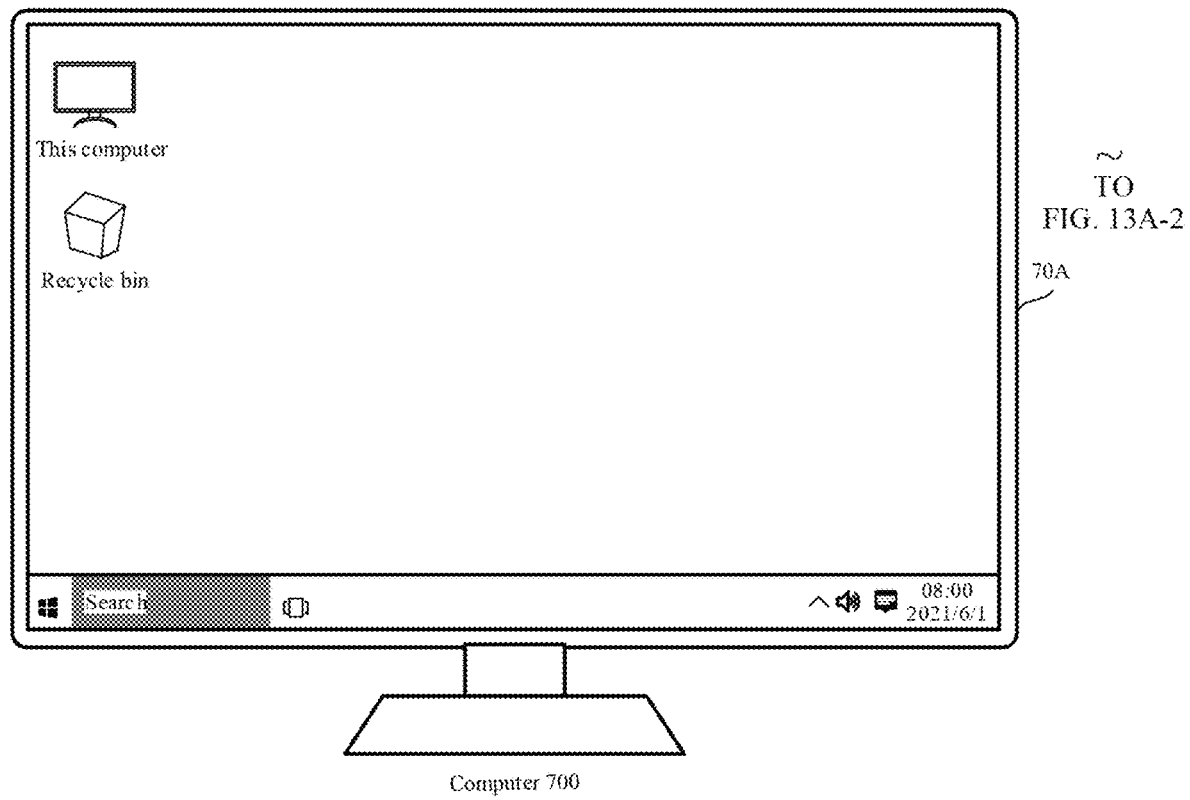
Figures 2, 13A:
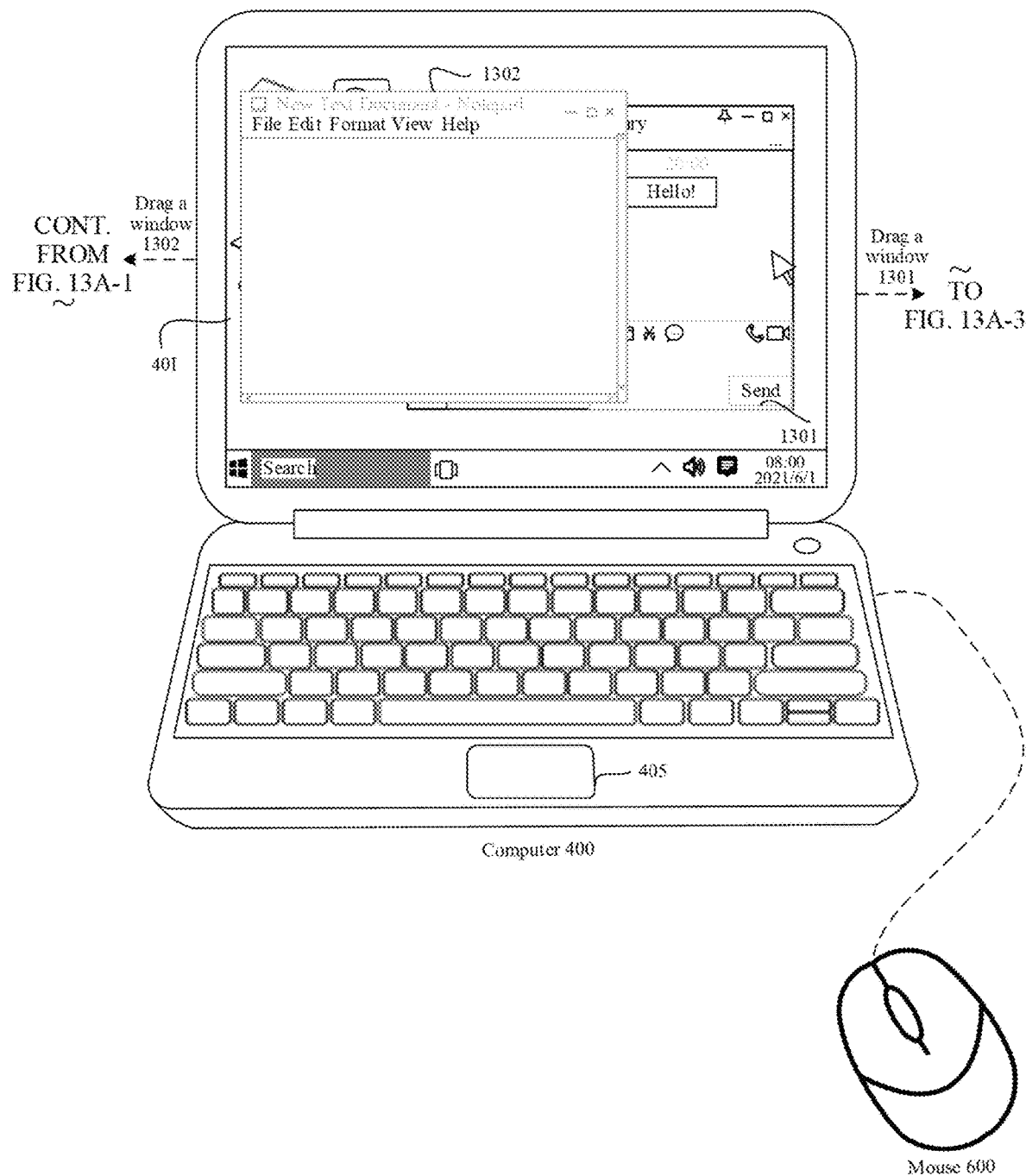
Figures 3, 13A:
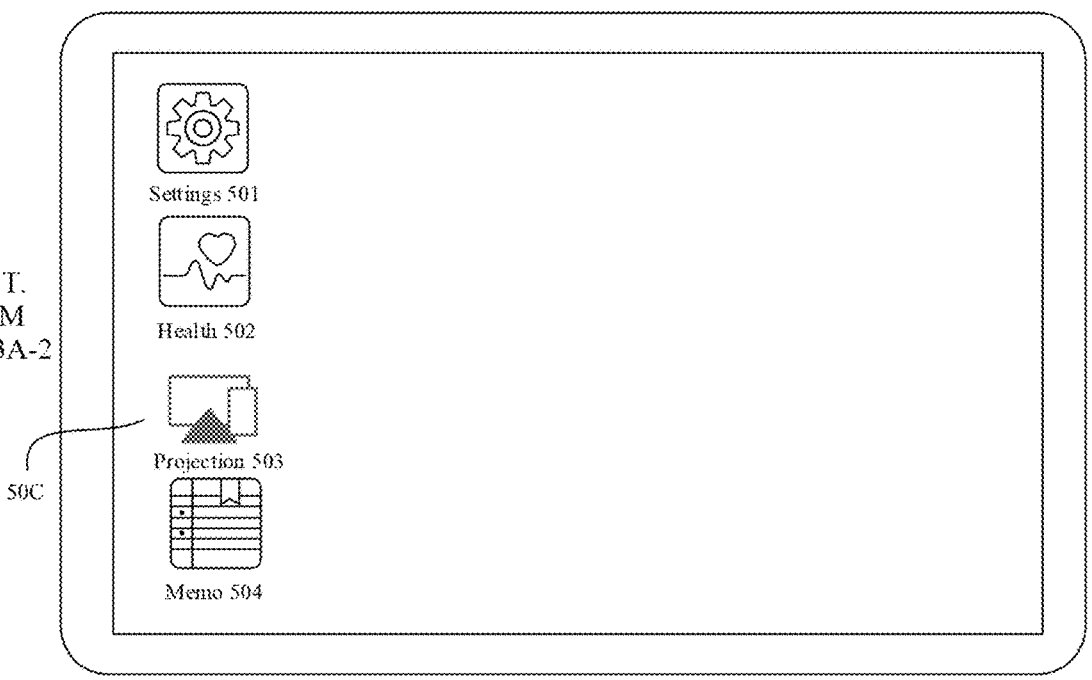

For example, as shown in FIG. 13A-1 to FIG. 13A-3, the computer 400 may project the projection window onto the tablet computer 500, or may project the projection window onto a computer 700. The computer 400 may display a window 1301 and a window 1302. The user may drag the window 1302 rightward to the tablet computer 500, or may drag the window leftward to the computer 700.

Figures 1, 13B:
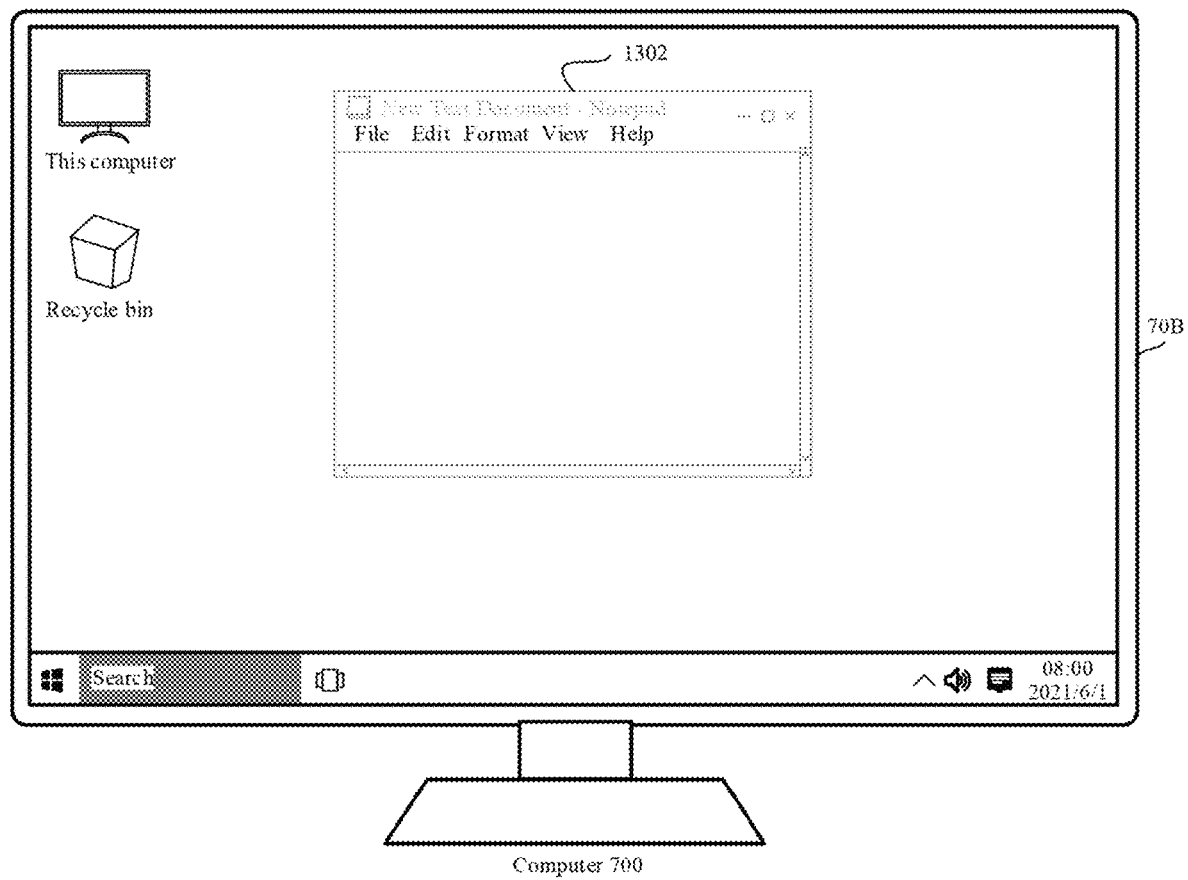
Figures 2, 13B:
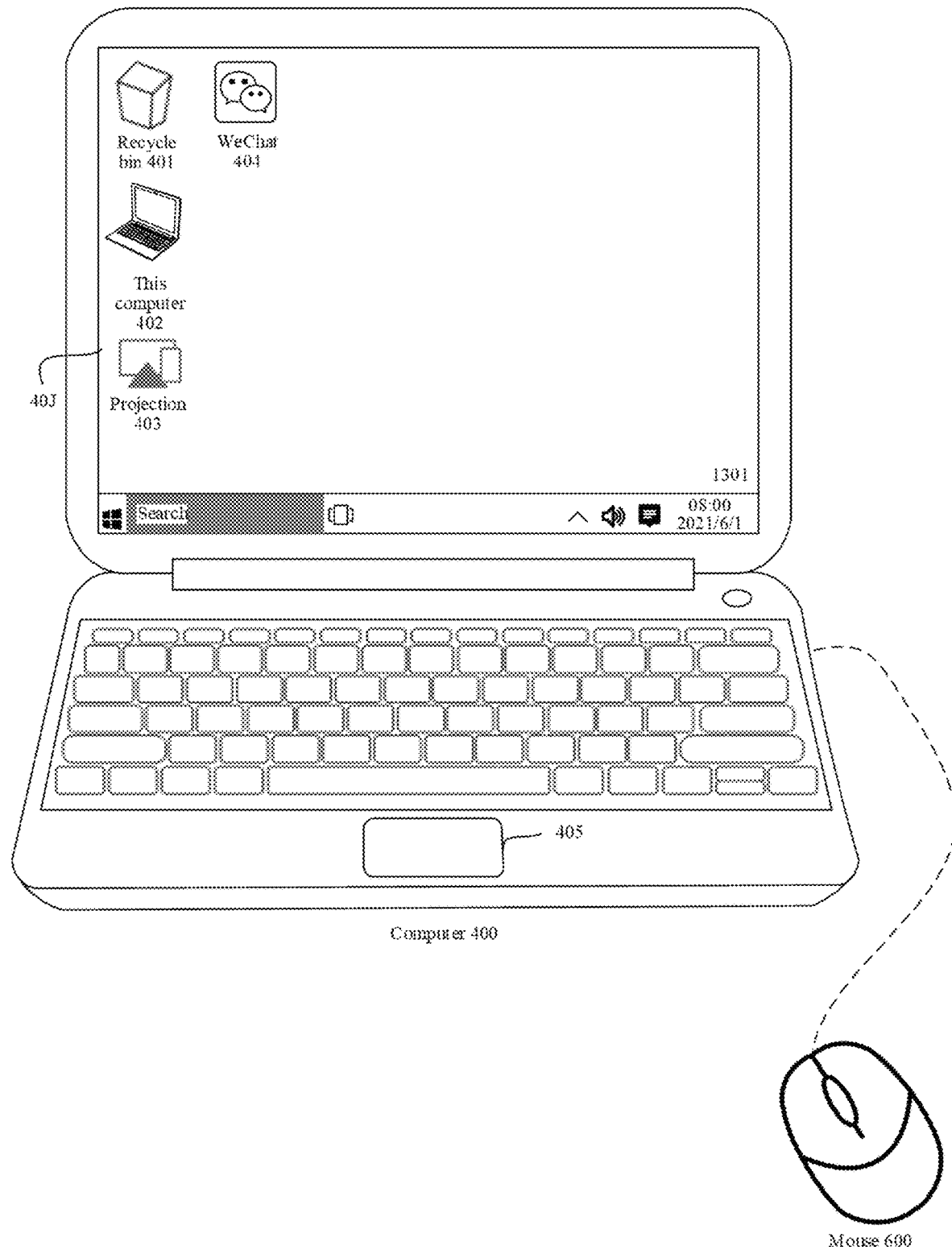
Figures 3, 13B:
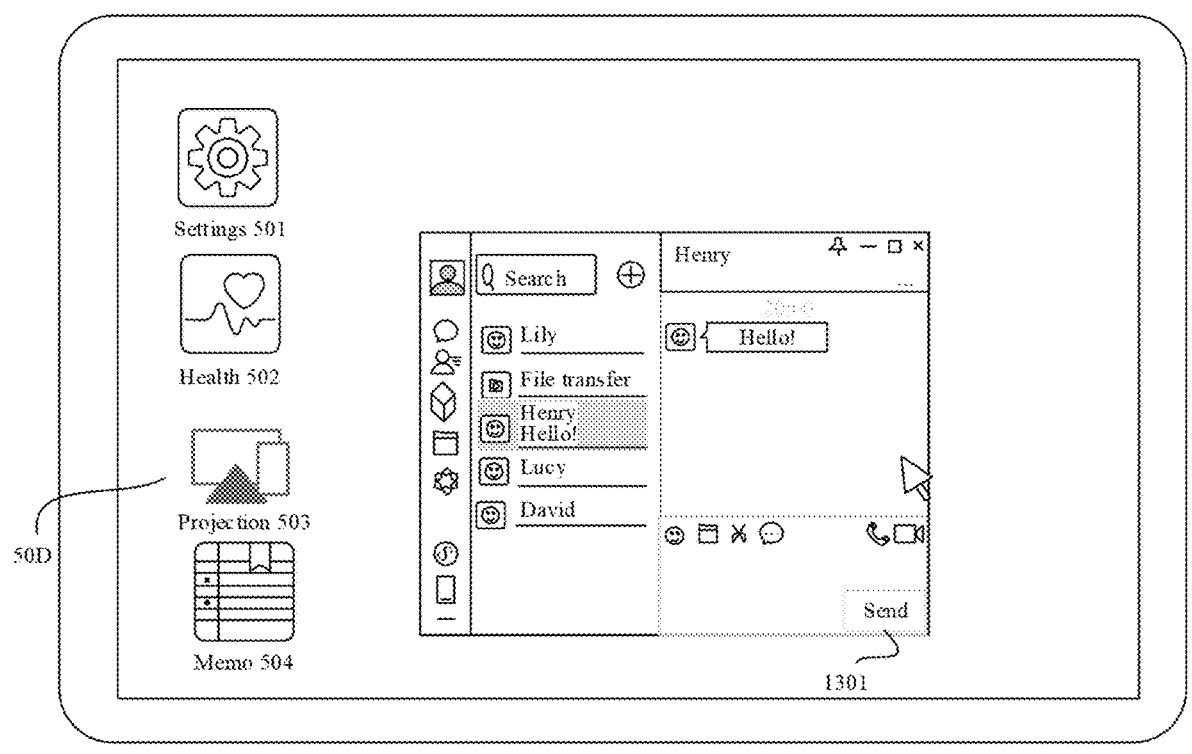

As shown in FIG. 13B-1 to FIG. 13B-3, the window 1301 in the computer 400 has been projected onto the tablet computer 500, and the tablet computer 500 may also display the window 1301. The window 1302 in the computer 400 has been projected into the computer 700. The computer 700 may display the window 1302.

Optionally, in some embodiments, the remote device may project a plurality of windows onto one local device. For example, the computer 400 may project a plurality of windows into the tablet computer 500.

For example, the user may drag the window 1301 in the computer 400 to the tablet computer 500, and then drag the window 1302 to the tablet computer 500. In other words, the computer 400 may project both the window 1301 and the window 1302 into the tablet computer 500.

In other examples, the remote device or the local device may have a plurality of displays. The following assumes that the remote device has, for example, two displays. The user may set relative locations between the plurality of displays of the remote device and the local device.

Figure 14:
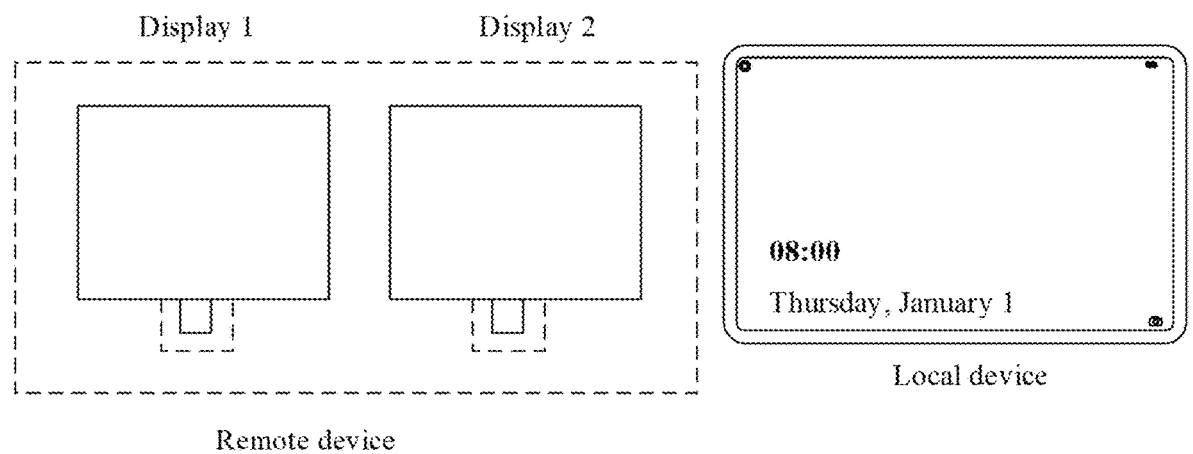
FIG. 14 is a diagram of another projection scenario according to an embodiment of this application.

For example, as shown in FIG. 14, the remote device has two displays that are referred to as a display 1 and a display 2. If the user sets the local device to be on the right of the display 2 and the display 1 on the left of the display 2, the user may drag a window on the display 2 rightward to the local device or drag a window on the display 2 leftward to the display 1. The user may alternatively drag a window on the display 1 rightward to the display 2, and then continue to drag the window rightward to the local device.

It may be understood that the plurality of windows in the remote device may be projected onto the local device. If the remote device may display N windows at the same time, the user may project the N windows onto the local device one by one. A value of N depends on performance of the remote device. Generally, N is at least greater than 3.

In this embodiment of this application, the user can drag the projection window in the remote device to the local device. The remote device may determine, based on an operation of moving the projection window by the user, whether to trigger the projection operation. When the user moves the projection window to a first boundary (for example, a right boundary) of a display of the remote device, the remote device starts to capture an image of a first part of the projection window and sends the image to the local device. The local device may receive and display the image of the first part. If the remote device determines that the local device is located on the right of the remote device, the first boundary is the right boundary.

Figure 15A:
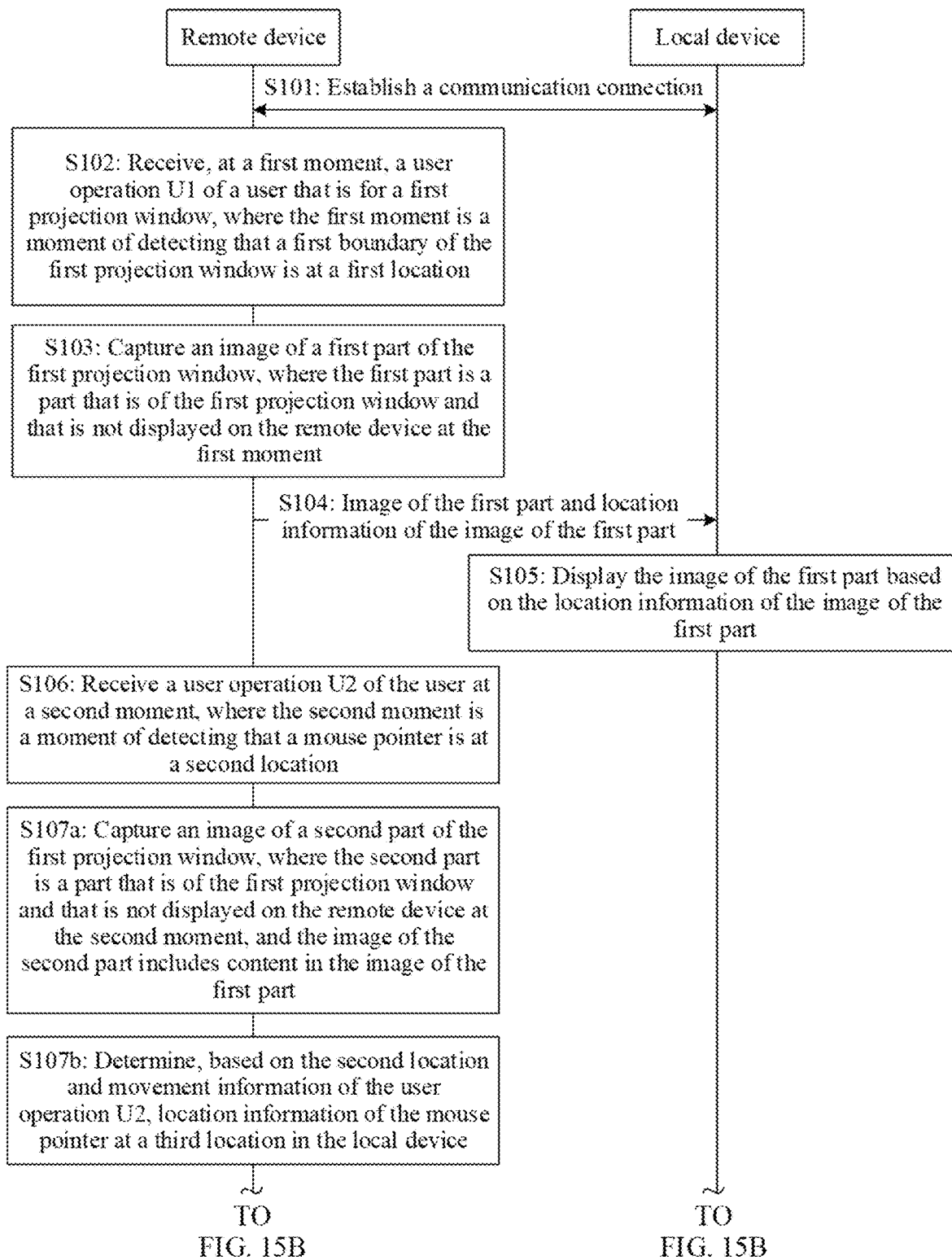
FIG. 15A and FIG. 15B are a flowchart of a projection method according to an embodiment of this application.
Figure 15B:
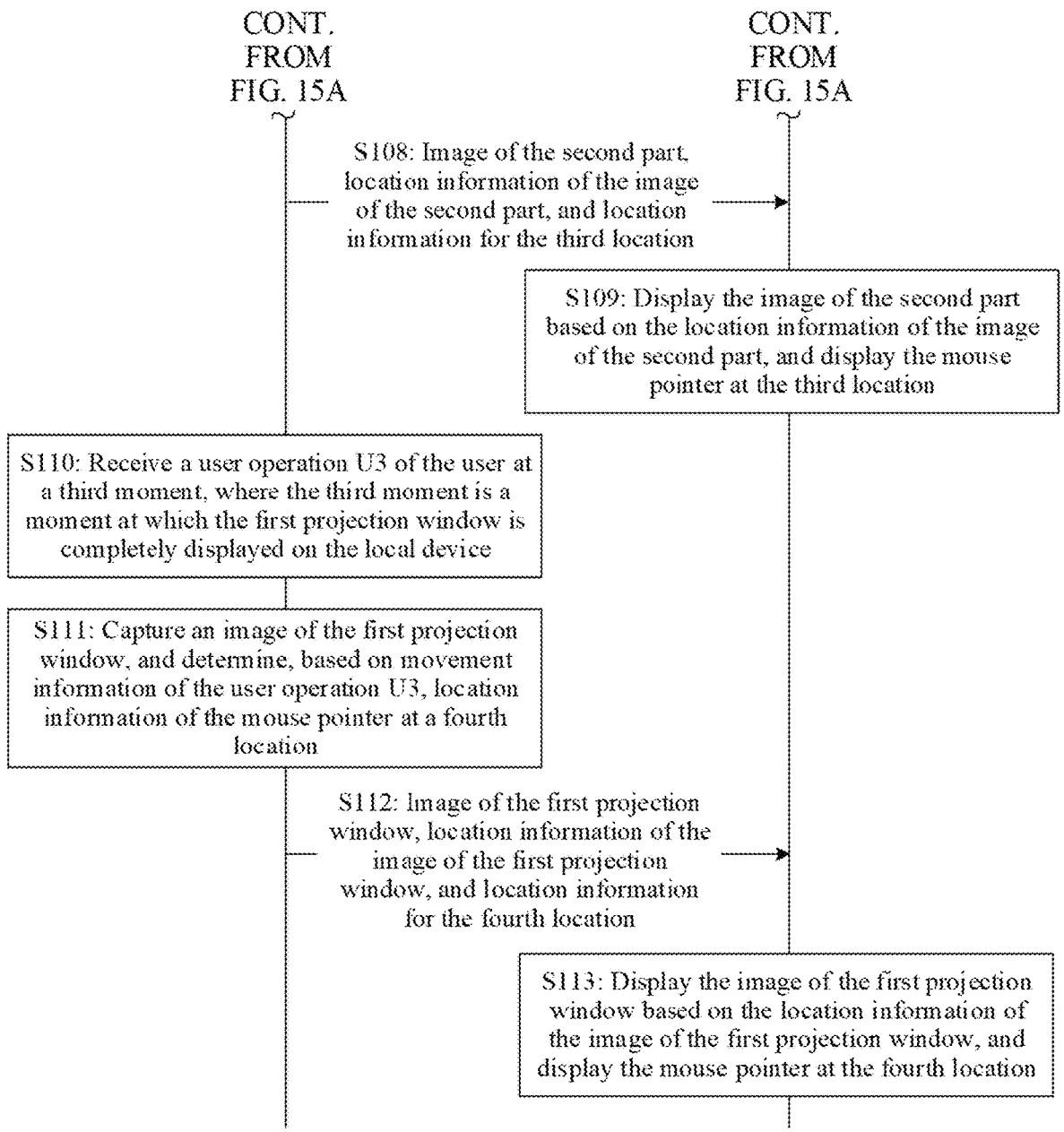

FIG. 15A and FIG. 15B are a flowchart of a projection method according to an embodiment of this application. As shown in FIG. 15A and FIG. 15B, the projection method may include the following steps.

S101: Establish a communication connection between a remote device and a local device.

There may be a plurality of manners of establishing a communication connection between the remote device and the local device. For example, a communication connection may be established between the remote device and the local device through a wireless local area network (for example, wireless fidelity (Wi-Fi)). A communication connection may be alternatively established between the remote device and the local device through a USB cable. A manner of establishing a communication connection between the remote device and the local device is not limited in embodiments of this application.

In this embodiment of this application, the remote device may be referred to as a first electronic device, and the local device may be referred to as a second electronic device.

S102: The remote device receives, at a first moment, a user operation U1 of a user that is for a first projection window, where the first moment is a moment of detecting that a first boundary of the first projection window is at a first location.

Optionally, before step S102, the remote device and the local device need to enable a projection function.

Further, in an implementation, the remote device and the local device need to establish a projection connection. The projection connection may be used to determine two devices for projection. The remote device may determine to project a window onto the local device through the projection connection. The user may establish the projection connection between the remote device and the local device according to the steps shown in FIG. 4A to FIG. 6. The remote device may be the computer 400 shown in FIG. 4A to FIG. 12B. The local device may be the tablet computer 500 shown in FIG. 4A to FIG. 12B.

Further, the remote device may include a device discovery module, a device authentication module, and a device connection module shown in FIG. 1. The device discovery module may be configured to search and discover a device to which a projection connection may be established. The device discovery module may search and discover a device that is in a same wireless local area network as the remote device and has a projection receiving capability. After the user selects a projection receiving device (namely, the local device), the device authentication module may initiate authentication between the remote device and the projection receiving device. After the authentication succeeds, the device connection module may establish a projection connection between the remote device and the projection receiving device.

Further, the user may further set a relative location between the remote device and the local device in the remote device. The remote device determines, based on the relative location, a direction in which the user drags a projection window. For example, the user may set the relative location between the remote device and the local device in the manner shown in FIG. 7. If the user sets the relative location as that the local device is located on the right of the remote device, the user may drag the first projection window in the remote device rightward until the first projection window is dragged to the local device. If the user sets the relative location as that the local device is located on the left of the remote device, the user may drag the first projection window in the remote device leftward until the first projection window is dragged to the local device. If the user sets the relative location as that the local device is located above the remote device, the user may drag the first projection window in the remote device upward until the first projection window is dragged to the local device. If the user sets the relative location as that the local device is located below the remote device, the user may drag the first projection window in the remote device downward until the first projection window is dragged to the local device.

It may be understood that an actual relative location between the remote device and the local device may be the same as or different from a relative location that is set by the user. In other words, the user may set the relative location between the remote device and the local device based on the actual relative location between the remote device and the local device, or may not set the relative location between the remote device and the local device based on the actual relative location between the remote device and the local device. This is not limited in embodiments of this application.

Optionally, in an implementation, the remote device may obtain an actual location of the remote device and an actual location of the local device. The actual location of the remote device may be obtained from a positioning module in the remote device. The actual location of the local device may be sent by the local device to the remote device. The remote device may determine the actual relative location between the remote device and the local device based on the actual location of the remote device and the actual location of the local device. The remote device may determine, based on the actual relative location, the direction in which the user drags the projection window. For example, if the actual relative location is that the local device is located on the right of the remote device, the user may drag the first projection window in the remote device rightward until the first projection window is dragged to the local device. If the actual relative location is that the local device is located on the left of the remote device, the user may drag the first projection window in the remote device leftward until the first projection window is dragged to the local device. If the actual relative location is that the local device is located above the remote device, the user may drag the first projection window in the remote device upward until the first projection window is dragged to the local device. If the actual relative location is that the local device is located below the remote device, the user may drag the first projection window in the remote device downward until the first projection window is dragged to the local device.

The user operation U1 may be an operation of dragging, by the user, the first projection window in the remote device toward the local device. The first boundary of the first projection window is at the first location at the first moment.

The first boundary of the first projection window is determined by a drag direction, determined by the remote device, in which the user drags the projection window to the local device. If the remote device determines that the user can drag the projection window rightward to the local device, the first boundary of the first projection window is a right boundary of the first projection window. If the remote device determines that the user can drag the projection window leftward to the local device, the first boundary of the first projection window is a left boundary of the first projection window. If the remote device determines that the user can drag the projection window upward to the local device, the first boundary of the first projection window is a top boundary of the first projection window. If the remote device determines that the user can drag the projection window downward to the local device, the first boundary of the first projection window is a bottom boundary of the first projection window.

When the first boundary of the first projection window is the right boundary of the first projection window, the first location may be a right boundary of a display of the remote device. When the first boundary of the first projection window is the left boundary of the first projection window, the first location may be a left boundary of the display of the remote device. When the first boundary of the first projection window is the top boundary of the first projection window, the first location may be a top boundary of the display of the remote device. When the first boundary of the first projection window is the bottom boundary of the first projection window, the first location may be a bottom boundary of the display of the remote device.

In this embodiment of this application, when content on a display of an electronic device (for example, the remote device or the local device) is displayed from top to bottom, a boundary at the top of the display of the electronic device may be referred to as a top boundary of the display of the electronic device, a boundary at the bottom of the display of the electronic device may be referred to as a bottom boundary of the display of the electronic device, a boundary on the left of the display of the electronic device may be referred to as a left boundary of the display of the electronic device, and a boundary on the right of the display of the electronic device may be referred to as a right boundary of the display of the electronic device.

Figure 16A:
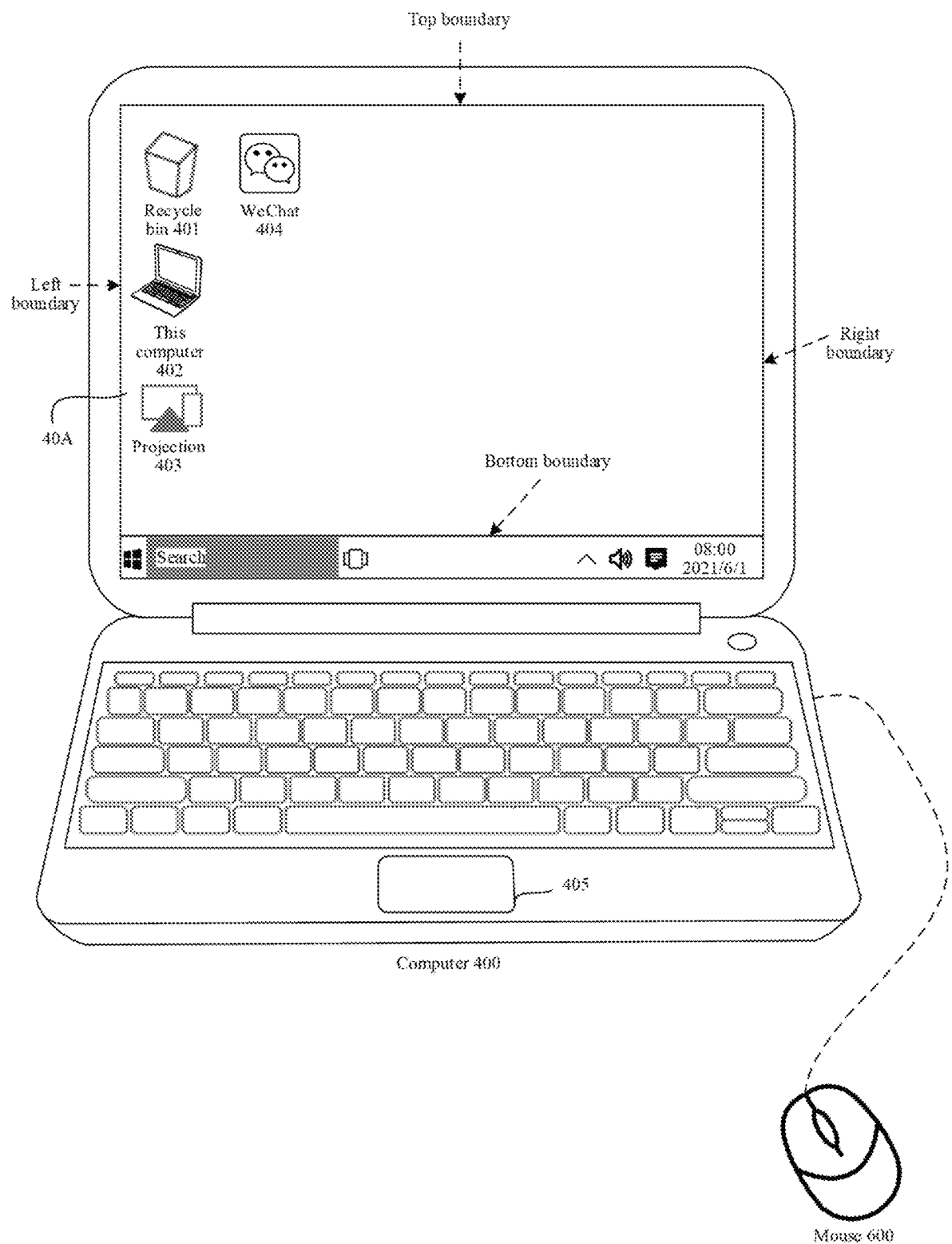
FIG. 16A and FIG. 16B are a diagram of boundaries of a display of a remote device and a display of a local device according to an embodiment of this application.

For example, when content on a display of the computer 400 shown in FIG. 16A is displayed from top to bottom, a boundary on the top of the display of the computer 400 may be referred to as a top boundary of the display of the computer 400, a boundary at the bottom of the display of the computer 400 may be referred to as a bottom boundary of the display of the computer 400, a boundary on the left of the display of the computer 400 may be referred to as a left boundary of the display of the computer 400, and a boundary on the right of the display of the computer 400 may be referred to as a right boundary of the display of the computer 400.

Figure 16B:
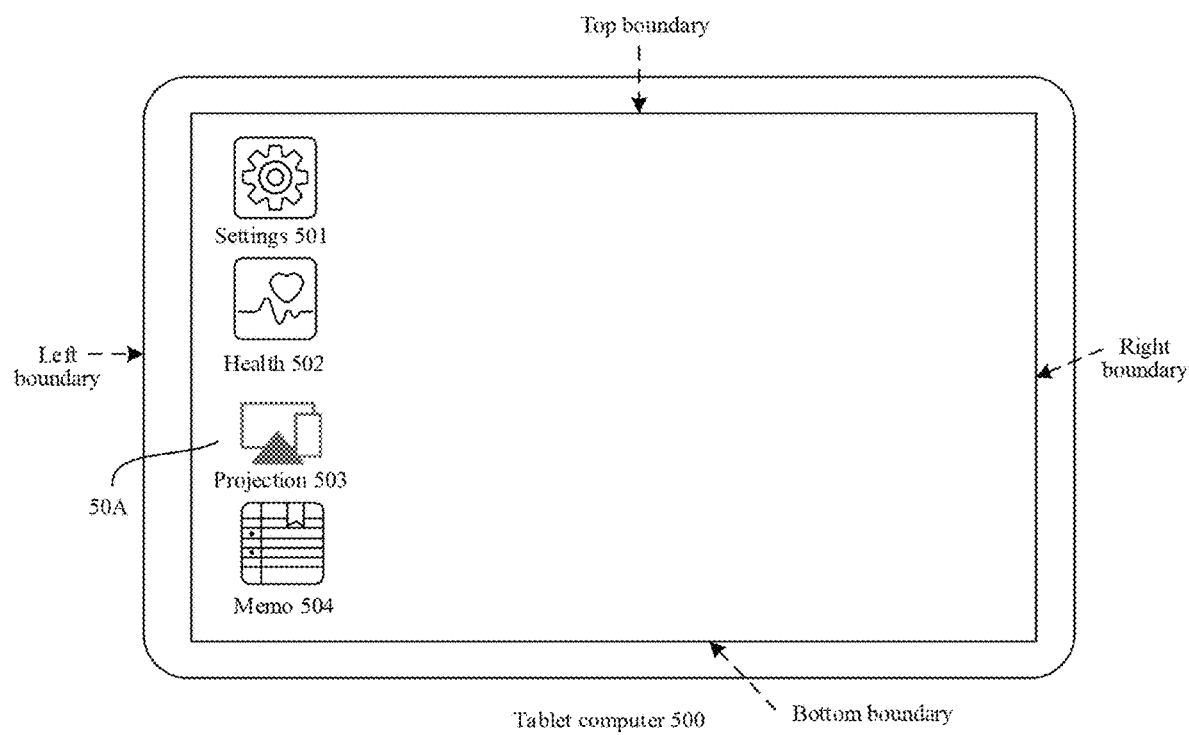

The tablet computer 500 shown in FIG. 16B is placed in landscape mode. When content on a display of the tablet computer 500 is displayed from top to bottom, a boundary on the top of the display of the tablet computer 500 may be referred to as a top boundary of the display of the tablet computer 500, a boundary at the bottom of the display of the tablet computer 500 may be referred to as a bottom boundary of the display of the tablet computer 500, a boundary on the left of the display of the tablet computer 500 may be referred to as a left boundary of the display of the tablet computer 500, and a boundary on the right of the display of the tablet computer 500 may be referred to as a right boundary of the display of the tablet computer 500.

In this embodiment of this application, a boundary that is of a window and that is closest to the right boundary of the display of the electronic device may be referred to as a right boundary of the window, a boundary that is of the window and that is closest to the left boundary of the display of the electronic device may be referred to as a left boundary of the window, a boundary that is of the window and that is closest to the top boundary of the display of the electronic device may be referred to as a top boundary of the window, and a boundary that is of the window and that is closest to the bottom boundary of the display of the electronic device may be referred to as a bottom boundary of the window.

It may be understood that a window displayed on the electronic device may be a rectangle or a square, may be in another shape, for example, a circle, a diamond, or an ellipse, or may be in an irregular shape. For a rectangular or square window, four boundaries of the window are four edges of the rectangular or square window. For a window in another shape or an irregular shape, four boundaries of the window may be four points that are respectively closest to four boundaries of the display, or a straight line on which the four points are located and which is parallel to a boundary of the display.

Figure 17A:
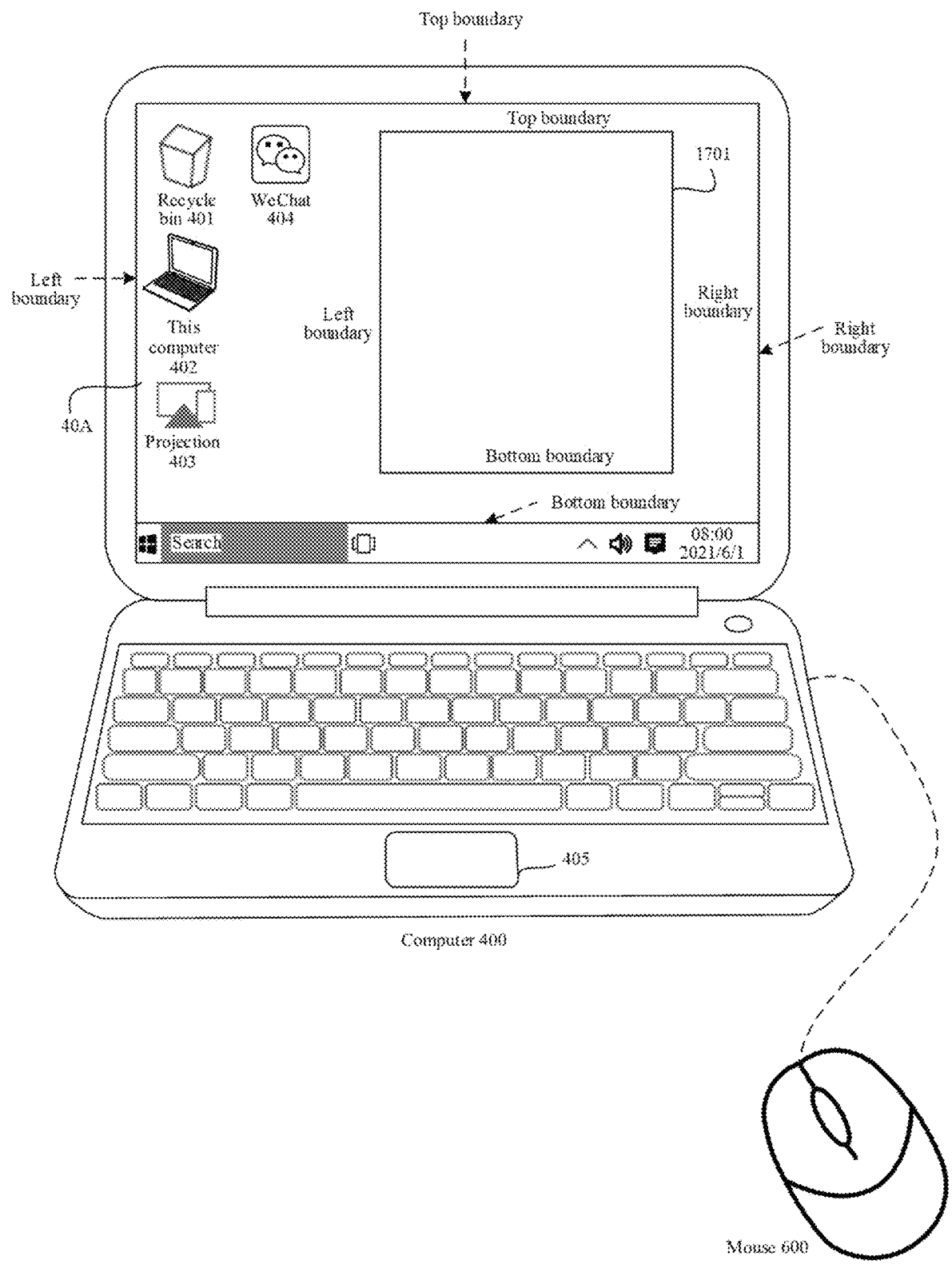
FIG. 17A and FIG. 17B are diagrams of boundaries of a group of windows according to an embodiment of this application.

For example, as shown in FIG. 17A, a window 1701 in the computer 400 is a rectangular window. A side that is of the window 1701 and that is closest to the right boundary is a right boundary of the window 1701, a side that is of the window 1701 and that is closest to the left boundary is a left boundary of the window 1701, a side that is of the window 1701 and that is closest to the top boundary is a top boundary of the window 1701, and a side that is of the window 1701 and that is closest to the bottom boundary is a bottom boundary of the window 1701.

Figure 17B:
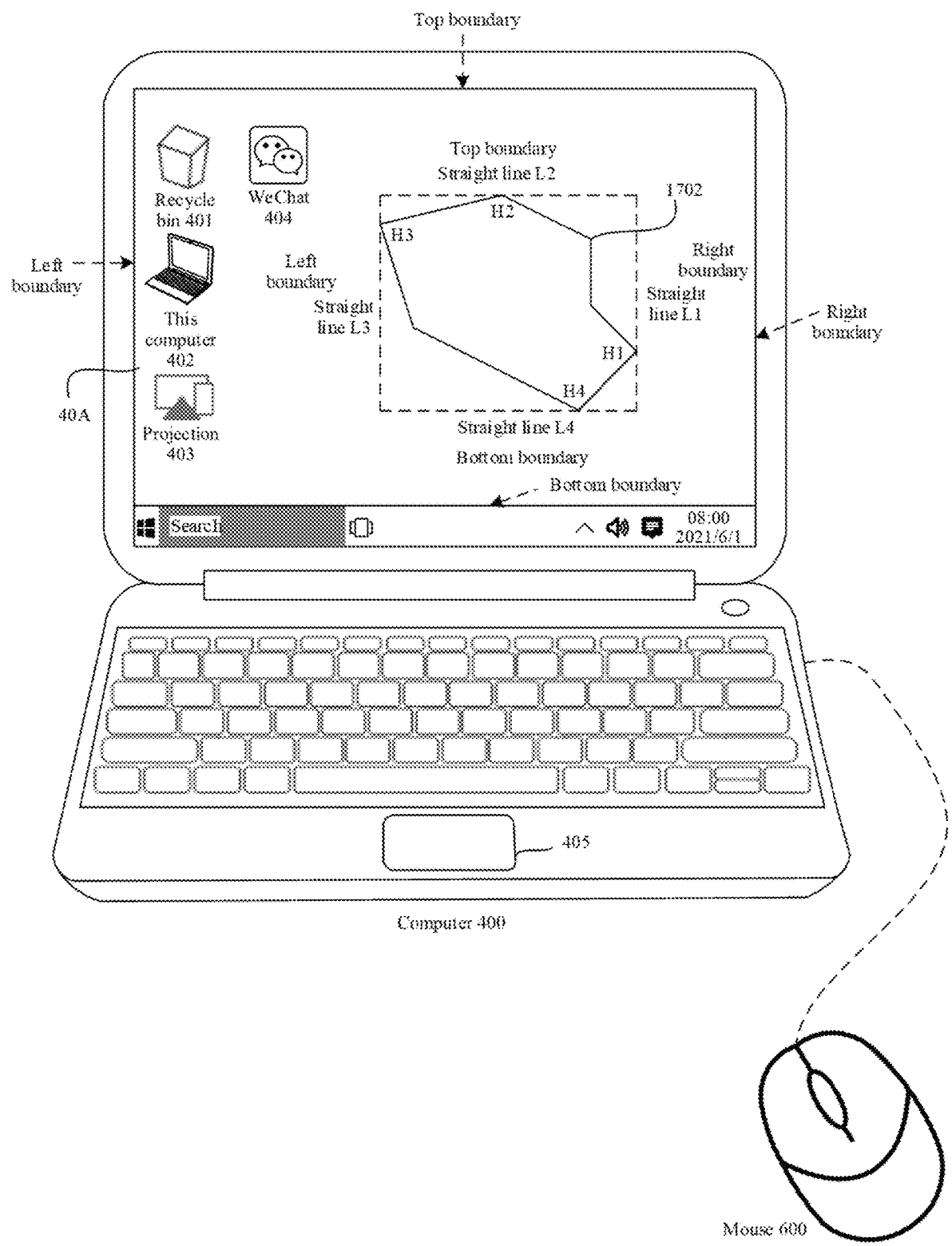

For example, as shown in FIG. 17B, a window 1702 in the computer 400 is a window in an irregular shape. A point H1 that is in the window 1702 and that is closest to the right boundary of the display of the computer 400, or a straight line L1 that is parallel to the right boundary of the display of the computer 400 and in which the point H1 is located may be a right boundary of the window 1702. A point H2 that is in the window 1702 and that is closest to the top boundary of the display of the computer 400, or a straight line L2 that is parallel to the top boundary of the display of the computer 400 and in which the point H2 is located may be a top boundary of the window 1702. A point H3 that is in the window 1702 and that is closest to the left boundary of the display of the computer 400, or a straight line L3 that is parallel to the left boundary of the display of the computer 400 and in which the point H3 is located may be a left boundary of the window 1702. A point H4 that is in the window 1702 and that is closest to the bottom boundary of the display of the computer 400, or a straight line L4 that is parallel to the bottom boundary of the display of the computer 400 and in which the point H4 is located may be a bottom boundary of the window 1702.

For example, an example in which the first boundary of the first projection window is the right boundary of the first projection window and the first location is a right boundary of the remote device is used for description. At the first moment, namely, a moment at which the right boundary of the first projection window is located at the right boundary of the remote device, when the right boundary of the first projection window is located at the right boundary of the remote device, the remote device may receive the user operation U1. The user operation U1 may be that the user drags the first projection window rightward.

Figure 18A:
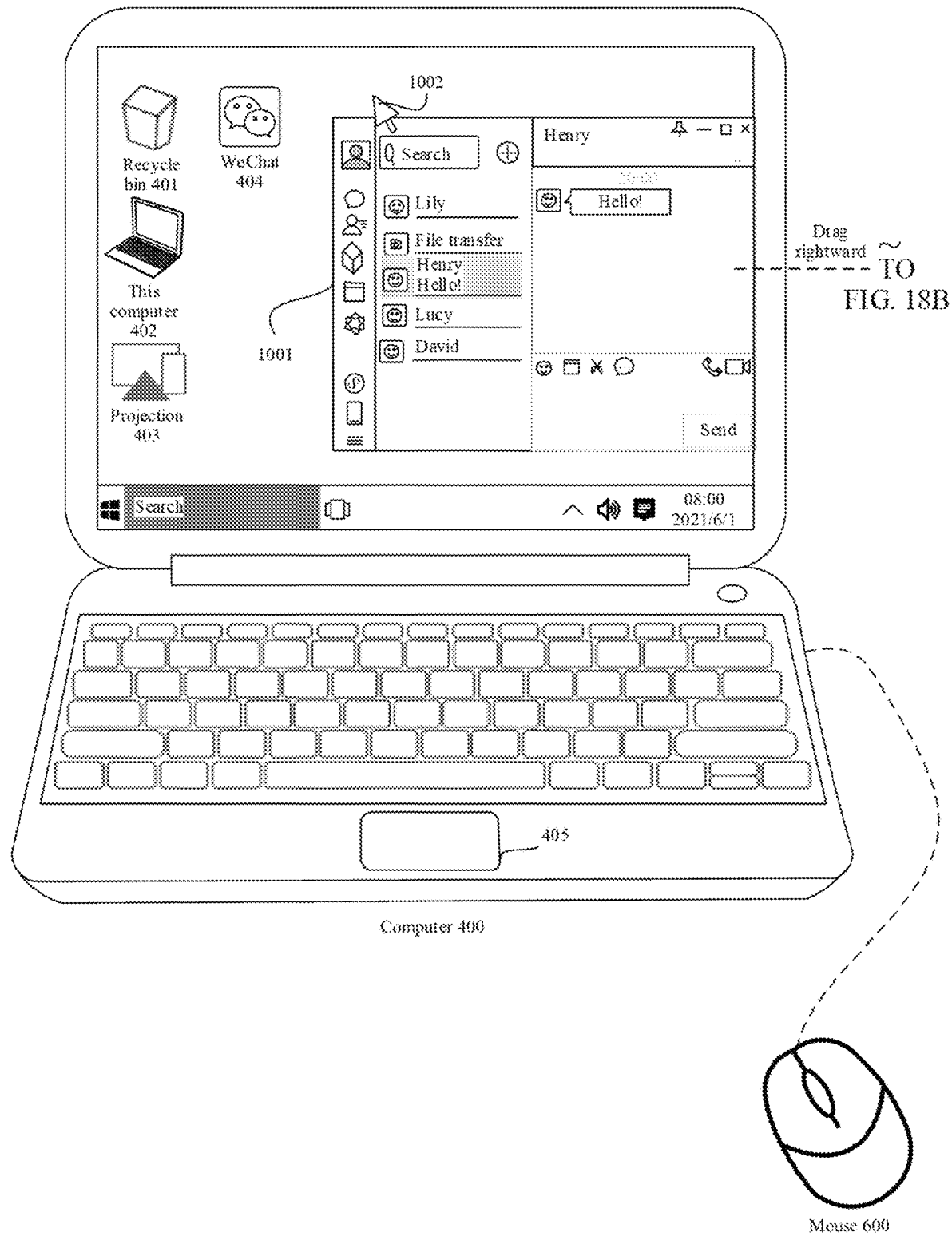
FIG. 18A and FIG. 18B are a diagram of a projection interface according to an embodiment of this application.
Figure 18B:
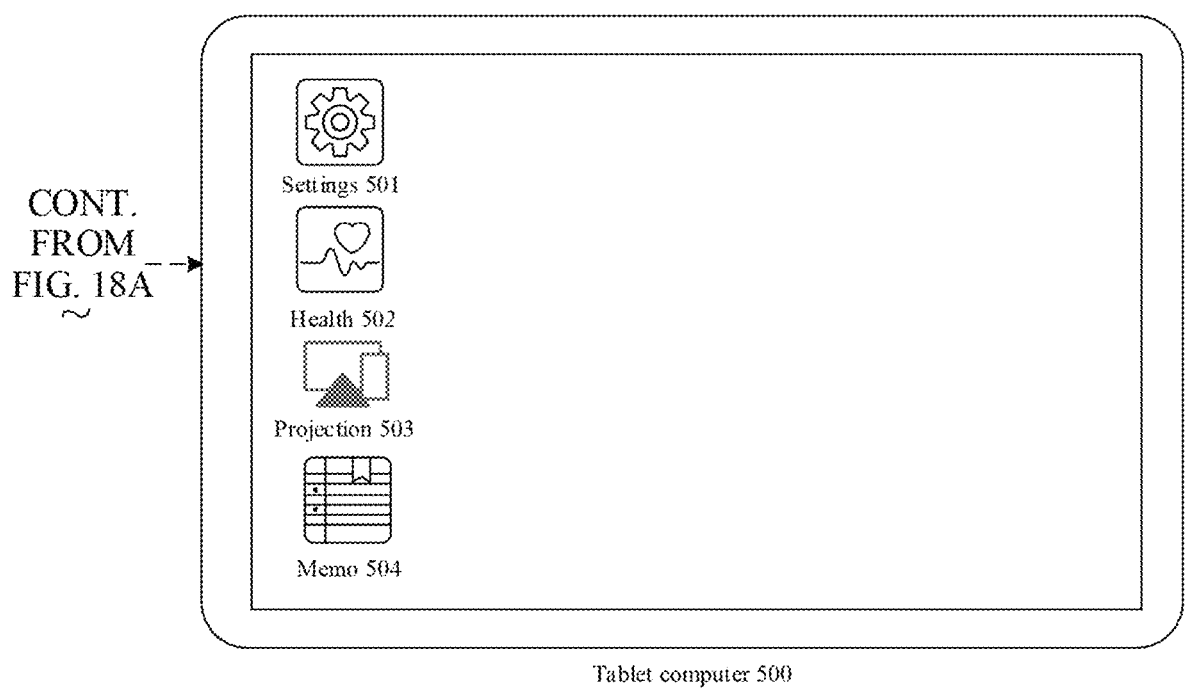

As shown in FIG. 18A and FIG. 18B, the computer 400 may be referred to as the remote device, the tablet computer 500 may be referred to as the local device, and a window 1001 in the computer 400 may be the first projection window. When a right boundary of the window 1001 is located at the right boundary of the display of the computer 400, the user may continue to drag the window 1001 rightward, and drag the window 1001 toward the tablet computer 500.

It may be understood that, optionally, the user operation U1 may be a continuous operation, and the remote device may also receive the user operation U1 before the first moment. For example, the user may keep dragging the first projection window rightward, and at the first moment, the user is still dragging the first projection window rightward.

Alternatively, in another possible implementation, the first boundary of the first projection window is always at the first location, but at the first moment, the user starts to drag the first projection window toward the local device. This is not limited in embodiments of this application.

S103: The remote device obtains an image of a first part of the first projection window, where the first part is a part that is of the first projection window and that is not displayed on the remote device in a first time period starting from the first moment.

Starting from the first moment, the user keeps moving the first projection window in the remote device to the local device in the first time period. The remote device may determine, based on a movement distance of the user operation U1, the part that is of the first projection window and that is not displayed on the remote device. Then, the remote device may obtain the image of the first part of the first projection window.

The remote device may obtain the movement distance of the user operation U1. For example, if the user controls a mouse pointer to move the first projection window by sliding a finger on a touchscreen or a touch panel of the remote device, a sensor on the touchscreen or the touch panel of the remote device may detect a movement distance of the finger of the user. The movement distance, detected by the remote device, of the finger of the user may be the movement distance of the user operation U1. If the user controls a mouse pointer to move the first projection window by using a mouse, a sensor in the mouse may detect a movement distance of the mouse, and the mouse may send the movement distance of the mouse to the remote device. The remote device may use the movement distance of the mouse as the movement distance of the user operation U1.

Based on a user operation, the remote device may determine, in the first projection window, a part that can be displayed on the display of the remote device and a part that is not displayed on the display of the remote device.

In an implementation, the remote device may determine, based on the first boundary and the movement distance of the user operation U1, the first part that is of the first projection window and that is not displayed on the remote device.

Figure 19A:
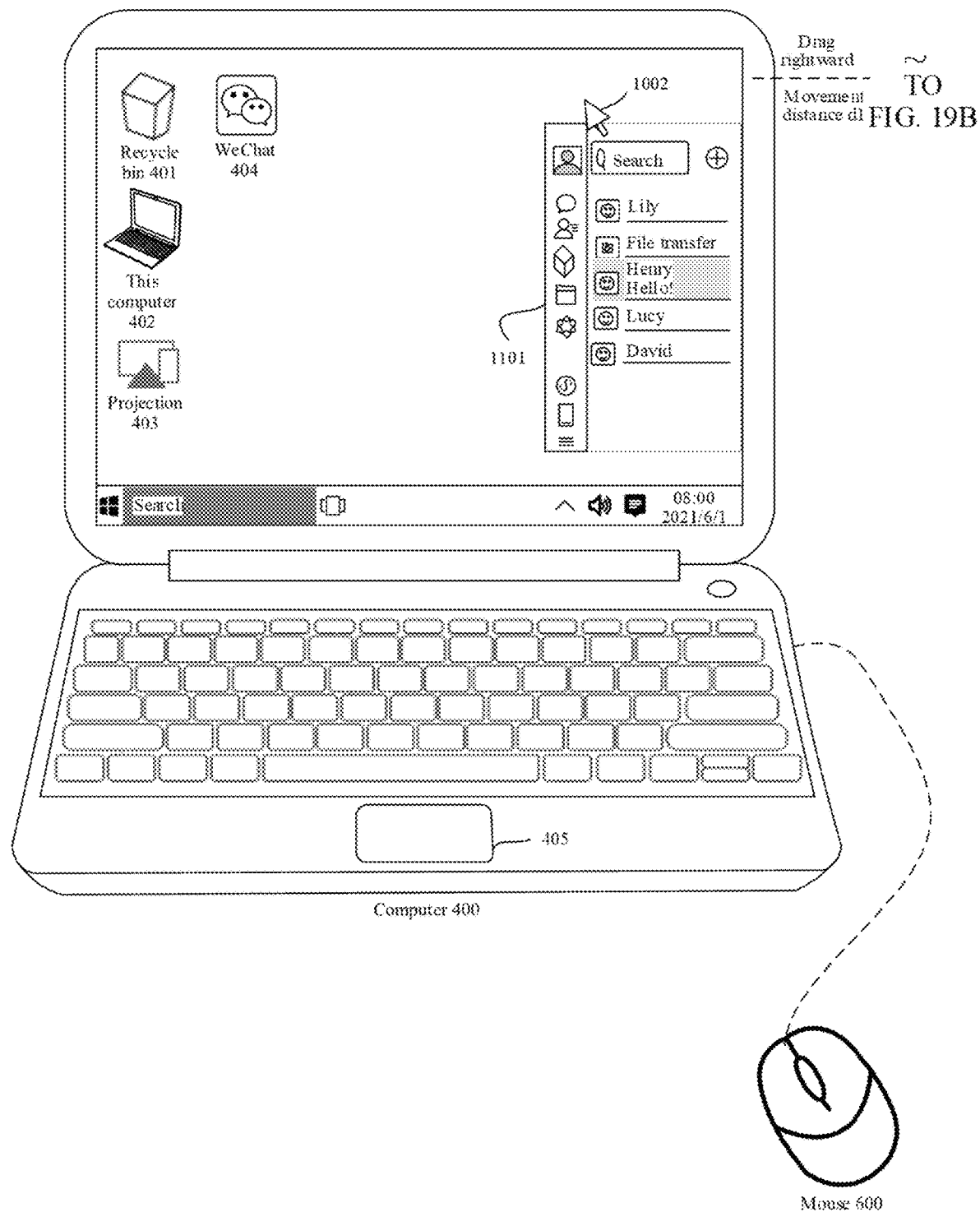
FIG. 19A and FIG. 19B are a diagram of an interface on which a part of a projection window in a remote device is projected onto a local device according to an embodiment of this application.

As shown in FIG. 19A, a window 1101 shown in the computer 400 is a part that is of the window 1001 shown in FIG. 18A and that is displayed on the computer 400. A window 1102 shown in the tablet computer 500 is a part that is of the window 1001 shown in FIG. 18A and that is not displayed on the computer 400. When the user drags the window 1001 shown in FIG. 18A rightward, a movement distance of the window 1001 is dl. The part that is of the window 1001 and that is not displayed on the computer 400 is the window 1102 shown in FIG. 19B. The window 1102 is an area between a right boundary of a window 1002 and a boundary that is dl from the right boundary and that is on the left of the right boundary.

Figure 19B:
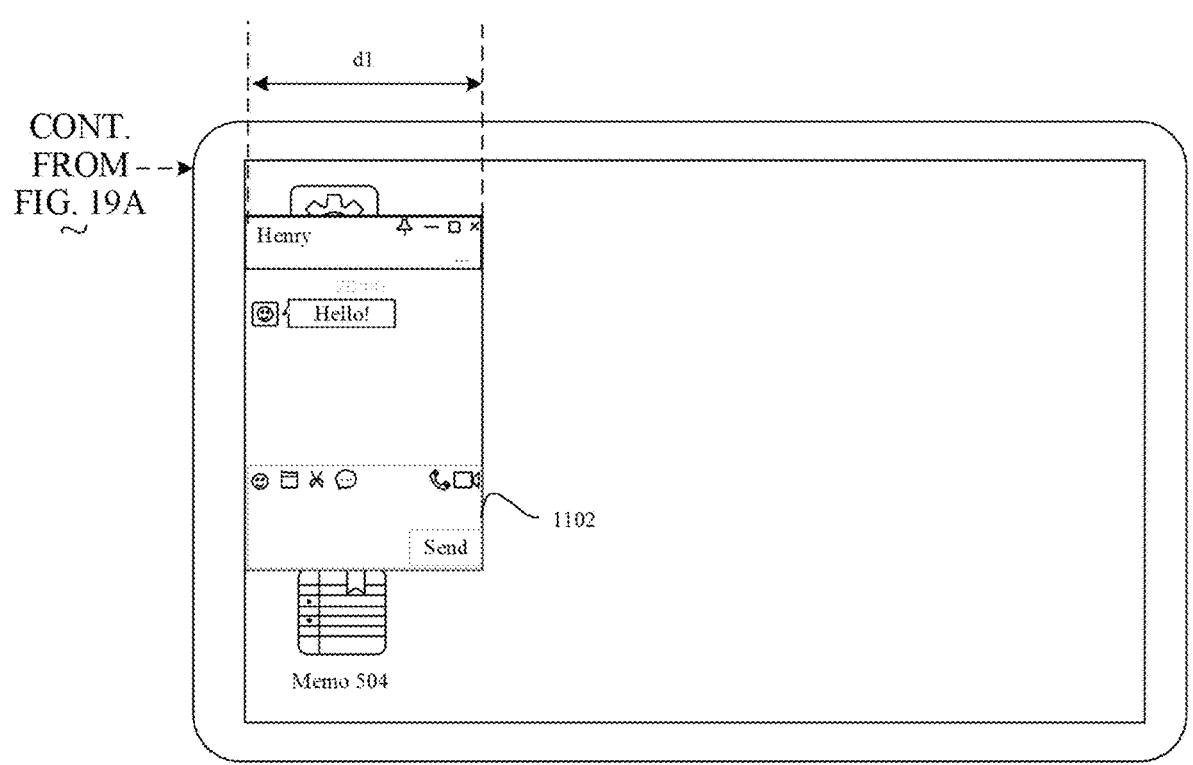

The remote device may obtain the image of the first part after determining the first part that is of the first projection window and that is not displayed on the remote device. The remote device may generate an image based on the first part of the first projection window, which is referred to as the image of the first part. The image of the first part includes content displayed in the first part. The window 1102 shown in FIG. 19B is used as an example. The window 1102 is displayed in the form of an image on the tablet computer 500.

In an implementation, the remote device may further obtain a size of a display of the local device. The remote device may further adaptively adjust a size of the image of the first part based on the size of the display of the local device.

Optionally, the remote device may further obtain location information of the image of the first part. The location information may be coordinates of vertices of the image of the first part. For example, if the image of the first part is rectangular or square, the location information of the first image may be coordinates of four vertices of the image of the first part, for example, (x1, y1), (x2, y2), (x3, y3), and (x4, y4).

Further, the coordinates of the vertices of the image of the first part may be coordinates in a remote device coordinate system, or may be coordinates in a local device coordinate system. In this embodiment of this application, the remote device coordinate system is a coordinate system established by using a first point in the remote device as a coordinate origin. The first point may be a vertex of an upper left corner of the display of the remote device. The local device coordinate system is a coordinate system established by using a second point in the local device as a coordinate origin. The second point may be a vertex of an upper left corner of the display of the local device.

Further, if the coordinates of the vertices of the image of the first part are coordinates in the remote device coordinate system, the local device may convert the coordinates of the vertices of the image of the first part into the coordinates in the remote device coordinate system based on the obtained size of the display of the remote device. If the coordinates of the vertices of the image of the first part are coordinates in the local device coordinate system, the remote device may obtain the coordinates of the vertices of the image of the first part in the remote device coordinate system, and then the remote device may convert the coordinates of the vertices of the image of the first part into the coordinates in the local device coordinate system based on the obtained size of the display of the local device.

Optionally, in an implementation, the location information may be coordinates of an upper left corner of the image of the first part and a size (for example, a width, a height, or resolution of the image of the first part) of the image of the first part.

It may be understood that the location information of the image of the first part is used to determine a location of the image of the first part on the display of the local device. Content included in the location information is not limited in embodiments of this application.

In an implementation, the remote device may include the window capture service shown in FIG. 1. The remote device may obtain the image of the first part by using the window capture service.

S104: The remote device sends the image of the first part and the location information of the image of the first part to the local device.

The remote device may send the image of the first part and the location information of the image of the first part to the local device.

In an implementation, the remote device may include a layer coding service module shown in FIG. 1. The remote device may code the image of the first part by using the layer coding service module and send a coded image to the local device.

In an implementation, the remote device may generate a transparent background image whose size is the same as that of the display of the local device. The remote device superimposes the image of the first part on the transparent background image to obtain a superimposed image. Then, the remote device sends the superimposed image to the local device.

Figure 20:
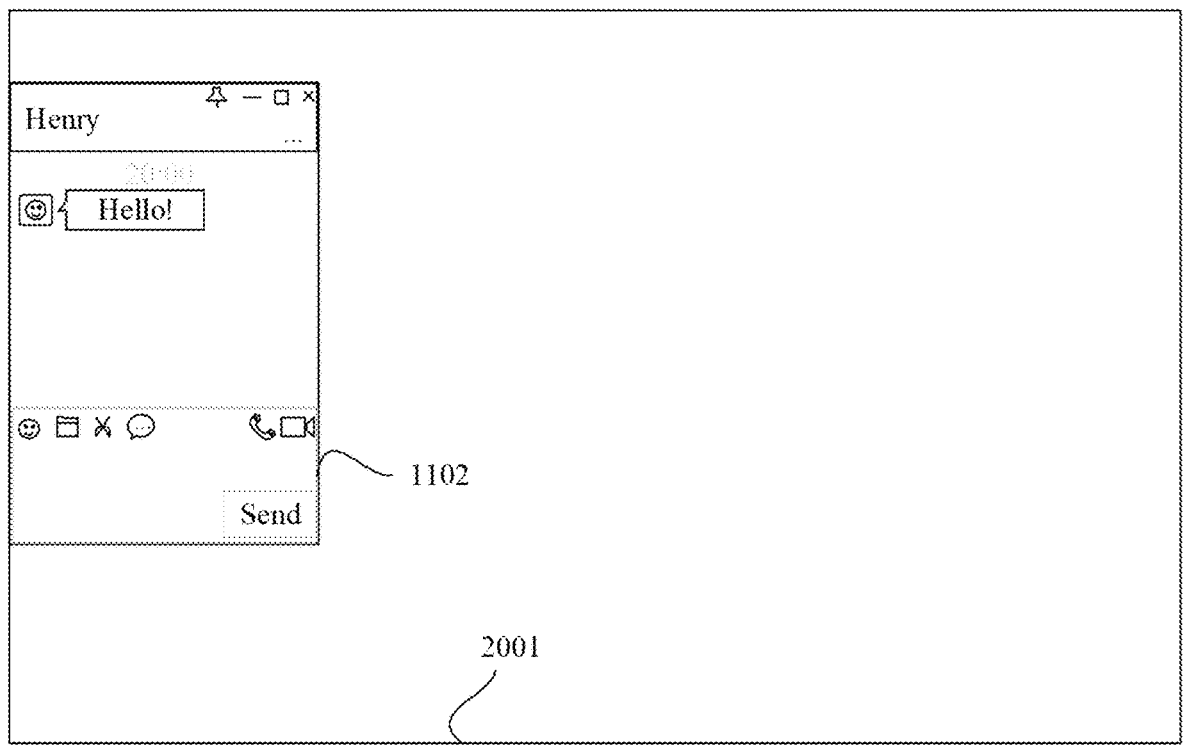
FIG. 20 is a diagram of window superimposition according to an embodiment of this application.

For example, as shown in FIG. 20, the image of the first part may be an image of the window 1102 in FIG. 20, and the transparent background image may be the image 2001 in FIG. 20. A size of the image 2001 may be the same as a size of the display of the local device 500. The computer 400 may superimpose the image of the window 1102 on the image 2001, and then send a superimposed image to the tablet computer 500.

Further, in an implementation, the remote device may include a layer superimposition service module shown in FIG. 1. The remote device may superimpose the image of the first part on the transparent background image by using the layer superimposition service module, to obtain a superimposed image.

Optionally, in step S104, the remote device may send the image of the first part to the local device, without a need to send the location information of the image of the first part.

S105: The local device displays the image of the first part based on the location information of the image of the first part.

The local device may receive the image of the first part and the location information of the image of the first part that are sent by the remote device. Then, the local device displays the image of the first part based on the location information of the image of the first part.

It may be understood that the size of the display of the remote device may be different from the size of the display of the local device. Therefore, the size of the image of the first part sent by the remote device to the local device may be adaptively adjusted based on the size of the display of the local device. For example, when the local device is a computer, the size of the image of the first part is a first size. If the local device is a mobile phone, the size of the image of the first part is a second size. When a size of a display of the computer is greater than that of the mobile phone, the first size is greater than the second size.

In an implementation, if the local device receives coded data of the image of the first part, the local device may decode the coded data. The local device may include a projection decoding service module shown in FIG. 1, and the local device may decode, by using the projection decoding service module, data obtained by coding the received image of the first part.

Optionally, further, in an implementation, the local device may further include a layer Z-order service module shown in FIG. 1. The local device may set a display order of the image of the first part and a window in the local device by using the layer Z-order service module.

S106: The remote device receives a user operation U2 of the user at a second moment, where the second moment is a moment of detecting that the mouse pointer is at a second location.

At the second moment, the mouse pointer is in the second location, and the remote device may receive the user operation U2 of the user. The second location is a second boundary of the remote device, and the second boundary is determined by the drag direction, determined by the remote device, in which the user drags the projection window to the local device. If the remote device determines that the user can drag the projection window rightward to the local device, the second boundary is the right boundary of the display of the remote device. If the remote device determines that the user can drag the projection window leftward to the local device, the second boundary is the left boundary of the display of the remote device. If the remote device determines that the user can drag the projection window upward to the local device, the second boundary is the top boundary of the display of the remote device. If the remote device determines that the user can drag the projection window downward to the local device, the second boundary is the bottom boundary of the display of the remote device.

For example, the user controls the mouse pointer to drag the first projection window rightward until the first projection window is dragged to the local device. When the mouse pointer is located at the right boundary of the remote device, the user may continue to drag the first projection window rightward by using the mouse pointer.

It may be understood that both the first location and the second location are located at a second boundary of the display of the remote device.

It may be understood that, in an implementation, if the mouse pointer is located in a place other than the first boundary in the first projection window, the user drags the first projection window by using the mouse pointer, where the first boundary of the first projection window first reaches the second boundary of the display of the remote device at the first moment; and then the user continues to drag the first projection window, where the mouse pointer reaches the second boundary of the display of the remote device at the second moment. That is, the second moment may be a moment after the first moment.

It may be understood that, optionally, in an implementation, if the mouse pointer is located at the first boundary of the first projection window, when the user drags the first projection window rightward, the mouse pointer and the first boundary of the first projection window may simultaneously reach the second boundary of the display of the remote device. Alternatively, the first boundary of the first projection window is always at a first location of the display of the remote device, namely, the second boundary of the display of the remote device, the user places the mouse pointer at the first boundary of the first projection window, and then drags the first projection window rightward by using the mouse pointer. In this case, the first moment and the second moment are a same moment, in other words, step S102 and step S106 are simultaneously performed. The remote device may not perform steps S103 and S104, and the local device may either not perform step S105.

It may be understood that the user operation U1 and the user operation U2 may be a same operation. The user operation U1 may be that the user drags the first projection window in the remote device to the local device; and the user operation U2 may also be that the user drags the first projection window in the remote device to the local device. For example, when the mouse pointer is at any location (refer to FIG. 18A and FIG. 18B herein) other than the first boundary in the first projection window, the user may drag the first projection window in the remote device to the local device. In a process of dragging the first projection window by the user, an operation of dragging the first projection window within a time period from a time point at which the first boundary of the first projection window is located at the first location of the display of the remote device to a time point at which the mouse pointer is located at the second location may be referred to as the user operation U1; and an operation of dragging the first projection window in another time period starting when the mouse pointer is at the second location is referred to as the user operation U2.

Further, the user operation U1 and the user operation U2 each may be a continuous operation, that is, after receiving the user operation U1 of the user, the remote device continuously receives the user operation U2 of the user.

Optionally, the user operation U1 and the user operation U2 may be a same operation. For example, when the mouse pointer is located at the first boundary of the first projection window, the user drags the first projection window in the remote device to the local device. An operation that the user drags the first projection window to the local device when the first boundary of the first projection window and the mouse pointer are located at the second boundary of the display of the remote device may be referred to as the user operation U1, or may be referred to as the user operation U2.

S107a: The remote device obtains an image of a second part of the first projection window, where the second part is a part that is of the first projection window and that is not displayed on the remote device at the second moment, and the image of the second part includes content in the image of the first part.

Starting from the second moment, the user keeps moving the first projection window in the remote device to the local device in a second time period. The remote device may determine, based on a movement distance of the user operation U2, the second part that is of the first projection window and that is not displayed on the remote device. Then, the remote device may obtain the image of the second part of the first projection window.

It may be understood that, if the mouse pointer is located at the first boundary of the first projection window, the second part of the first projection window may be the first part of the first projection window described in step S103. If the mouse pointer is not located at the first boundary of the first projection window, the second part of the first projection window may include the first part of the first projection window.

The second time period may be a time period from a time point at which the remote device detects the user operation U2 of the user to a time point at which the remote device does not detect the user operation U2, namely, a time period from a time period at which the user starts to drag the first projection window when the mouse pointer is located at the second location of the remote device to a time point at which the user stops dragging the first projection window. Alternatively, the second time period may be a time period from a time point at which the remote device detects that the mouse pointer is located at the second location of the remote device to a time point at which the first projection window is completely displayed on the local device. Alternatively, the second time period may be a preset time period set by a system of the remote device, and the remote device sends, to the local device at an interval of the preset time period, a part that is of the image of the first projection window and that is not displayed on the remote device. This is not limited in embodiments of this application.

For step S107a, refer to descriptions in step S103. Details are not described herein again.

S107b: The remote device determines, based on the second location and movement information of the user operation U2, location information of the mouse pointer at a third location in the local device.

The user may move the mouse pointer from the second location to the third location through the user operation U2. The remote device may obtain location information of the mouse pointer at the second location. The remote device may further obtain the movement information of the user operation U2. The remote device may determine the location information for the third location, for example, coordinates, based on location information for the second location and the movement information of the user operation U2.

The movement information of the user operation U2 may include the movement distance and a movement direction of the user operation U2. The remote device may obtain the movement information of the user operation U2. For example, if the user controls the mouse pointer to move the first projection window by sliding the finger on the touchscreen or the touch panel of the remote device, the sensor on the touchscreen or the touch panel of the remote device may detect a movement distance and a movement direction of the finger of the user in the second time period. The movement distance and the movement direction that are of the finger of the user and that are detected by the remote device may be the movement distance and the movement direction of the user operation U2. If the user controls the mouse pointer to move the first projection window by using the mouse, the sensor in the mouse may detect the movement distance of the mouse, and the mouse may send a movement distance and a movement direction of the mouse in the second time period to the remote device. The remote device may use the movement distance and the movement direction of the mouse in the second time period as the movement distance and the movement direction of the user operation U2.

It may be understood that step S107a and step S107b may be performed simultaneously, or step S107b may be performed before step S107a.

S108: The remote device sends the image of the second part, location information of the image of the second part, and the location information for the third location to the local device.

The remote device may send the image of the second part, the location information of the image of the second part, and the location information of the mouse pointer at the third location to the local device.

In an implementation, the remote device may include the layer coding service module shown in FIG. 1. The remote device may code the image of the second part by using the layer coding service module and send a coded image to the local device.

In an implementation, the remote device may generate the transparent background image whose size is the same as that of the display of the local device. The remote device superimposes the image of the second part on the transparent background image to obtain a superimposed image. Then, the remote device sends the superimposed image to the local device.

For step S108, refer to descriptions in step S104. Details are not described herein again.

It may be understood that the remote device may simultaneously send the image of the second part, the location information of the image of the second part, and the location information for the third location to the local device; or the remote device may separately send the image of the second part, the location information of the image of the second part, and the location information for the third location to the local device.

In an implementation, the image of the second part, the location information of the image of the second part, and the location information for the third location may be included in a same message. In other words, the remote device may send the image of the second part, the location information of the image of the second part, and the location information for the third location to the local device based on one message.

Optionally, in an implementation, the image of the second part and the location information of the image of the second part may be included in a first message, and the location information for the third location may be included in a second message. The remote device sends the image of the second part and the location information of the image of the second part to the local device based on the first message. The remote device sends the location information for the third location to the local device based on the second message.

Optionally, in an implementation, the image of the second part is included in a third message, the location information of the image of the second part may be included in a fourth message, and the location information for the third location may be included in a fifth message. The remote device sends the image of the second part to the local device based on the third message. The remote device sends the location information of the image of the second part to the local device based on the fourth message. The remote device sends the location information for the third location to the local device based on the fifth message.

S109: The local device displays the image of the second part based on the location information of the image of the second part, and displays the mouse pointer at the third location.

The local device may receive the image of the second part and the location information of the image of the second part that are sent by the remote device. The local device may display the image of the second part on the display of the local device based on the location information of the image of the second part. The local device may further receive the location information of the mouse pointer at the third location, and display the mouse pointer at the third location of the display of the local device.

In an implementation, if the local device receives coded data of the image of the second part, the local device may decode the coded data. The local device may include the projection decoding service module shown in FIG. 1, and the local device may decode, by using the projection decoding service module, data obtained by coding the received image of the second part.

Optionally, further, in an implementation, the local device may further include the layer Z-order service module shown in FIG. 1. The local device may set a display order of the image of the second part and the window in the local device by using the layer Z-order service module.

Optionally, in an implementation, if the local device originally displays the mouse pointer, when the remote device sends the location information of the mouse pointer at the third location of the remote device, the local device may display the mouse pointer in the local device based on the location information for the third location.

S110: The remote device receives a user operation U3 of the user at a third moment, where the third moment is a moment at which the first projection window is completely displayed on the local device.

The remote device may receive the user operation U3 of the user at the third moment, where the user operation U3 may be an operation of dragging the first projection window by the user. For example, the user continues to drag the first projection window rightward.

The user operation U3 may be the same as the user operation U1 and the user operation U2. The user may continuously perform the user operation U1, the user operation U2, and the user operation U3, that is, there may be no time interval between the user operation U1 and the user operation U2, and there may be no time interval between the user operation U2 and the user operation U3.

In this embodiment of this application, the user operation U1 may be referred to as a first drag operation, the user operation U2 may also be referred to as a first drag operation, and the user operation U3 may be referred to as a first drag operation. Alternatively, the first drag operation includes the user operation U1, the user operation U2, and the user operation U3. In other words, only after the user continuously performs the user operation U1, the user operation U2, and the user operation U3, it indicates that the user completes the first drag operation.

It may be understood that the first projection window displayed on the local device is an image of the first projection window. Therefore, when the user drags the first projection window in the local device, the image of the first projection window is actually dragged.

S111: The remote device obtains the image of the first projection window, and determines, based on movement information of the user operation U3, location information of the mouse pointer at a fourth location.

When the user has dragged the entire first projection window in the remote device to the local device, the remote device may obtain the first projection window.

The user may move the mouse pointer from the third location to the fourth location through the user operation U3. The remote device may obtain location information of the mouse pointer at the third location. The remote device may further obtain the movement information of the user operation U3. The remote device may determine the location information for the fourth location, for example, coordinates, based on the location information for the third location and the movement information of the user operation U3.

For step S111, refer to descriptions in step S107a and step S107b. Details are not described herein again.

S112: The remote device sends the image of the first projection window, location information of the image of the first projection window, and the location information for the fourth location to the local device.

The remote device may send the image of the first projection window, the location information of the image of the first projection window, and the location information of the mouse pointer at the fourth location to the local device.

In an implementation, the remote device may include the layer coding service module shown in FIG. 1. The remote device may code the image of the first projection window by using the layer coding service module and send the coded image to the local device.

In an implementation, the remote device may generate the transparent background image whose size is the same as that of the display of the local device. The remote device superimposes the image of the first projection window on the transparent background image to obtain a superimposed image. Then, the remote device sends the superimposed image to the local device.

For step S112, refer to descriptions in step S108. Details are not described herein again.

S113: The local device displays the image of the first projection window based on the location information of the image of the first projection window, and displays the mouse pointer at the fourth location.

The local device may receive the image of the first projection window and the location information of the image of the first projection window that are sent by the remote device. The local device may display the image of the first projection window on the display of the local device based on the location information of the image of the first projection window. The local device may further receive the location information of the mouse pointer at the fourth location, and display the mouse pointer at the fourth location of the display of the local device.

In an implementation, if the local device receives coded data of the image of the first projection window, the local device may decode the coded data. The local device may include the projection decoding service module shown in FIG. 1, and the local device may decode, by using the projection decoding service module, data obtained by coding the received image of the first projection window.

Optionally, further, in an implementation, the local device may further include the layer Z-order service module shown in FIG. 1. The local device may set a display order of the image of the first projection window and the window in the local device by using the layer Z-order service module.

In an implementation, the user may drag the first projection window from the local device back to the remote device. The mouse pointer can also be dragged from the local device back to the remote device.

It may be understood that the user may drag a second projection window, a third projection window, an $N^{th}$ projection window, and the like in the remote device to the local device according to the foregoing steps. In other words, a plurality of windows in the remote device can be projected onto the local device through a drag operation of the user.

In an implementation, when the remote device projects the plurality of windows onto the local device, the remote device may superimpose images of the plurality of windows on the transparent background image, and then send a superimposed image to the local device. For example, the remote device may superimpose the image of the first projection window and an image of the second projection window on the transparent background image, and then send a superimposed image to the local device. It may be understood that the user first moves the first projection window in the remote device to the local device, and then moves the second projection window in the remote device to the local device. When the remote device first moves the first projection window, the remote device needs to only superimpose the image of the first projection window on the transparent background image, and then send a superimposed image to the local device. When the local device displays the image of the first projection window, the user may continue to move the second projection window in the remote device to the local device. When the user continues to move the second projection window in the remote device to the local device, the remote device may superimpose the image of the first projection window and the image of the second projection window on the transparent background image, and then send the superimposed image to the local device.

In this embodiment of this application, the image of the first projection window may be referred to as a first image, the image of the first part of the first projection window may be referred to as a first image, and the location information of the image of the first part may be referred to as first location information. The image of the second part of the first projection window may be referred to as a first image, and the location information of the image of the second part may be referred to as first location information. An image obtained by superimposing images may be referred to as a superimposed image.

In an implementation, when the mouse pointer of the local device is displayed on the local device, and the mouse pointer of the remote device is moved to the local device, the local device may hide the mouse pointer of the local device when displaying the mouse pointer of the remote device. Herein, the mouse pointer of the remote device may be referred to as a first mouse pointer, and the mouse pointer of the local device may be referred to as a second mouse pointer.

According to the projection method provided in this embodiment of this application, the user can drag a projection window in the remote device to the local device, or may drag the projection window from the local device back to the remote device. In this way, the user can complete projection through a drag operation. The operation is simple and user experience is good.

Further, in some scenarios, after the local device displays the first projection window in the remote device, the user may further operate, in the local device, the application window in the local device or the projection window. Embodiment steps may be shown in FIG. 21.

Figure 21:
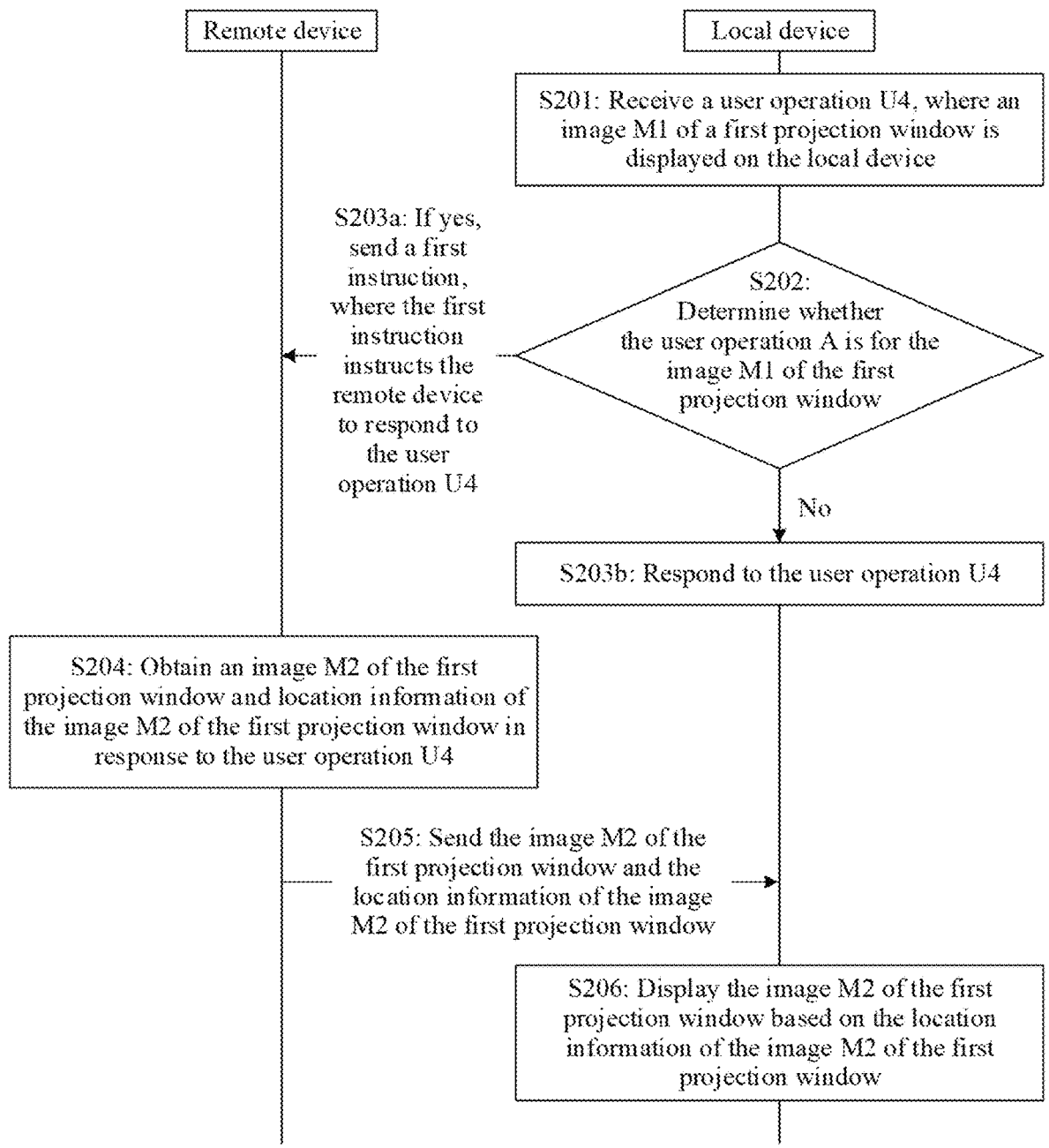
FIG. 21 is a flowchart of a projection method according to an embodiment of this application.

As shown in FIG. 21, the projection method provided in this embodiment of this application may further include the following steps.

S201: A local device receives a user operation U4, where an image M1 of a first projection window is displayed on the local device.

The local device may receive the user operation U4, and may detect a location of the user operation U4 on a display.

The local device may display the image M1 of the first projection window. The image M1 of the first projection window is sent by the remote device to the local device.

Optionally, the local device may further display windows of one or more local applications of the local device.

S202: The local device determines whether the user operation U4 is for the image M1 of the first projection window; and if yes, performs step S203*a*; or if no, performs step S203*b*.

The local device may determine, based on the location of the user operation U4 on the display of the local device and location information of the image M1 of the first projection window, whether the user operation U4 is performed on the image M1 of the first projection window. If coordinates of four vertices of the image M1 of the first projection window are respectively (x1, y1), (x2, y2), (x3, y3), and (x4, y4), coordinates of the location of the user operation U4 on the display are (xa, ya). If the coordinates (xa, ya) are in an area formed by the four vertices (x1, y1), (x2, y2), (x3, y3), and (x4, y4), the local device determines that the user operation A is performed on the image M1 of the first projection window. In this case, the local device may perform step S203a. If the coordinates (xa, ya) are not in an area formed by the four vertices (x1, y1), (x2, y2), (x3, y3), and (x4, y4), the local device determines that the user operation A is performed on the local device. In this case, the local device may perform step S203b.

S203a: The local device sends a first instruction to the remote device, where the first instruction instructs the remote device to respond to the user operation A.

The local device may send the first instruction to the remote device, where the first instruction instructs the remote device to respond to the user operation U4. The first instruction may carry a type of the user operation U4 (a tap operation, a movement operation, or the like) and location information of the user operation U4 on the display. The user operation U4 may be an operation of tapping a first control, for example, tapping a control for zooming in the first projection window in the first projection window, a control for zooming out the first projection window, or a control for closing the first projection window. The user operation U4 may alternatively be an operation of moving the first projection window.

S203b: The local device responds to the user operation U4.

When the local device determines that the user operation U4 is performed on the local device, the local device may correspond to the user operation U4. If the user operation U4 is performed on a window of an application 1, the local device may notify the application 1 to refresh the window of the application 1 in response to the user operation U4, for example, the application 1 may maximize a window of a first application.

S204: The remote device obtains an image M2 of the first projection window and location information of the image M2 of the first projection window in response to the user operation U4.

If the user operation is to minimize the first projection window, the remote device may obtain an image of the minimized first projection window. In other words, the image M2 of the first projection window may be the image of the minimized first projection window. The remote device may further obtain location information of the minimized first projection window.

If the user operation is to maximize the first projection window, the remote device may obtain an image of the maximized first projection window. In other words, the image M2 of the first projection window may be the image of the maximized first projection window. The remote device may further obtain location information of the maximized first projection window.

If the user operation U4 is to move the first projection window, the remote device may obtain the image M2 of the first projection window and location information of the moved first projection window. It may be understood that content displayed in the image M2 of the first projection window may be the same as content displayed in the image M1 of the first projection window.

S205: The remote device sends the image M2 of the first projection window and the location information of the image M2 of the first projection window to the local device.

The remote device may send the image M2 of the first projection window and the location information of the image M2 of the first projection window to the local device. For details, refer to descriptions in step S104. Details are not described herein again.

S206: The local device displays the image M2 of the first projection window based on the location information of the image M2 of the first projection window.

The local device may receive the image M2 of the first projection window and the location information of the image M2 of the first projection window that are sent by the remote device. Then, the local device displays the image M2 of the first projection window based on the location information of the image M2 of the first projection window.

In this embodiment of this application, both the image M1 and the image M2 may be referred to as a first image. If the user operation U4 is performed on the image M1 of the first projection window, the user operation U4 may be referred to as a first operation. If the user operation U4 is performed on a local window in the local device, the user operation U4 may be referred to as a second operation.

In this way, the user may perform an operation on the first projection window in the local device. The user may perform an operation on a window of an application in the local device without a need to end projection by the remote device onto the local device and hide the first projection window. This can simplify a user operation, and does not affect normal use of the local device.

The following first describes an example of an electronic device 10 provided in this embodiment of this application.

Figure 22:
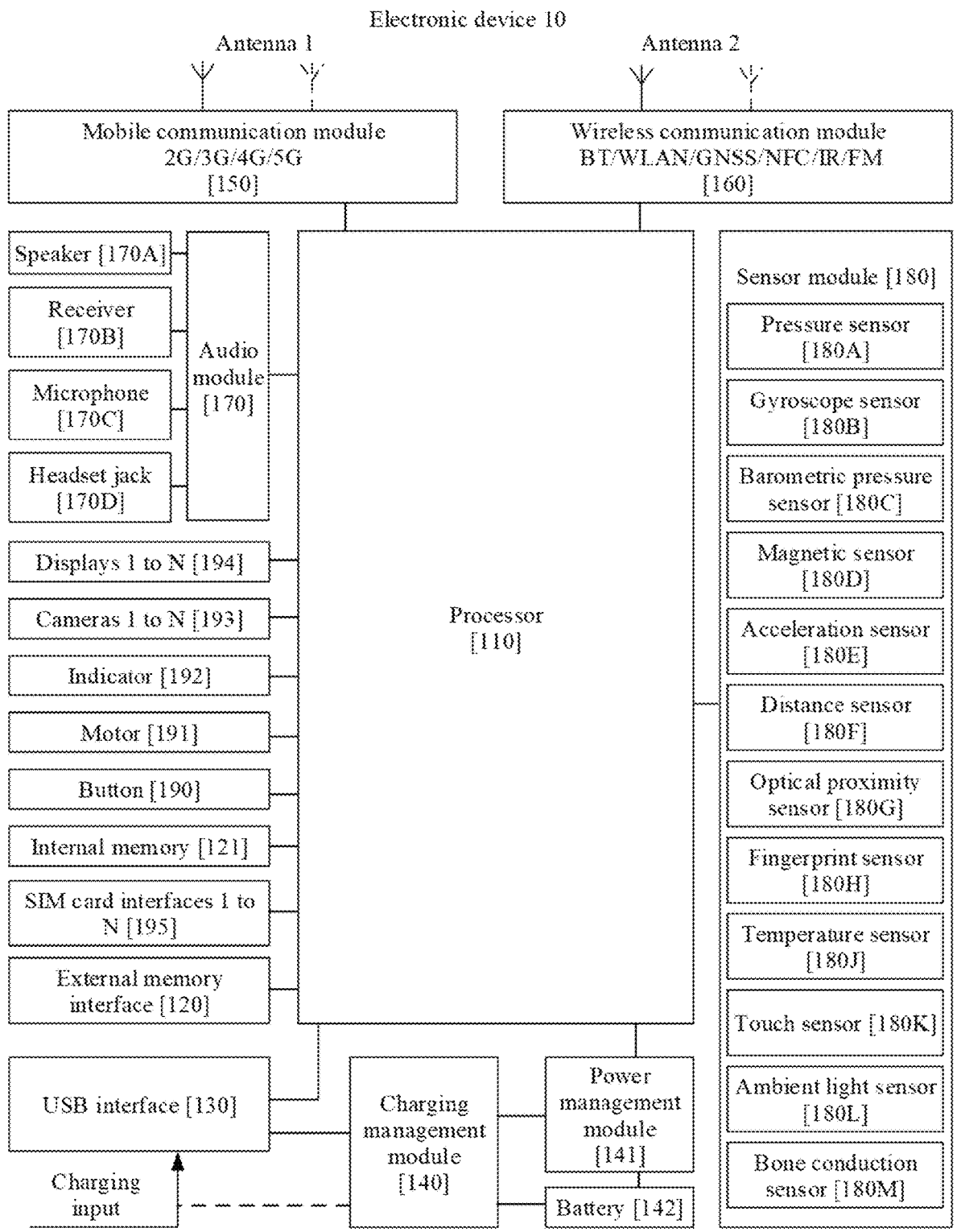
FIG. 22 is a diagram of a structure of an electronic device according to an embodiment of this application.

FIG. 22 is a diagram of a structure of the electronic device 10 according to an embodiment of this application. The electronic device 10 may be the remote device in embodiments of this application, or may be the local device in embodiments of this application.

The electronic device 10 is used as an example below to describe this embodiment in detail. It should be understood that the electronic device 10 may have more or fewer components than those shown in the figure, may combine two or more components, or may have different component configurations. The components shown in the figure may be implemented in hardware including one or more signal processing and/or application-specific integrated circuits, software, or a combination of hardware and software.

The electronic device 10 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a limitation on the electronic device 10. In some other embodiments of this application, the electronic device 10 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the electronic device 10. The controller may generate an operation control signal based on instruction operation code and a time sequence signal, to control instruction reading and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110, so that system efficiency is improved.

In some embodiments, the processor 110 may include one or more interfaces. The interface may include an inter-integrated circuit (I2C) interface, an inter-integrated circuit sound (interI2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 10.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to: perform audio communication, and sample, quantize, and code an analog signal.

The UART interface is a universal serial data bus, and is configured to perform asynchronous communication.

The MIPI interface may be configured to connect the processor 110 to a peripheral component like the display 194 or the camera 193. The MIPI interface includes a camera serial interface (CSI), a display serial interface (DSI), and the like.

The GPIO interface may be configured by software. The GPIO interface may be configured as a control signal or a data signal.

The SIM interface may be configured to communicate with the SIM card interface 195, to implement a function of transmitting data to an SIM card or reading data in an SIM card.

The USB interface 130 is an interface that conforms to a USB standard specification, and may be a mini USB interface, a micro USB interface, a USB Type-C interface, or the like. The USB interface 130 may be configured to connect to a charger to charge the electronic device 10, or may be configured to transmit data between the electronic device 10 and a peripheral device.

It may be understood that an interface connection relationship between the modules shown in this embodiment is merely an example for description, and does not constitute a limitation on the structure of the electronic device 10. In some other embodiments of this application, the electronic device 10 may alternatively use an interface connection manner different from that in the foregoing embodiment, or a combination of a plurality of interface connection manners.

The charging management module 140 is configured to receive a charging input from the charger. The charger may be a wireless charger or a wired charger.

The power management module 141 is configured to connect the battery 142, the charging management module 140, and the processor 110. The power management module 141 receives an input from the battery 142 and/or the charging management module 140, to supply power to the processor 110, the internal memory 121, an external memory, the display 194, the camera 193, the wireless communication module 160, and the like.

A wireless communication function of the electronic device 10 may be implemented through the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the electronic device 10 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G or the like and that is applied to the electronic device 10. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules in the mobile communication module 150 and at least some modules of the processor 110 may be disposed in a same component.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video on the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 10. The wireless communication module 160 may be one or more components integrating at least one communication processing module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave through the antenna 2 for radiation.

In some embodiments, in the electronic device 10, the antenna 1 and the mobile communication module 150 are coupled, and the antenna 2 and the wireless communication module 160 are coupled, so that the electronic device 10 can communicate with a network and another device by using a wireless communication technology. The wireless communication technology may include a global system for mobile communications (GSM), a general packet radio service (GPRS), code division multiple access (code division multiple access, CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BeiDou navigation satellite system, BDS), a quasi-zenith satellite system (QZSS), and/or a satellite based augmentation system (SBAS).

The electronic device 10 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 10 may include one or N displays 194, where N is a positive integer greater than 1.

The electronic device 10 may implement a photographing function by using the ISP, the camera 193, the video codec, the GPU, the display 194, the application processor, and the like.

The ISP may be configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format like RGB or YUV. In some embodiments, the electronic device 10 may include one or N cameras 193, where N is a positive integer greater than 1.

The digital signal processor is configured to process a digital signal, and may process another digital signal in addition to the digital image signal. For example, when the electronic device 10 selects a frequency, the digital signal processor is configured to perform Fourier transform and the like on frequency energy.

The video codec is configured to compress or decompress a digital video. The electronic device 10 may support one or more types of video codecs. In this way, the electronic device 100 can play or record videos in a plurality of encoding formats, for example, moving picture experts group (MPEG)-1, MPEG-2, MPEG-3, and MPEG-4.

The NPU is a neural-network (NN) processing unit. The NPU quickly processes input information by referring to a structure of a biological neural network, for example, a transfer mode between human brain neurons, and may further continuously perform self-learning. The NPU may implement intelligent cognition of the electronic device 10 and other applications, for example, image recognition, facial recognition, speech recognition, and text understanding.

The internal memory 121 may include one or more random access memories (RAM) and one or more non-volatile memories (NVM).

The random access memory may include a static random access memory (SRAM), a dynamic random access memory (DRAM), a synchronous dynamic random access memory (SDRAM), a double data rate synchronous dynamic random access memory (DDR SDRAM, for example, a 5th generation DDR SDRAM is generally referred to as a DDR5 SDRAM), and the like.

The non-volatile memory may include a magnetic disk storage device and a flash memory.

The flash memory may be classified into an NOR FLASH, an NAND FLASH, a 3D NAND FLASH, and the like according to an operation principle; may be classified into a single-level cell (SLC), a multi-level cell (MLC), a triple-level cell (TLC), a quad-level cell (QLC), and the like based on a quantity of electric potential levels of a cell; or may be classified into a universal flash storage (UFS), an embedded multimedia card (eMMC), and the like according to storage specifications.

The random access memory may be directly read and written by using the processor 110. The random access memory may be configured to store an executable program (for example, machine instructions) in an operating system or another running program, and may be further configured to store data of a user, data of an application, and the like.

The non-volatile memory may also store an executable program, data of a user, data of an application, and the like, which may be loaded into the random access memory in advance for directly reading and writing by the processor 110.

The electronic device 10 may implement audio functions such as music playing and recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal.

The speaker 170A, also referred to as a "loudspeaker", is configured to convert an audio electrical signal into a sound signal. The electronic device 10 may be configured to listen to music or answer a call in a hands-free mode over the speaker 170A.

The receiver 170B, also referred to as an "earpiece", is configured to convert an audio electrical signal into a sound signal. When a call is answered or voice information is received by using the electronic device 10, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth, to input a sound signal to the microphone 170C. At least one microphone 170C may be disposed in the electronic device 10. In some other embodiments, two microphones 170C may be disposed in the electronic device 10, to collect a sound signal and implement a noise reduction function. In some other embodiments, three, four, or more microphones 170C may alternatively be disposed in the electronic device 10, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal.

The gyroscope sensor 180B may be configured to determine a motion posture of the electronic device 10.

The barometric pressure sensor 180C is configured to measure barometric pressure.

The magnetic sensor 180D includes a Hall effect sensor. The electronic device 10 may detect opening and closing of a flip cover by using the magnetic sensor 180D.

The acceleration sensor 180E may detect magnitude of accelerations in various directions (usually on three axes) of the electronic device 10. When the electronic device 10 is static, the acceleration sensor 180E may detect a magnitude and a direction of gravity. The acceleration sensor 180E may be further configured to identify a posture of the electronic device, and is used in an application such as switching between a landscape mode and a portrait mode or a pedometer.

The distance sensor 180F is configured to measure a distance.

The optical proximity sensor 180G may include, for example, a light emitting diode (LED) and an optical detector, for example, a photodiode. The light emitting diode may be an infrared light emitting diode. The electronic device 10 emits infrared light by using the light emitting diode. The electronic device 10 detects infrared reflected light from a nearby object by using the photodiode.

The ambient light sensor 180L is configured to sense ambient light brightness. The electronic device 10 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the electronic device 10 is in a pocket, to prevent an accidental touch.

The fingerprint sensor 180H is configured to collect a fingerprint.

The temperature sensor 180J is configured to detect a temperature.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 10 at a location different from a location of the display 194.

The button 190 includes a power button, a volume button, and the like. The button 190 may be a mechanical button or a touch button. The electronic device 10 may receive a button input to generate a button signal input related to user settings and function control of the electronic device 10.

The motor 191 may generate a vibration prompt. The motor 191 may be configured to provide an incoming call vibration prompt and a touch vibration feedback.

The indicator 192 may be an indicator light, and may be configured to indicate a charging state and a power change, or may be configured to indicate a message, a missed call, a notification, and the like.

The SIM card interface 195 is configured to connect to a SIM card. The electronic device 10 interacts with a network through the SIM card, to implement functions such as calling and data communication.

In conclusion, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that", "in response to determining", "when (a stated condition or event) is detected", or "in response to detecting (a stated condition or event)".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the process or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing related hardware. The program may be stored in a computer-readable storage medium. When the program is run, the processes of the methods in embodiments are performed. The foregoing storage medium includes any medium that can store program code, such as a ROM, a random access memory RAM, a magnetic disk, or an optical disc.

What is claimed is:

1. A projection method, comprising:

detecting, by a first electronic device, a first drag operation, the first drag operation being used to move a first projection window from a first device display of the first electronic device to a second device display of a second electronic device, and a communication connection is established between the second electronic device and the first electronic device;

obtaining, by the first electronic device, a first image of the first projection window in response to the first drag operation, the first image comprising a first display content of the first projection window that is dragged out of the first device display of the first electronic device; and sending, by the first electronic device, the first image to the second electronic device, the first image being displayed on the second device display of the second electronic device;

wherein the sending comprises:

superimposing, by the first electronic device, the first image on a transparent background image to obtain a superimposed image, wherein the transparent background image is generated by the first electronic device based on a size of the second device display of the second electronic device, and a size of the transparent background image is the same as the size of the second device display of the second electronic device; and sending, by the first electronic device, the superimposed image to the second electronic device.

2. The method according to claim 1, wherein the sending, by the first electronic device, the first image to the second electronic device comprises:

sending, by the first electronic device, the first image and first location information to the second electronic device, wherein the first location information is used to determine a location of the first image on the second device display of the second electronic device.

3. The method according to claim 1, wherein the method further comprises:

detecting, by the first electronic device, a second drag operation, wherein the second drag operation is used to move a second projection window displayed on the first device display of the first electronic device to the second device display of the second electronic device; and in response to the second drag operation, obtaining, by the first electronic device, a second image of the second projection window, and superimposing, by the first electronic device, the second image on the transparent background image to obtain a superimposed image, wherein the second image comprises second display content that is of the second projection window and that is dragged out of the first device display of the first electronic device.

4. The method according to claim 1, wherein before the detecting, by a first electronic device, a first drag operation, the method further comprises:

determining, by the first electronic device, a first relative location between the first electronic device and the second electronic device, wherein the first drag operation is used to move the first projection window from the first device display of the first electronic device to the second device display of the second electronic device in a first direction, and the first direction is a direction, as indicated by the first relative location, of the second electronic device relative to the first electronic device.

5. The method according to claim 4, wherein that the first drag operation is used to move the first projection window from the first device display of the first electronic device to the second device display of the second electronic device in a first direction comprises one of the following:
the first direction is, as indicated by the first relative location, the right of the second electronic device relative to the first electronic device, and the first drag operation is used to move the first projection window rightward from the first device display of the first electronic device to the second device display of the second electronic device;
the first direction is, as indicated by the first relative location, the left of the second electronic device relative to the first electronic device, and the first drag operation is used to move the first projection window leftward from the first device display of the first electronic device to the second device display of the second electronic device;
the first direction is, as indicated by the first relative location, above the second electronic device relative to the first electronic device, and the first drag operation is used to move the first projection window upward from the first device display of the first electronic device to the second device display of the second electronic device; or
the first direction is, as indicated by the first relative location, below the second electronic device relative to the first electronic device, and the first drag operation is used to move the first projection window downward from the first device display of the first electronic device to the second device display of the second electronic device.

6. The method according to claim 1, wherein the method further comprises:
sending, by the first electronic device, second location information of a first mouse pointer to the second electronic device in response to the first drag operation, wherein the second location information is used to determine a location of the first mouse pointer on the second device display of the second electronic device.

7. The method according to claim 1, wherein after the sending, by the first electronic device, the first image to the second electronic device, the method further comprises:
receiving, by the first electronic device, a first instruction sent by the second electronic device, wherein the first instruction instructs the first electronic device to respond to a first operation, and the first operation is for the first image displayed on the second electronic device; and
responding to, by a first application to which the first projection window in the first electronic device belongs, the first operation.

8. A projection method, comprising:
receiving, by a second electronic device, a first image sent by a first electronic device, the first image being obtained by the first electronic device from a first projection window in the first electronic device when the first electronic device receives a first drag operation, the first image comprising a first display content of the first projection window that is dragged out of a first device display of the first electronic device, the first drag operation is used to move the first projection window from the first device display to a second device display of the second electronic device, and a communication connection is established between the second electronic device and the first electronic device; and
displaying, by the second electronic device, the first image on the second device display of the second electronic device:
receiving, by the second electronic device, second location information sent by the first electronic device, the second location information being used to determine a first pointer location of a first mouse pointer in the first electronic device on the second device display of the second electronic device;
displaying, by the second electronic device, the first mouse pointer on the second device display based on the second location information; and
wherein a second mouse pointer is displayed on the second device display of the second electronic device; and the method further comprises:
hiding, by the second electronic device, the second mouse pointer when displaying the first mouse pointer on the second device display of the second electronic device based on the second location information.

9. The method according to claim 8, wherein the receiving, by the second electronic device, the first image sent by the first electronic device comprises:
receiving, by the second electronic device, the first image and first location information sent by the first electronic device, the first location information being used to determine a location of the first image on the second device display of the second electronic device.

10. The method according to claim 9, wherein the displaying, by the second electronic device, the first image on the second device display comprises:
displaying, by the second electronic device, the first image on the second device display based on the first location information.

11. The method according to claim 8, wherein the receiving, by the second electronic device, the first image sent by the first electronic device comprises:
receiving, by the second electronic device, a superimposed image sent by the first electronic device, the superimposed image obtained by superimposing the first image on a transparent background image, the transparent background image being generated by the first electronic device based on a second device display size of the second device display, and a transparent background image size of the transparent background image is the same as the second device display size.

12. The method according to claim 11, wherein the method further comprises:
receiving, by the second electronic device, the superimposed image sent by the first electronic device, the superimposed image being obtained by superimposing the first image and a second image on the transparent background image, the second image being obtained by the first electronic device from a second projection window in the first electronic device when the first electronic device receives a second drag operation, the second image comprising a display content of the second projection window that is dragged out of the first device display of the first electronic device, the second drag operation moved the second projection window from the first device display of the first electronic device to the second device display of the second electronic device.

13. The method according to claim 8, wherein after the displaying, by the second electronic device, the first image, the method further comprises:
- receiving, by the second electronic device, a first operation, the first operation being for the first image; and
- sending, by the second electronic device, a first instruction to the first electronic device, wherein the first instruction instructs the first electronic device to respond to the first operation.

14. The method according to claim 8, wherein after the displaying, by the second electronic device, the first image, the method further comprises:
- receiving, by the second electronic device, a second operation, wherein the second operation is for a first window, and the first window is a second application in the second electronic device; and
- responding to, by the second application in the second electronic device, the second operation.

15. A first electronic device, comprising:
- a memory storing instructions; and
- at least one processor in communication with the memory, the at least one processor configured, upon execution of the instructions, to perform the following steps:
- detecting, by a first electronic device, a first drag operation, the first drag operation being used to move a first projection window from a first device display of the first electronic device to a second device display of a second electronic device, and a communication connection is established between the second electronic device and the first electronic device;
- obtaining, by the first electronic device, a first image of the first projection window in response to the first drag operation, the first image comprising a first display content of the first projection window that is dragged out of the first device display of the first electronic device; and
- sending, by the first electronic device, the first image to the second electronic device, the first image being displayed on the second device display of the second electronic device;
- wherein the sending comprises:
- superimposing, by the first electronic device, the first image on a transparent background image to obtain a superimposed image, wherein the transparent background image is generated by the first electronic device based on a size of the second device display of the second electronic device, and a size of the transparent background image is the same as the size of the second device display of the second electronic device; and
- sending, by the first electronic device, the superimposed image to the second electronic device.

16. The first electronic device according to claim 15, wherein the sending the first image to the second electronic device comprises:
- sending the first image and first location information to the second electronic device, wherein the first location information is used to determine a location of the first image on the second device display of the second electronic device.

17. A second electronic device, comprising:
- a memory storing instructions; and
- at least one processor in communication with the memory, the at least one processor configured, upon execution of the instructions, to perform the following steps:
- receiving a first image sent by a first electronic device, the first image being obtained by the first electronic device from a first projection window in the first electronic device when the first electronic device receives a first drag operation, the first image comprising display content of the first projection window that is dragged out of a first device display of the first electronic device, the first drag operation is used to move the first projection window from the first device display of the first electronic device to a second device display of the second electronic device, and a communication connection is established between the second electronic device and the first electronic device;
- displaying the first image on the second device display of the second electronic device
- receiving, by the second electronic device, second location information sent by the first electronic device, the second location information being used to determine a first pointer location of a first mouse pointer in the first electronic device on the second device display of the second electronic device;
- displaying, by the second electronic device, the first mouse pointer on the second device display based on the second location information; and
- wherein a second mouse pointer is displayed on the second device display of the second electronic device; and the method further comprises:
- hiding, by the second electronic device, the second mouse pointer when displaying the first mouse pointer on the second device display of the second electronic device based on the second location information.

* * * * *